United States Patent
Hazama et al.

[11] Patent Number: 5,923,856
[45] Date of Patent: Jul. 13, 1999

[54] CONTROL SYSTEM FOR COPING WITH BUS EXTENSION IN CONTROLLING A COMMUNICATION APPARATUS

[75] Inventors: Hisamichi Hazama; Ichiro Ayukawa; Kimio Watanabe; Shingo Mizuno, all of Kawasaki; Yasushi Miyagawa, Yokohama; Kazutoshi Kawamura, Kawasaki, all of Japan

[73] Assignee: Fujitsu Limited, Kanagawa, Japan

[21] Appl. No.: 08/757,377

[22] Filed: Nov. 27, 1996

[30] Foreign Application Priority Data

Nov. 28, 1995 [JP] Japan ................................. 7-309580
Oct. 7, 1996 [JP] Japan ................................. 8-266434

[51] Int. Cl.$^6$ ................................................. G06F 13/00
[52] U.S. Cl. ..................... 395/281; 395/280; 395/286; 395/309
[58] Field of Search ................................. 395/281, 286, 395/287, 306, 309, 380, 872; 370/85.13

[56] References Cited

U.S. PATENT DOCUMENTS

| | | | |
|---|---|---|---|
| 4,837,677 | 6/1989 | Burrus, Jr. et al. | 364/200 |
| 5,377,357 | 12/1994 | Nishigaki et al. | 395/800 |
| 5,452,422 | 9/1995 | Okamoto et al. | 395/293 |
| 5,524,112 | 6/1996 | Azuma et al. | 370/85.13 |
| 5,530,831 | 6/1996 | Akiyama et al. | 395/441 |
| 5,682,552 | 10/1997 | Kuboki et al. | 395/872 |

FOREIGN PATENT DOCUMENTS

| | | |
|---|---|---|
| 57-34234 | 2/1982 | Japan . |
| 59-94948 | 5/1984 | Japan . |
| 60-5371 | 1/1985 | Japan . |
| 63-219052 | 9/1988 | Japan . |
| 63-303454 | 12/1988 | Japan . |
| 1100650 | 4/1989 | Japan . |
| 5298133 | 11/1993 | Japan . |

*Primary Examiner*—Ayaz R. Sheikh
*Assistant Examiner*—Eric S. Thlang
*Attorney, Agent, or Firm*—Helfgott & Karas, P.C.

[57] ABSTRACT

A control system for a communication apparatus has capability of coping with bus extension. The control system includes a control section and a plurality of controlled sections connected to the control section via a bus. Each controlled section accommodates at least one object to be controlled. The control section has a first interface for extension bus generation which includes a latch section and a bus transmission section. The controlled section has a second interface section for extension bus generation which includes a reception section, a judgment section, and a permission signal send-back section. The bus is formed by a bus which complies with a standard regarding mutual connection between apparatuses in a data communication system so as to send and receive pieces of information, each including a predetermined number of bits, and control signals. This makes it possible to suppress the hardware cost of channel sections and to efficiently perform highly functional monitoring and controlling.

25 Claims, 50 Drawing Sheets

FIG. 3

| SIGNAL NAME | NUMBER OF SIGNAL | DIRECTION OF SIGNAL | FUNCTION |
|---|---|---|---|
| ADDRESS/DATA MULTIPLEX SIGNAL (AD0~AD7) | 8 | CPU ⇔ CH | TRANSMIT ADDRESS AND DATA |
| DATA PARITY (ADP) | 1 | CPU ⇔ CH | PARITY FOR EACH BYTE OF ADDRESS AND DATA |
| READ/WRITE CONTROL (R/*W) | 1 | CPU ⇔ CH | INDICATE KIND OF CONTROL OF CPU |
| ADDRESS/DATA STROBE (*AS) | 1 | CPU ⇔ CH | INDICATE DATA VALID PERIOD |
| ADDRESS/DATA MULTIPLEX TIMING (MUXTIM) | 1 | CPU ⇔ CH | INDICATE DATA LATCH TIMING FOR EACH BYTE |
| DATA ACKNOWLEDGMENT (*DACK) | 1 | CPU ⇔ CH | INDICATE COMPLETION OF RECEPTION OF DATA BY I/O |

F I G. 17
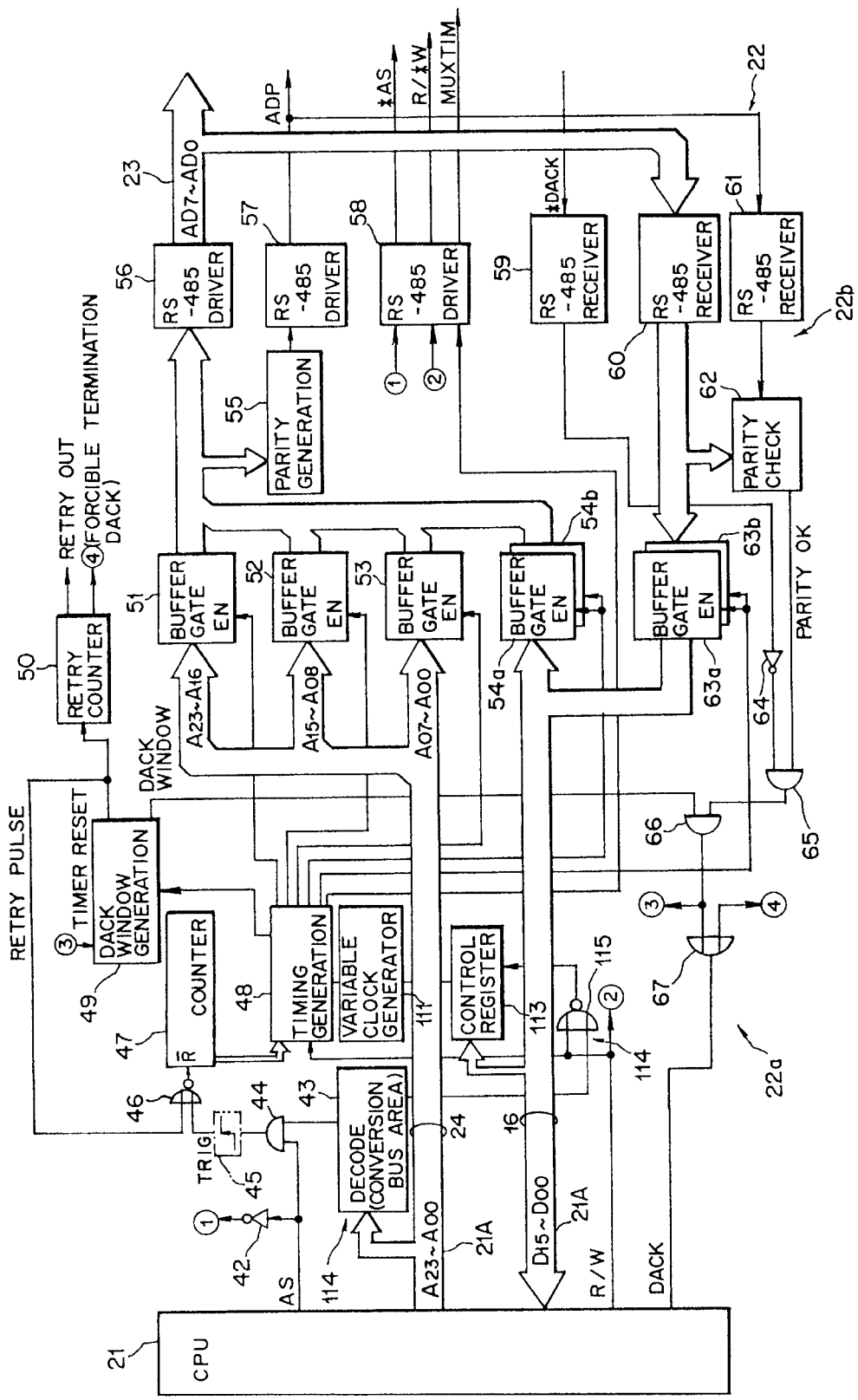

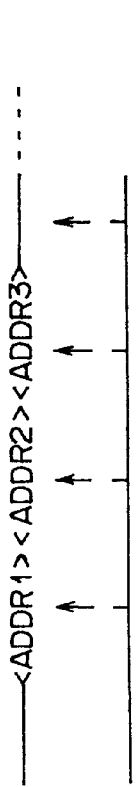
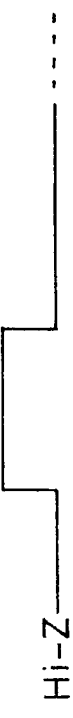
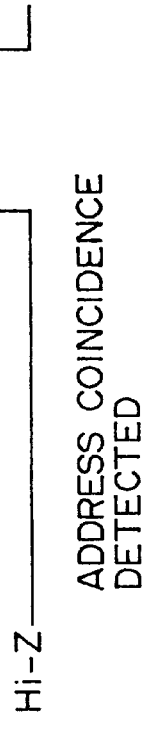
FIG. 42(a) INFORMATION RECEIVED BY RS-485 RECEIVER 71
TIMING SIGNAL
FIG. 42(b) STATUS OF PARITY ERROR BUS
FIG. 42(c) STATUS OF CONNECTION STATE NOTIFICATION BUS — PARITY ERROR OCCURRED
FIG. 42(d) STATUS OF PARITY ERROR BUS
FIG. 42(e) STATUS OF CONNECTION STATE NOTIFICATION BUS — ADDRESS COINCIDENCE DETECTED

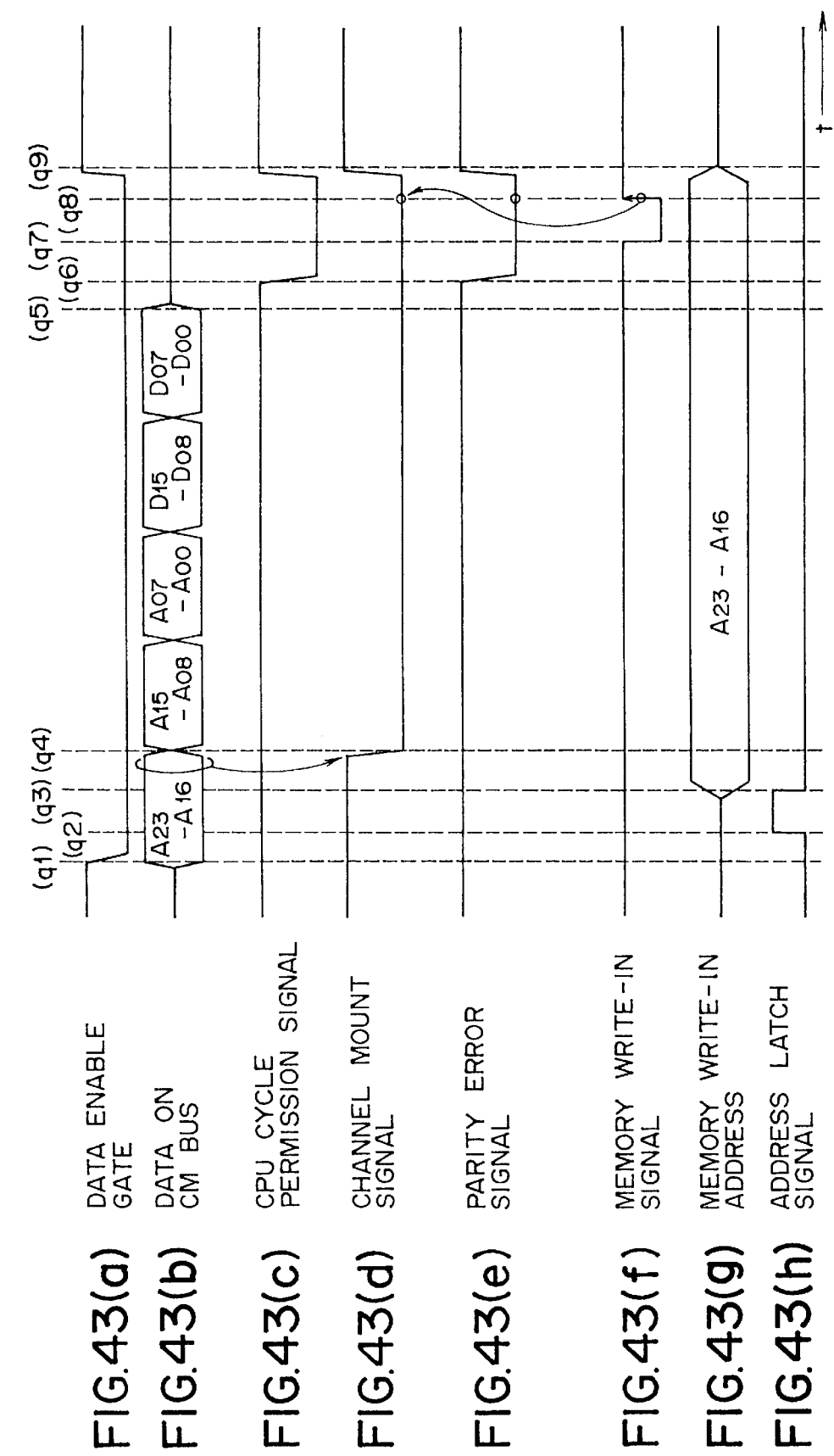

CONTROL SYSTEM FOR COPING WITH BUS EXTENSION IN CONTROLLING A COMMUNICATION APPARATUS

BACKGROUND OF THE INVENTION

The present invention relates to a control system capable of coping with bus extension, and more particularly to a control system capable of coping with bus extension which is suitable for a communication apparatus in which a control system including a single CPU controls a unit apparatus which is formed by a plurality of racks so as to accommodate a plurality of channels in the unit apparatus.

In 1988, CCITT (International Telegram and Telephone Consultative Committee) recommended the application of SDH (Synchronous Digital Hierarchy) to communication apparatuses. Therefore, in recent years, research and development efforts on communication apparatuses which can be adapted to SDH have been actively undertaken in relation to both radio transmission apparatuses and wire transmission apparatuses.

Communication apparatuses adapted to SDH are required to have an increased transmission capability and an enhanced monitor/control function; i.e., such a communication apparatus must provide enhanced ease of operation, a security function, flexible services, and the like.

On the other hand, since communication protocols have been standardized in order to unify manners of operation of communication networks (i.e., since there has been a movement toward allowing connection between different systems so as to unify networks all over the world), it becomes necessary for communication apparatus to cope with such a trend. Additionally, in the TMN (i.e. Telecommunication Management Network) wherein each communication apparatus is called an NE (Network Element), it also becomes necessary for each unit apparatus to be handled as a single NE so that the network can be operated efficiently.

In a general communication apparatus adapted to SDH, a plurality of channels (i.e., transmission paths each having a predetermined unit transmission capacity) are accommodated in a single NE so as to increase the transmission capacity. In such a communication apparatus including a plurality of channels, a plurality of racks are sometimes combined together to form one NE.

In the communication apparatus as described above, in particular, when each NE is formed by a plurality of racks, it is required not only to suppress an increase in the scale of hardware, but also to efficiently construct a monitor/ control system for monitoring and controlling channels, taking into account functions to be provided and equipment cost.

FIG. 50 is a diagram showing an example of a communication apparatus in which a plurality of racks form a single NE. In FIG. 50, numeral 100 denotes a communication apparatus which is constructed as a unit through the use of three racks 101-1 to 101-3. In each of the racks 101-1 to 101-3 shown in FIG. 50, numeral 102 denotes a transmission section (TX) for transmitting data in the form of radio signals; numeral 103 denotes a reception section (RX) for receiving data in the form of radio signals; and numerals 105 and 106 denote shelves, each shelf comprising two channels.

Thus, twelve channels in total are accommodated in the shelves 105 and 106 of the three racks 101-1 to 101-3. Among the twelve channels, one of the channels accommodated in the shelf 105 of the rack 101-1 can be used as a spare channel (PROT) while the remaining eleven channels can be used as communication channels (ch1 to ch11).

Numeral 104 denotes a common section (COM) provided in the rack 101-1. The common section 104 includes an unillustrated equipment CPU which serves as a monitor/control section 104a for monitoring and controlling each of the channels in the three racks 101-1 to 101-3.

In recent years, the above-described equipment CPU, which functions as the monitor/control section 104a, has been designed on the basis of a multi-CPU configuration so as to realize a monitoring/control system that operates at high speed and that provides improved functions.

When the above-described racks 101-1 to 101-3 are dispersed spatially, the following method may be employed for monitoring and controlling the channels. That is, a CPU is provided for each channel so as to collect information, and information of the entire apparatus is collected by the common section 104 through a serial communication such as an HDLC between the CPU and the common section 104. Particularly, when the number of items to be monitored and/or controlled is small, monitoring and controlling can be performed through transmission of information via electrical contacts.

However, even when the above-described measure is employed, problems will arise in the case where the communication apparatus as shown in FIG. 50 is applied to an apparatus, such as an SDH-adapted communication apparatus, which is required to have enhanced monitor/control functions. That is, when serial communication is performed between the CPU provided for each channel and the common section 104, the hardware cost of the channel sections increases, and the processing load of the CPU provided in the common section 104 also increases. Moreover, in the information transmission system utilizing electric contacts or the like, the amount of transmissible information is limited to a low level, so that it becomes difficult to form a monitor/control system.

Further, it is possible to employ a multi-CPU configuration and to mutually connect a plurality of racks by extending the CPU bus. In this case, information regarding devices, which is input through the CPU bus, is collected by the common section 104, which performs monitoring and controlling on the basis of the thus-collected information. In this case, however, the following problems will arise.

(1) The number of transmission signal lines is considerably large (e.g., 40 or more, including address lines, data lines, and control lines).

(2) Transmission speed is high (approximately 10 MHz when a 16-bit CPU is used).

(3) Bus control (tri-state control and the like) becomes complicated due to increased transmission distance.

(4) Termination (impedance matching) becomes difficult due to increased transmission distance.

(5) Electric levels must be changed from those suitable for TTL/CMOS to those suitable for long distance transmission.

Therefore, there have been no cases in which spatially separated racks have been connected together through extension of a CPU bus.

SUMMARY OF THE INVENTION

In view of the above-described problems, an object of the present invention is to provide a control system capable of coping with bus extension that suppresses the hardware cost of channel sections and that efficiently performs highly functional monitoring and controlling.

The present invention provides a control system capable of coping with bus extension which includes a control section formed by a microprocessor or a CPU, and a plurality of controlled sections connected to the control section via a bus. Each controlled section accommodates at least one controlled object. The control section has a first interface for extension bus generation which includes a latch section and a bus transmission section. The latch section latches a piece of address/data information at a time which piece of information includes a predetermined number of bits when a signal is output to the bus. The bus transmission section performs time division multiplexing for the information of the predetermined number of bits latched in the latch section so as to send it in a predetermined order. The bus transmission section also sends control signals used for performing time division multiplexing together with the information of the predetermined number of bits. The controlled section has a second interface section for extension bus generation which includes a reception section, a judgment section, and a permission signal send-back section. The reception section receives address/data information and control signals from the bus transmission section of the control section. The judgment section judges whether the received information is normal information directed to the controlled section to which the judgment section belongs. The permission signal send-back section sends a permission signal back to the control section when it is determined by the judgment section that the received information is normal and is directed to the controlled object of the controlled section to which the judgment section belongs. The bus is formed by a bus which complies with a standard regarding mutual connection between apparatuses in a data communication system so as to send and receive pieces of information, each including a predetermined number of bits, and control signals.

Since a bus which complies with a standard regarding mutual connection among apparatuses in a data communication system is used as the bus for connecting the control section and the plurality of controlled sections, each of the controlled objects can access the bus directly, so that the function of the controlled object can be simplified. This makes it possible to suppress an increase in product cost, while maintaining the level of the control function, even when the number of the controlled objects increases due to an increase in the transmission capacity.

The present invention provides another control system capable of coping with bus extension which includes a control section formed by a microprocessor or a CPU, and a plurality of controlled sections connected to the control section via a bus. Each controlled section accommodates at least one controlled object, and equipment operation information is set for the controlled section by the control section. The control section has a first interface for extension bus generation which includes a latch section, a bus transmission section, and a first error-detection-bit addition section. The latch section latches a piece of address/data information at a time which piece of information includes a predetermined number of bits when a signal is output to the bus. The bus transmission section performs time division multiplexing for the information of the predetermined number of bits latched in the latch section so as to send it in a predetermined order. The bus transmission section also sends control signals used for performing time division multiplexing together with the information of the predetermined number of bits. The first error-detection-bit addition section adds an error detection bit to information, which is transmitted a predetermined number of bits at a time, thereby sending the error detection bit. The controlled section has a second interface section for extension bus generation which includes a reception section, a judgment section, a permission signal send-back section, and a second error-detection-bit addition section. The reception section receives address/data information and control signals from the bus transmission section of the control section. The judgment section judges whether the received information is normal information directed to the controlled section to which the judgment section belongs. The permission signal send-back section sends a permission signal back to the control section when it is determined by the judgment section that the received information is normal and is directed to the controlled object of the controlled section to which the judgment section belongs. The second error-detection-bit addition section adds an error detection bit to a permission signal, thereby sending the error detection bit. The control section has a structure such that it waits for reception of a permission signal from the permission signal send-back section within a predetermined period of time after the above-described signal is output via the bus. When no permission signal is received within the predetermined period of time, the control section again outputs the above-described signal. Moreover, the bus is formed by two duplicated buses, for current use and for spare use, which comply with a standard regarding mutual connection between apparatuses in a data communication system so as to send and receive pieces of information, each including a predetermined number of bits, and control signals. Furthermore, in the case that the control section does not receive a permission signal from the permission signal send-back section even though the above-described signal is output a predetermined number of times, equipment operation information set in the controlled section is reset at the point of time when the bus used as a current bus is switched to the spare bus.

The above-described structure prevents the state of the bus recognized by the control section from differing from the actual state when the bus used as a current bus is switched to the spare bus. Accordingly, even in the case where the changeover of the bus occurs when the control section accesses the bus, it is possible to prevent a functional failure from occurring.

BRIEF DESCRIPTION OF THE DRAWINGS

FIG. 3 is a diagram for explaining signal lines which form a CM bus;

FIG. 17 is a block diagram showing an SEMU according to the fourth embodiment of the present invention;

FIG. 42(a)–FIG. 42(e) are timing diagrams for explaining the operation of the CM BUS conversion section according to the eleventh embodiment of the present invention;

FIG. 43(a)–FIG. 43(h) are timing diagrams for explaining the operation of the control system capable of coping with bus extension according to the eleventh embodiment of -the present invention;

DESCRIPTION OF THE PREFERRED EMBODIMENTS (a) Aspect of the Invention:

An aspect of this invention will be explained with reference to the drawings.

Figure 1:
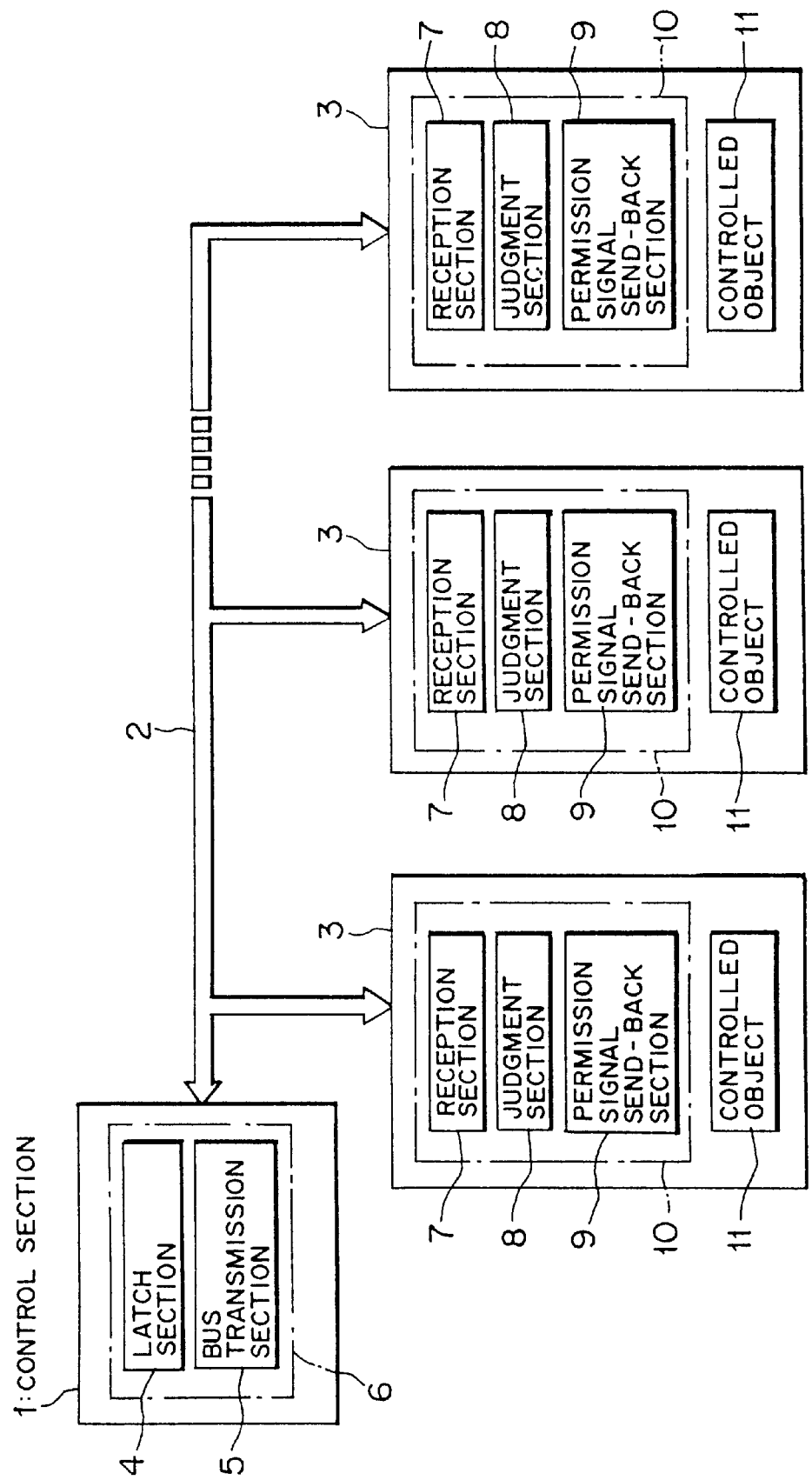
FIG. 1 is a block diagram showing an aspect of the present invention.

FIG. 1 shows an aspect of the present invention, wherein numeral 1 denotes a control section which is formed by a microprocessor or a CPU, and numeral 3 denotes a controlled section connected to the control section 1 via a bus 2.

As the bus 2, there is used a bus which complies with a standard regarding mutual connection among apparatuses in a data communication system. This makes it possible to transmit and receive pieces of information, each piece including a predetermined number of bits, as well as control signals, which will be described later.

The control section 1 is provided with a first interface section for extension bus generation 6, which includes the latch section 4 and a bus transmission section 5.

When the latch section 4 outputs signals to the bus 2, the latch section 4 latches one piece of address/data information at a time which piece of information has a predetermined number of bits. The bus transmission section 5 performs time division multiplexing, in a predetermined order, for the information of the predetermined number of bits latched in the latch section 4 so as to send the information. The bus transmission section 5 also sends control signals used for performing time division multiplexing together with the information of the predetermined number of bits.

The controlled section 3 is provided with a second interface section for extension bus generation 10, which includes a reception section 7, a judgment section 8 and a permission signal send-back section 9, and which is adapted to accommodate at least one controlled object 11.

The reception section 7 receives address/data information and control signals from the bus transmission section 5 of the control section 1. The judgment section 8 judges whether the received information is for the controlled section 3 to which the judgment section 8 belongs. The permission signal send-back section 9 sends a permission signal back to the control section 1 when it is determined by the judgment section 8 that the received information is normal and is directed to the controlled object 11 of the controlled section 3 to which the judgment section 8 belongs.

Since a bus which complies with a standard regarding mutual connection among apparatuses in a data communication system is used as the bus 2 for connecting the control section 1 and the plurality of controlled sections 3, each of the controlled objects 11 can access the bus 2 directly, so that the function of the controlled object can be simplified. This makes it possible to suppress an increase in product cost, while maintaining the level of the control function, even when the number of the controlled objects 11 increases due to an increase in the transmission capacity.

The first interface section for extension bus generation 6 may include a first error-detection-bit addition section whose purpose is to add an error detection bit to information which is transmitted a predetermined number of bits; at a time, and the second interface section for extension bus generation 10 may include a second error-detection-bit addition section whose purpose is to add an error detection bit to information which is transmitted a predetermined number of bits at a time.

Also, the second interface section for extension bus generation 10 may have a structure such that when the second interface section for extension bus generation 10 receives the above-described address/data information and control signals and determines, on the basis of the error detection bit added to the information received by the reception section 7, that an error is included in either the address information or the write-in data information from the control section 1, the second interface section for extension bus generation 10 does not access the controlled object 11, and the permission signal send-back section 9 does not send any permission signal to the control section 1.

The control section 1 may have a structure such that when the control section 1 outputs a signal to the bus 2 and subsequently detects an error in read-out data information sent from the second interface section for extension bus generation 10, the control section 1 ignores a permission signal sent from the permission signal send-back section 9 of the second interface section for extension bus generation 10 and outputs the signal again.

Moreover, the control section 1 may have a structure such that, after outputting a signal via the bus 2, the control section 1 waits to receive a permission signal from the permission signal send-back section 9, and then if no permission signal is received within a predetermined period of time, the control section 1 outputs the signal again.

Thus, in accordance with the present invention, since use of an error detection bit makes it possible to check whether a signal transmitted from the control section 1 to the controlled section 3 is normal, as well as whether a signal transmitted from the controlled section 3 to the control section 1 is normal, the reliability of the control functions for the controlled object 11 can be increased.

Further, the control section 1 may have an entire-length input section for inputting the entire length of the bus 2 and a waiting-time changing section for changing a waiting time according to the input value from the entire-length input section.

Therefore, it is possible to input the entire length of the bus 2, which connects the control section 1 and the plurality of controlled sections 3, and to set, in accordance with the input value, a period of time during which a permission signal is waited for reception thereof. Accordingly, unnecessary waiting time can be minimized, so that the processing performance of the CPU can be improved.

In this case, the control section 1 may have a structure such that when no permission signal is received from the permission signal send-back section 9 even after signal output is repeated a predetermined number of times, the control section 1 reports this trouble to the outside as a bus failure.

Therefore, when no permission signal is received even after signal output is repeated a predetermined number of times, this trouble can be reported to the outside as a bus failure. Accordingly, recovery processing for coping with the bus failure can be performed immediately.

Two of the signal transmission cables which form the bus 2 may be looped at their ends so as to form a break detection line, and the control section 1 may output alarm information when it is judged on the basis of a signal from the break detection line that the signal transmission cables are broken or cut.

Thus, since alarm information is output when a break of the signal transmission lines is detected, recover processing for coping with the bus failure can be performed immediately.

The first interface section for extension bus generation 6 may comprise a variable transmission clock generator which can change the speed of clocks used for transmitting the above-described signal, and a clock speed setting section for setting the speed of clocks generated by the variable transmission clock generator.

In the case where the control section 1 has a structure such that it again outputs a previously output signal when a permission signal is not received within a predetermined period of time, the first interface section for extension bus generation 6 may comprise a variable transmission clock generator which can change the speed of clocks used for transmitting the above-described signal, and a clock speed setting section for setting the speed of clocks generated by the variable transmission clock generator such that the speed of clocks varies in accordance with the number of times the signals have been output.

When the length of a cable serving as the bus 2 is increased so as to provide connection over a long distance (e.g., about 50 m) between the control section 1 and the controlled section 3, or when these sections are installed at a place where strong noise exists, an error will be included in transmission information during signal retransmission processing. By virtue of the above-described structure, this problem is overcome by the variable transmission clock generator and the clock speed setting section provided in the first interface section for extension bus generation 6. That is, since the transmission clock speed is varied so as to prevent the occurrence of a retry out, the CPU can normally continue monitor/control operation without stopping the access to the address related to the occurrence of the error. This mitigates the restrictions on the construction of the system, such as a restriction on the cable length and a restriction on noise at an installation site.

In this case, the clock speed setting section may be formed by a setting/changing register for holding clock speed information which is set in accordance with the number of times the above-described signal has been output.

Accordingly, since the setting/changing register serving as the clock speed setting section is provided in the first interface section for extension bus generation 6, the following advantage can be obtained as well as an advantage similar to that provided in the above-described case. That is, even when the control system is actually operated in a manner to cope with bus extension, the transmission clock speed is automatically adjusted so as to prevent a retry cut from occurring. This increase reliability during the use of the apparatus. Moreover, since the transmission clock speed is varied automatically, operator's work can be eliminated.

In the case where the control section 1 has a structure such that it again outputs a previously output signal when a permission signal is not received within a predetermined period of time, the first interface section for extension bus generation 6 may include a permission signal reception notification section for notifying the controlled section 3 of reception of the permission signal. When a permission signal is received from the permission signal send-back section 9, the permission signal reception notification section notifies the controlled section 3 of the reception of the permission signal. Moreover, the controlled section 3 may include a register for latching read-out data from the control object 11, and the controlled section 3 may have a structure such that it resets the latch when the control section 3 receives a permission signal reception notice from the permission signal reception notification section after the latched read-out data is read out by the control section 1.

Therefore, it is possible to cancel the holding of data in the latch upon reception of a permission signal reception notice after the control section 1 reads out the read-out data held in the data holding section. This makes it possible to hold data by the hardware until the software in the control section recognizes the read-out data. Accordingly, the system of the present invention can fully utilize the merits of the read-break method which allows information to be reliably transmitted from hardware to software regardless of the polling period.

In the case where the control section 1 has a structure such that it again outputs a previously output signal when a permission signal is not received within a predetermined period of time, the first interface section for extension bus generation 6 may include a permission signal reception notification section. When a permission signal is received from the permission signal send-back section 9, this permission signal reception notification section notifies the second interface section for extension bus generation 10 of the reception of the permission signal. Moreover, the controlled section 3 may include a retransmission output recognition section. When the control section 1 outputs the above-described signal so as to perform data read-out control for the controlled section 3, the retransmission output recognition section judges, on the basis of the notification information from the permission signal reception notification section, whether the signal is output by retransmission processing.

In this case, the controlled section 3 may include a read-out data latch section, a data holding section, and an output data selecting section. The data latch latches read-out data until the control section 1 performs data read-out control. The data holding section temporarily holds data read out from the read-out data latch section. When the retransmission output recognition section recognizes the signal as being output first time, the output data selecting section outputs the read-out data from the read-out data latch section to the control section 1. When the retransmission output recognition section recognizes the signal as being output through retransmission processing, the output data selecting section outputs the data held by the data holding section to the control section 1.

Accordingly, as in the previously described case, it is possible to hold data by the hardware until the software recognizes the read-out data. Accordingly, in this system as well, it is possible to fully utilize the merits of the read-break method which allows information to be reliably transmitted from hardware to software regardless of the polling period.

In addition, retransmission on the bus 2 can be performed within the bus 2. Accordingly, in the data latch section which holds monitor data in the read-break method, it is unnecessary to take account of a CM bus existing between the control section 1 and the data latch section, so that the data latch section does not require any special processing in relation to retransmission. This makes the functions shared by the respective sections clearer. Moreover, since it becomes unnecessary to input a latch canceling signal to the data latch section of each controlled object 11, the design of the apparatus becomes easier.

In the case where the control section 1 has a structure such that it again outputs a previously output signal when a permission signal is not received within a predetermined period of time, the first interface section for extension bus generation 6 may include a flag addition section, and the controlled section 3 may include a retransmission output recognition section. When the above-described signal is retransmitted again via the bus 2, the flag addition section adds to the signal a flag which indicates the retransmission of the signal. When the control section 1 outputs the above-described signal so as to perform data read-out control for the controlled section 3, the retransmission output recognition section judges, on the basis of the flag which is added to the signal by the flag addition section, whether the signal is output by retransmission processing.

In this case, the controlled section 3 may include a read-out data latch section, a data holding section, and an output data selecting section. The data latch latches read-out data until the control section 1 performs data read-out control. The data holding section temporarily holds data read out from the read-out data latch section. When the retransmission output recognition section recognizes the signal as being output first time, the output data selecting section outputs the read-out data from the read-out data latch section to the control section 1. When there transmission output recognition section recognizes the signal as being output through retransmission processing, the output data selecting section outputs the data held by the data holding section to the control section 1.

Accordingly, in addition to advantages similar to those obtained in the previously described, the following advantage can be obtained. Since it is possible to add to address information a retry flag generated by the flag addition section and to transmit it via the bus 2, it becomes unnecessary to assign another line so as to send an acknowledgment signal in reply to reception of a permission signal. In addition, it becomes unnecessary to wait for sending back of a notification indicating the reception of the permission signal, so that the processing time can be shortened.

In the case where the control section 1 has a structure such that it again outputs a previously output signal when a permission signal is not received within a predetermined period of time, the controlled section 3 may include another type of retransmission output recognition section. When the control section 1 outputs the above-described signal so as to perform data read-out control for the controlled section 3 and if the read-out control is successively performed for different addresses, the retransmission output recognition section recognizes the above-described signal as being output first time. If the read-out control is successively performed for the same address, the retransmission output recognition section recognizes the above-described signal as being output by retransmission processing.

In this case, the controlled section 3 may include a read-out data latch section, a data holding section, and an output data selecting section. The data latch latches read-out data until the control section 1 performs data read-out controls. The data holding section temporarily holds data read out from the read-out data latch section. When the retransmission output recognition section recognizes the signal as being output first time, the output data selecting section outputs the read-out data from the read-out data latch section to the control section 1. When the retransmission output recognition section recognizes the signal as being output through retransmission processing, the output data selecting section outputs the data held by the data holding section to the control section 1.

Accordingly, in addition to advantages similar to those obtained in the previously described, the following advantage can be obtained. Since it is possible to judge, by only the second interface section for extension bus generation 10, whether a received data read-out request is for retry, it becomes unnecessary to provide the first interface section for extension bus generation 6 with a functional section for sending a retry flag, a permission signal reception notification, and the like. In addition, the number of signal lines of the bus 2 can be decreased. Accordingly, it is possible to shorten the processing time while simplifying the system configuration.

In the case where the control section 1 has a structure such that it again outputs a previously output signal when a permission signal is not received within a predetermined period of time, the controlled section 3 may include another type of retransmission output recognition section. When the control section 1 outputs the above-described signal so as to perform data read-out control for the controlled section 3 and if a period of time which has elapsed after completion of previous data read-out control is greater than a predetermined value, the retransmission output recognition section recognizes the above-described signal as being output first time. If the period of time which has elapsed after completion of previous data read-out control is not greater than the predetermined value, the retransmission output recognition section recognizes the above-described signal as being output by retransmission processing.

In this case, the controlled section 3 may include a read-out data latch section, a data holding section, and an output data selecting section. The data latch latches read-out data until the control section 1 performs data read-out controls. The data holding section temporarily holds data read out from the read-out data latch section. When the retransmission output recognition section recognizes the signal as being output first time, the output data selecting section outputs the read-out data from the read-out data latch section to the control section 1. When the retransmission output recognition section recognizes the signal as being output through retransmission processing, the output data selecting section outputs the data held by the data holding section to the control section 1.

Thus, it becomes possible to hold data by the hardware until the software recognizes the read-out data. Accordingly, in this system as well, it is possible to fully utilize the merits of the read-break method which allows information to be reliably transmitted from hardware to software regardless of the polling period.

In addition, retransmission on the bus 2 can be performed within the bus 2. Accordingly, in the data latch section which holds monitor data in the read-break method, it is unnecessary to take account of a CM bus existing between the control section 1 and the data latch section, so that the data latch section does not require any special processing in relation to retransmission. This makes the functions shared by the respective sections clearer. Since it is unnecessary to input a latch canceling signal to the data latch section of each controlled object 11, the design of the apparatus becomes easier.

Moreover, since it is possible to judge, by only the second interface section for extension bus generation 10, whether a received data read-out request is for retry, it becomes unnecessary to provide the first interface section for extension bus generation 6 with a functional section for sending a retry flag, a permission signal reception notification, and the like. In addition, the number of signal lines of the bus 2 can be decreased. Accordingly, it is possible to shorten the processing time for recognizing the retry while simplifying the system configuration.

In the case where the control section 1 has a structure such that it again outputs a previously output signal when a permission signal is not received within a predetermined period of time, there may be provided a break detection line which is connected between the control section 1 and the controlled section 3 so as to detect a break of the bus 2. In this case, the control section 1 may include a diagnosis section. When the control section 1 dose not receive a permission signal from the permission signal send-back section 9 even after the above-described signal is output a predetermined number of times, the diagnosis section diagnoses, on the basis of information from the break detection line, the cause of the impossibility in receiving the permission signal.

Accordingly, in the case where the control section 1 determines that a retry out occurs when data-read out operation is performed for a desired channel, the control section 1 can reliably judge and specify the cause of the retry out; i.e., whether a bus failure, or a non-mounted shelf, which serves as a CM bus slave, has caused the retry out. This further improves the monitor/control function.

In the case where the control section 1 has a structure such that it again outputs a previously output signal when a permission signal is not received within a predetermined period of time, there may be provided a connection state notification bus for notifying the control section 1 whether the controlled section 3 is connected to the bus 2. In this case, the controlled section 3 may include an address detection section and a bus control section, and the control section 1 may include a diagnosis section. The address detection section detects the address of the controlled object 11 accommodated in the controlled section 3 to which the address detection section belongs. The bus control section brings the connection state notification bus into an active state when the address detection section detects the address of the controlled object 11 accommodated in the controlled section 3 to which the address detection section belongs. When the control section 1 dose not receive a permission signal from the permission signal send-back section 9 even after the above-described signal is output a predetermined number of times, the diagnosis section diagnoses, on the basis of information from the connection state notification bus, the cause of the impossibility in receiving the permission signal.

In the case where the control section 1 has a structure such that it again outputs a previously output signal when a permission signal is not received within a predetermined period of time, there may be provided a parity error bus for notifying the control section 1 of detection of a parity error in the address information transmitted from the control section, as well as a connection state notification bus for notifying the control section 1 whether the controlled section 3 is connected to the bus 2. In this case, the controlled section 3 may include an address detection section, a parity error detection section, and a bus control section, and the control section 1 may include a diagnosis section. The address detection section detects the address of the controlled object 11 accommodated in the controlled section 3 to which the address detection section belongs. The parity error detection section detects a parity error in the address information transmitted from the control section 1. The bus control section brings the connection state notification bus into an active state when the address detection section detects the address of the controlled object 11 accommodated in the controlled section 3 to which the address detection section belongs. The bus control section also brings the parity error bus into an active state when a parity error is detected by the parity error detection section. When the control section 1 dose not receive a permission signal from the permission signal send-back section 9 even after the above-described signal is output a predetermined number of times, the diagnosis section diagnoses, on the basis of information from the connection state notification bus and the parity error bus, the cause of the impossibility in receiving the permission signal.

Accordingly, in the case where the control section 1 determines that a retry out occurs when data-read out operation is performed for a desired channel, the control section 1 can reliably judge and specify the cause of the retry out; i.e., whether a bus failure, or a non-mounted shelf, which serves as a CM bus slave, has caused the retry out. This makes it possible to cope with all kinds of bus failures, so that the monitor/control function can be further improved.

Moreover, when it is detected through address detection whether each CM bus slave is mounted or not and if an error occurs in the address which is output via the bus 2 from the first interface section for bus extension generation 6, it is not judged that the CM bus slave is not mounted. Accordingly, accuracy in specifying the cause of a failure can be greatly increased.

In the case where the control section 1 has a structure such that it again outputs a previously output signal when a permission signal is not received within a predetermined period of time, the control section 1 may include an address information register for latching address information to be sent to the controlled section 3, and a bus break/failure location specifying section which specifies a location on the bus 2 where a break or failure occurs, when the control section 1 dose not receive a permission signal from the permission signal send-back section 9 even after the above-described signal is output a predetermined number of times.

Since the address information is provided in the control section 1, a break location of the CM bus can be found when a failure occurs. Therefore, it becomes unnecessary for a person in charge of maintaining the apparatus to go to the site and to perform a test for checking whether a signal/electricity can be conducted, thereby identifying the location where the bus is broken or cut. This eliminates the necessity of breaking lines during the time when service is provided. Moreover, failures can be removed safely, reliably and quickly.

Anther control system capable of coping with bus extension according to the present invention includes a control section 1 which is formed by a microprocessor or a CPU, and a plurality of controlled sections 3 connected to the control section 1 via a bus 2. Each controlled section 3 accommodates at least one controlled object 11, and equipment operation information is set for the controlled section 3. The control section 1 has a first interface for extension bus generation 6 which includes a latch section 4, a bus transmission section 5, and a first error-detection-bit addition section. The latch section 4 latches a piece of address/data information at a time which piece of information has a predetermined number of bits when the latch section 4 outputs signals to the bus 2. The bus transmission section 5 performs time division multiplexing for the information of the predetermined number of bits latched in the latch section 4 so as to send it in a predetermined order. The bus transmission section 5 also sends control signals used for performing time division multiplexing together with the information of the predetermined number of bits. The first error-detection-bit addition section adds an error detection bit to information, which is transmitted a predetermined number of bits at a time, and sends the information. The controlled section 3 has a second interface section for extension bus generation 10 which includes a reception section 7, a judgment section 8, a permission signal send-back section 9, and a second error-detection-bit addition section. The reception section 7 receives address/data information and control signals from the bus transmission section 5 of the control section 1. The judgment section 8 judges whether the received information is normal information directed to the controlled section 3 to which the judgment section 8 belongs. The permission signal send-back section 9 sends a permission signal back to the control section 1 when it is determined by the judgment section 8 that the received information is normal and is directed to the controlled object 11 of the controlled section 3 to which the judgment section 8 belongs. The second error-detection-bit addition section adds an error detection bit to a permission signal and sends the permission signal. The control section 1 has a structure such that it waits for reception of a permission signal from the permission signal send-back section 9 within a predetermined period of time after the above-described signal is output via the bus 2. When no permission signal is received within the predetermined period of time, the control section 1 again outputs the above-described signal. Moreover, the bus 2 is formed by two duplicated buses, for current use and for spare use, which comply with a standard regarding mutual connection between apparatuses in a data communication system so as to send and receive pieces of information, each including a predetermined number of bits, and control signals. Furthermore, in the case that the control section 1 does not receive a permission signal from the permission signal send-back section 9 even though the above-described signal is output a predetermined number of times, equipment operation information set in the controlled section 3 is reset at the point of time when the bus 2 used as a current bus is switched to the spare bus.

The above-described structure prevents the recognition of the control section 1 from differing from the actual state when the bus 2 used as a current bus is switched to the spare bus. Accordingly, even in the case where the changeover of the bus 2 occurs while the control section is accessing the bus 2, it is possible to prevent a functional failure from occurring.

(b) First Embodiment

A first embodiment of the present invention will be described with reference to FIGS. 2–9.

Figure 2:
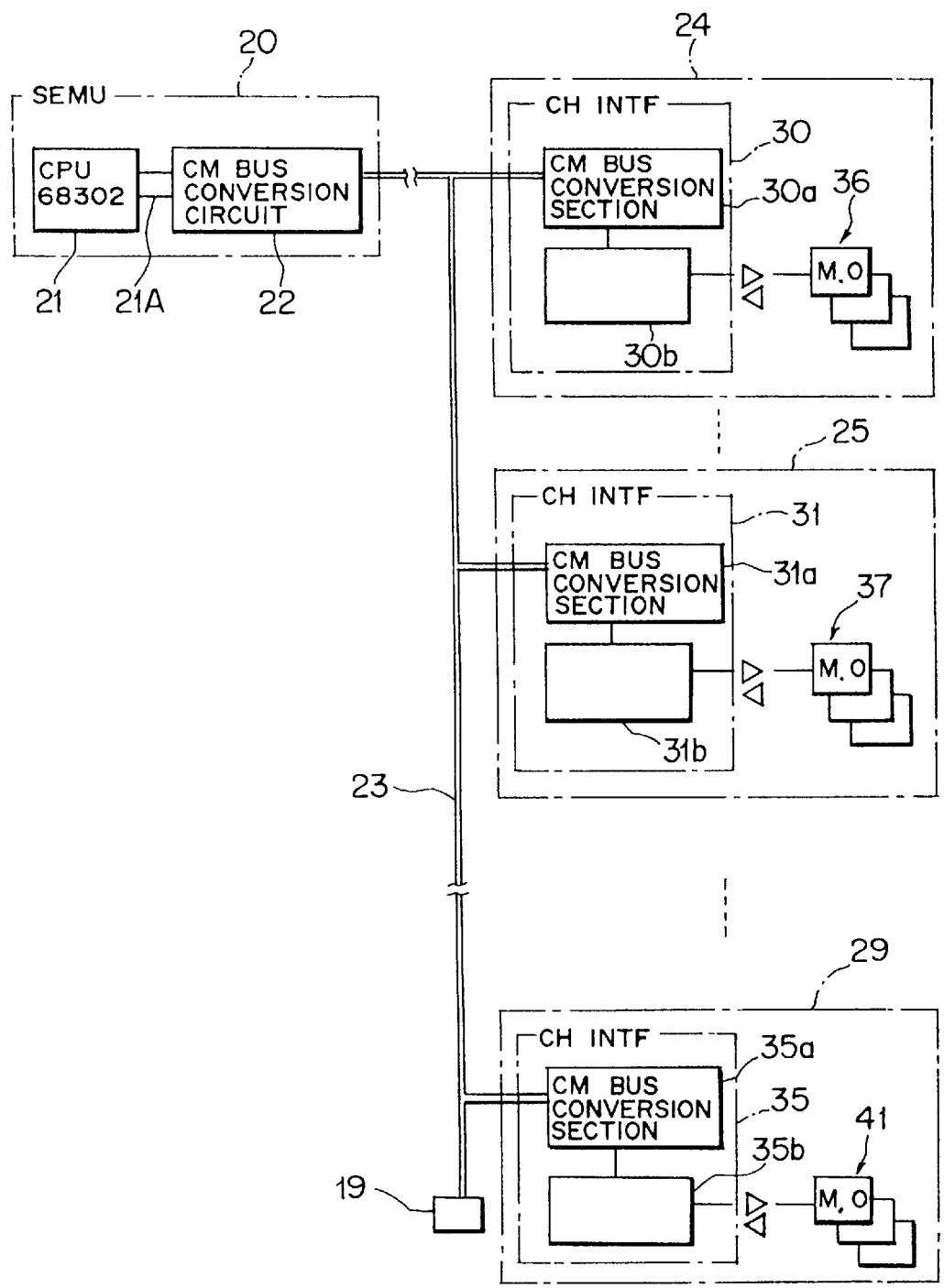
FIG. 2 is a block diagram showing a control system capable of coping with bus extension according to a first embodiment of the present invention.

FIG. 2 is a block diagram showing a control system capable of coping with bus extension according to the first embodiment of the present invention. The control system shown in FIG. 2 can be applied to, for example, a multiplex radio apparatus adapted to SDH.

In FIG. 2, a numeral 20 denotes a SEMU (Supervisory Equipment Management Unit) serving as a master. The SEMU 20 functions as a control section which controls controlled sections. The SEMU 20 includes an equipment CPU (hereinafter simply referred to as a CPU) 21 and a CM BUS (Channel Management Bus) conversion circuit (CM conversion section) 22.

Numeral 23 denotes a CM (Channel Management) bus. The CM bus 23 serves to mutually connect the SEMU 20 and shelves 24–29, which are controlled sections as described below. The CM bus 23 is adapted to an electrical interface which allows transmission over a long distance of about 50 m (standard regarding mutual connection among several apparatuses in a data communication system), e.g., an electrical interface according to RS-485 recommended by EIA.

The shelves 24–29 serving as slaves are connected to the SEMU 20 through the CM bus 23. Each of the shelves 24–29 functions as a controlled section which accommodates at least one controlled object. The shelves 24–29 respectively includes CH (Channel) interface sections (CH INTF) 30–35 each of which serves as a termination board where the CM bus 23 is terminated. Each of the shelves 24–29 accommodates monitor/controlled objects (control objects, management objects) 36–41.

Figure 50:
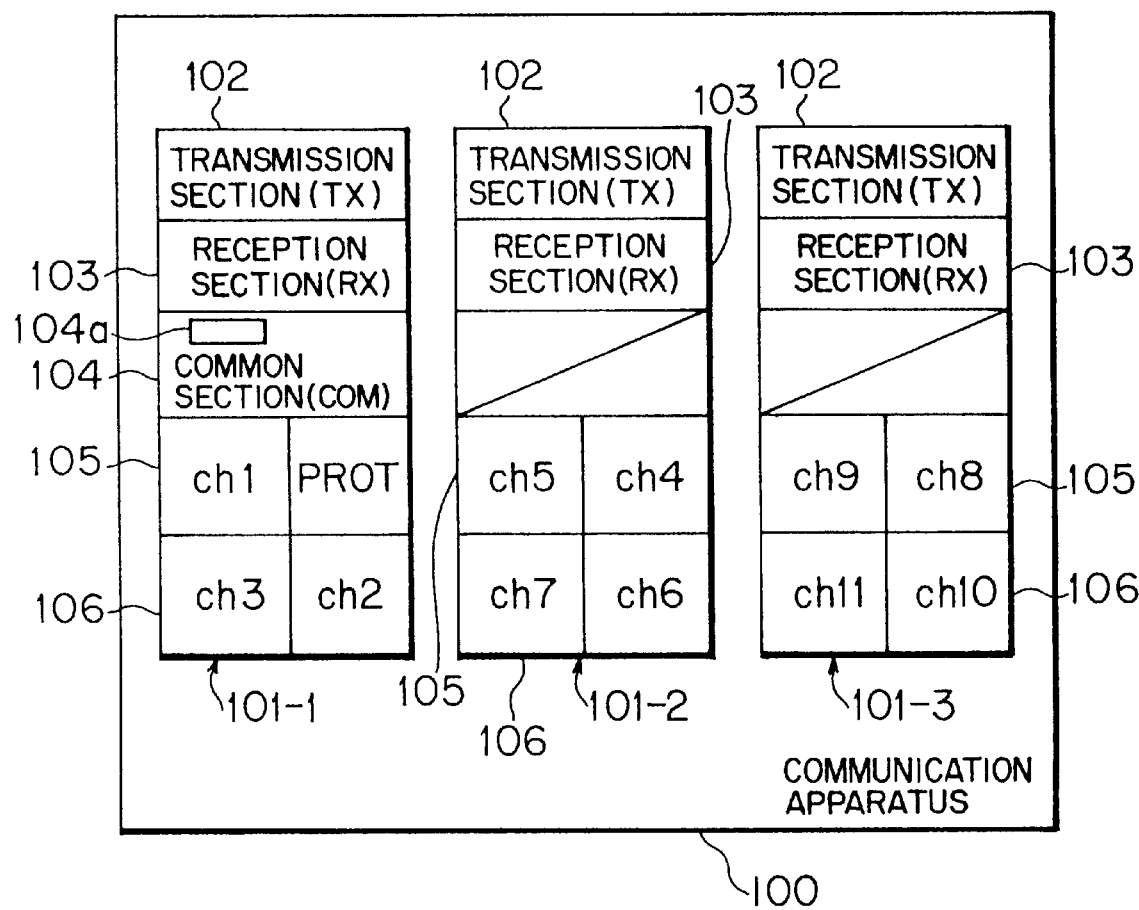
FIG. 50 is a diagram showing an example of a communication apparatus in which a plurality of cabinets form one NE.

The six shelves 24–29 have the same structure as the shelves 105 and 106 in the communication apparatus 100 shown in FIG. 50, which is formed, as a single unit apparatus, by three shelves 101-1–101-3. Each of the six shelves 24–29 accommodates, for instance, two channels.

In other words, the shelf 24 corresponds to the shelf 105 in the rack 101-1 in FIG. 50, the shelf 25 corresponds to the shelf 106 in the rack 101-1, the shelf 26 corresponds to the shelf 105 in the rack 101-2, the shelf 27 corresponds to the shelf 106 in the rack 101-2, the shelf 28 corresponds to the shelf 105 in the rack 101-3 and the shelf 29 corresponds to the shelf 106 in the rack 101-3.

The SEMU 20 and the shelves 24 and 25 can form a basic apparatus rack. The rack formed by the shelves 26 and 27 and the rack formed by the shelves 28 and 29 have a structure different from that of the basic apparatus rack, and additional channels can be mounted into these racks.

Each of the CH interface sections 30–35 functions as a second interface section for extension bus generation. Each of the CM interface sections 30–35 comprises a CM BUS (Channel Management Bus) conversion section 30a–35a which is connected to the CM BUS conversion circuit 22 via the CM bus 23, and the monitor/controlled object-side interface section 30b–35b which provides interface between the CM BUS conversion section 30a–35a and the monitor/controlled object 36–41.

Numeral 19 denotes a termination section for terminating the CM BUS 23 electrically.

Specifically, the CM BUS 23, which connects the CM BUS conversion circuit 22 of the SEMU 20 with CH interface sections 30–35, comprises thirteen signal lines (eight lines for address/data multiplex signals (AD0–AD7), one line for a data parity signal (ADP), one line for a READ/WRITE control signal (R/*W), one line for an address/data strobe signal (*AS), one line for an address/data multiplex timing signal (MUXTIM) and one line for a data acknowledgment signal (*DACK)).

The address/data multiplex signals (AD0–AD7) are used to transmit addresses and data. The data parity signal (ADP) indicates a parity for each byte of addresses and data. The READ/WRITE control signal (R/*W) indicates the kind of control to be performed by the CPU 21. The address/data strobe signal (*AS) indicates a period of time within which data are valid. The address/data multiplex timing signal (MUXTIM) indicates a timing at which data in each byte is to be latched. The data acknowledgment signal (*DACK) indicates that the CH side or the controlled side has completed reception of data.

Figure 4:
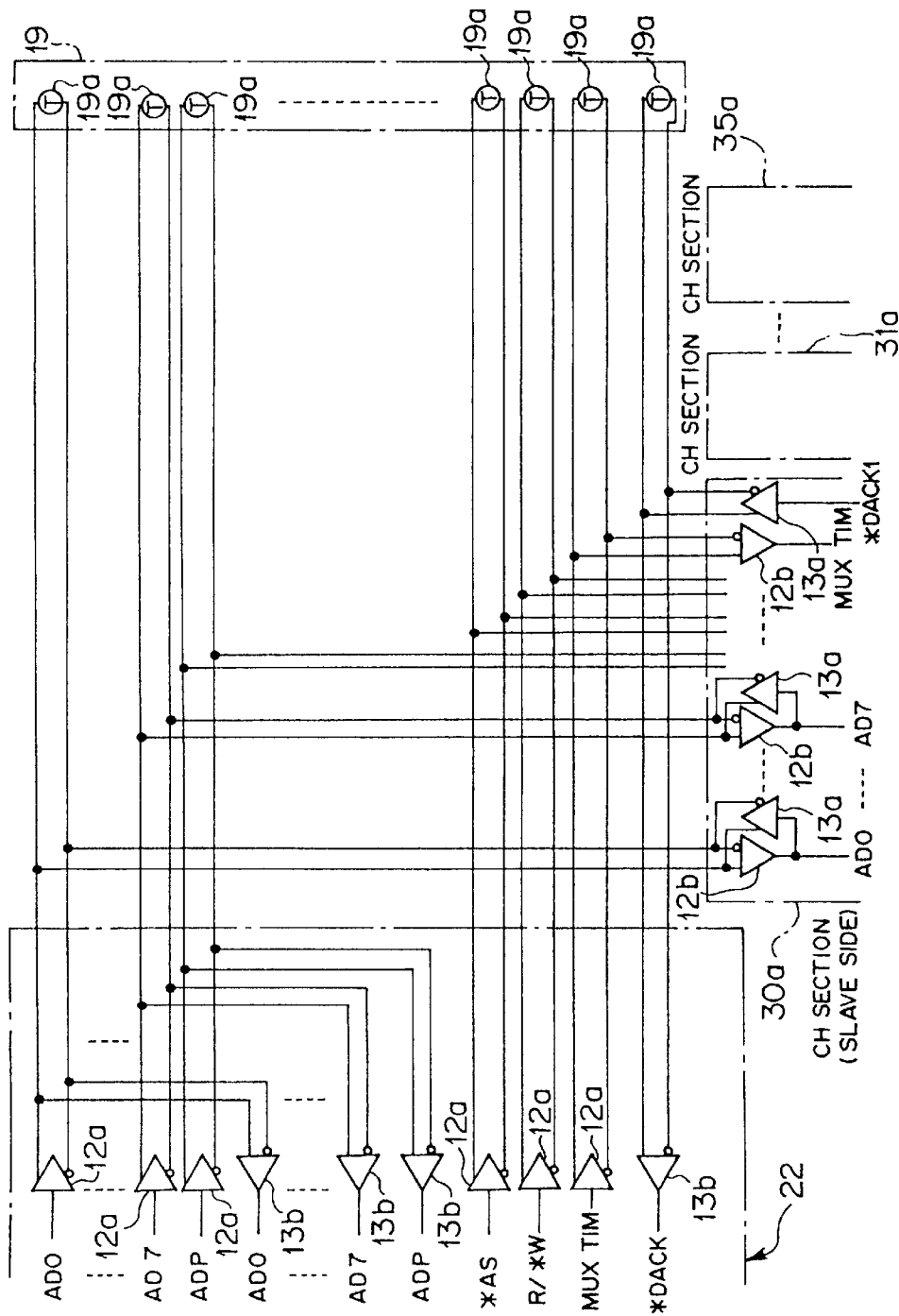
FIG. 4 is a diagram showing in detail the manner of connection of the CM bus according to the first embodiment of the present invention.

As specifically shown in FIG. 4, the CM bus 23 is connected to the CM BUS conversion circuit 22 of the SEMU 20 and the CM BUS conversion sections 30a–35a of the CM interface sections 30–35. Since the manner of connection to the CM BUS conversion sections 31a–35a is the same as that to the CM BUS conversion section 30a, the connection to the CM BUS conversion sections 31a–35a is not illustrated in FIG. 4.

The address/data multiplex signals (AD0–AD7), the data parity signal (ADP), the address/data strobe signal (*AS), the READ/WRITE control signal (R/*W), and the address/data multiplex timing signal (MUXTIM), which are all transmitted from the CM BUS conversion circuit 22, are respectively transmitted, in the form of differential signals, from twelve transmission-side differential amplifiers 12a. The thus transmitted signals are received by twelve reception-side differential amplifiers 12b in the CM BUS conversion section 30a.

The address/data multiplex signals (AD0–AD7), the data parity signal (ADP), and the data acknowledgment signal (*DACK), which are transmitted from CM BUS conversion section 30a, are also respectively transmitted, in the form of differential signals, from ten transmission-side differential amplifiers 13a, and are received by ten reception-side differential amplifiers 13b in CM BUS conversion circuit 22.

Numeral 19a denotes each of thirteen terminators which form a terminator 19. The terminators 19a terminate two signal transmission cables, which transmit respective signals.

Figure 5:
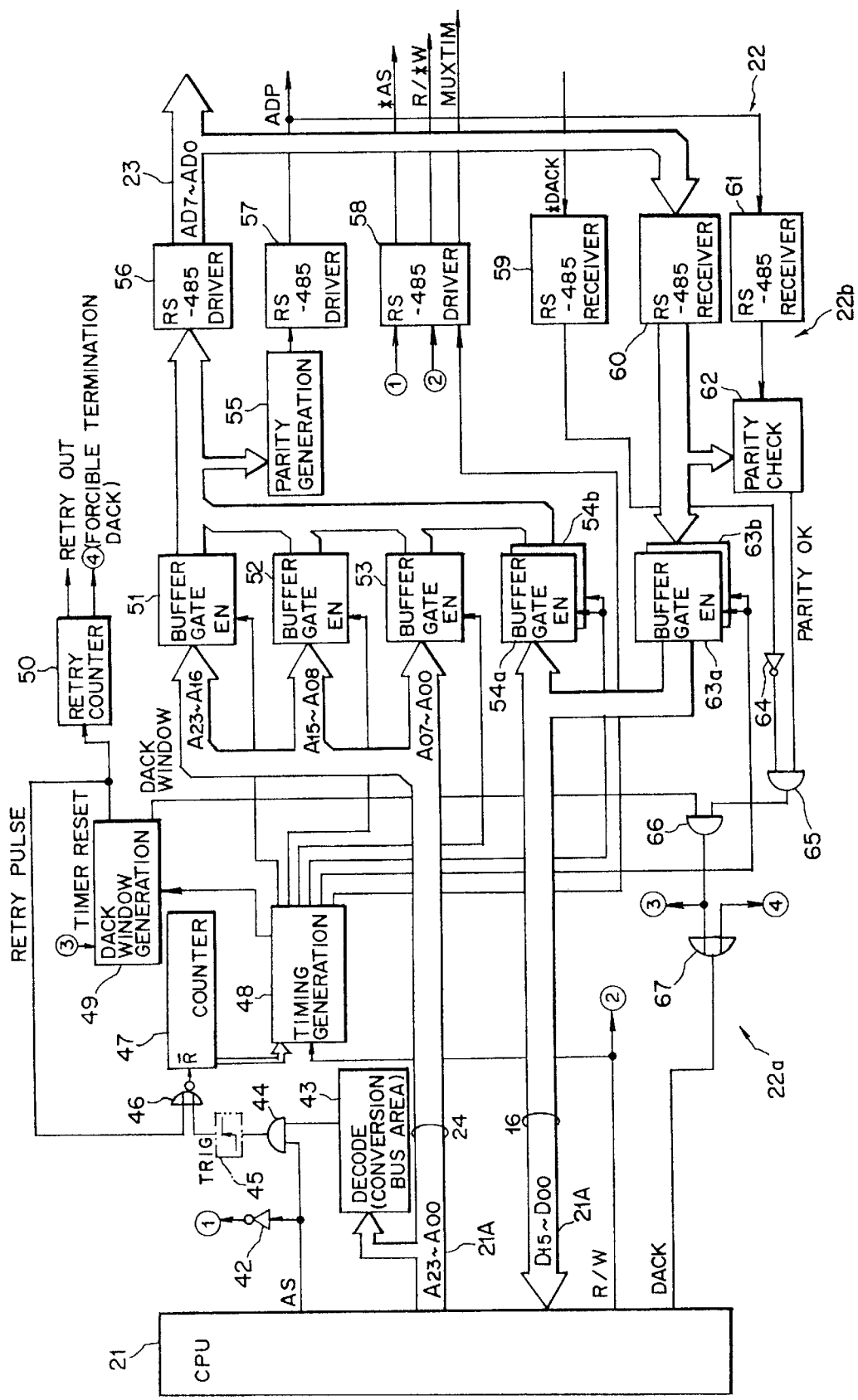
FIG. 5 is a block diagram showing an SEMU according to the first embodiment of the present invention.

The CM BUS conversion circuit 22 of the SEMU 20 also functions as a first interface section for extension bus generation. That is, when a signal is to be output to the CM BUS 23, the CM BUS conversion circuit 22 latches the address/data information eight bits at a time, and performs time division multiplexing, in a predetermined order, for a piece of information including eight bits so as to send it. The CM BUS conversion circuit 22 also sends control signals used for performing time division multiplexing together with the 8-bit information. Specifically, as shown in FIG. 5, the CM BUS conversion circuit 22 consists of a CM BUS conversion section 22a and a driver/receiver section 22b.

The CM BUS conversion section 22a consists of elements denoted by numerals 42–55 and 62–67, which will be described below in detail.

Numerals 51–54b (51–53, 54a and 54b) are buffer gates. When the buffer gates 51–54b output signals to the CM BUS 23, the buffer gates 51–54b serves as a latch section. That is, they latch a block of address/data information (e.g., information of 40 bits including 24-bit address information ($A_0$–$A_{23}$) and 16-bit data information ($D_0$–$D_{15}$)) at a time, which block of information includes a predetermined number of bits.

The buffer gate 51 latches an 8-bit address information block ($A_{23}$–$A_{16}$), the buffer gate 52 latches an 8-bit address information block ($A_{15}$–$A_{08}$), and the buffer gate 53 latches an 8-bit address information block ($A_{07}$–$A_{00}$). The buffer gates 54a and 54b latches a 16-bit data information block ($D_{15}$–$D_{00}$), wherein each of them latches eight bits.

Numerals 56–58 denote RS-485 drivers which form the driver/receiver section 22b. The RS-485 drivers 56–58 output a transmission signal from the CM BUS conversion circuit 22 to the shelves 24–29 via the CM BUS 23.

Numeral 42 denotes a NOT circuit for inverting the address/data strobe signal output from the CPU 21, numeral 43 denotes a decoder for decoding the 24-bit address information output from the CPU 21, numeral 44 denotes an AND circuit for outputting the result of the AND operation between the address/data strobe signal and the output from the decoder 43, and numeral 45 denotes a trigger-signal output section which outputs a trigger signal on the basis of the output from the AND circuit 44.

Numeral 46 denotes a NOR circuit which outputs to a counter 47 the result of the NOR operation between a retry pulse from a DACK window generation section 49, which will be detailed later, and a trigger signal from the trigger signal output section 45.

Numeral 48 denotes a timing generation section. Based on a count value from the counter 47 and a READ/WRITE control signal from the CPU 21, the timing generation section 48 generates a timing signal which indicates a timing at which a unit of data including one byte is to be latched, and outputs the timing signal to the buffer gates 51–54b and the RS-485 driver 58. After the timing signal is output, the timing generation section 48 outputs to the DACK window generation section 49 a DACK window trigger signal, which severs as a trigger signal for performing window processing.

When signals from the timing generation section 48 are input to the buffer gates 51–54b as enable information, the buffer gates 51–54b perform time division multiplexing for 8-bit information in a predetermined order so as; to transmit them, as address/data multiplex signals (AD7–AD0), to the shelves 24–29 via the RS-485 driver 56 and the CM BUS 23.

The RS-485 driver 58 receives the address/data strobe signal inverted by the NOT circuit 42 and the READ/WRITE control signal output from the CPU 21 and transmits them to the shelves 24–29 via the CM bus 23. As a result, control signals (*AS, R/W, MUXTIM) required to perform time-division-multiplex communication can be transmitted together with the transmission of the 8-bit information.

In other words, since a bus which complies with a standard regarding mutual connection between several apparatuses in a data communication system is used as the CM BUS 23, it is possible to send and receive units of information each including 8 bits as well as control signals.

Therefore, the NOT circuit 42, the decoder 43, the AND circuit 44, the trigger signal output section 45, the NOR circuit 46, the counter 47, the timing generation section 48, the buffer gates 51–54b, and the RS-485 drivers 56 and 58 collectively function as a bus transmission section, which performs time division multiplexing for 8-bit information in a predetermined order and send it and which sends control signals required to perform time-division-multiplex communication together with the 8-bit information.

Numeral 55 denotes a parity generation section which generates a parity signal on the basis of address/data signals from the buffer gates 51–54b. The generated parity signal is output to shelves 24–29 as a data parity signal.

Therefore, the parity generation section 55 and the RS-485 driver 57 function as a first error-detection-bit addition section which adds an error detection bit to each piece of information which includes eight bits.

The DACK window generation section 49 performs the following window processing. When a DACK window trigger signal is input from the timing generation section 48, the DACK window generation section 49 outputs a DACK window signal to an AND circuit 66, which will be detailed later, so as to accept a DACK signal only within a predetermined period of time.

In detail, the DACK window generation section 49 has an unillustrated timer for clocking a period of time during which the DACK window processing is performed. In this timer is set a predetermined DACK signal send-back time which corresponds to the entire length of the CM BUS 23 and during which a DACK signal sent back from the shelves 24–29 is accepted. The DACK window generation section 49 operates on the basis of the count value of the timer so as to accept the DACK signals only within the predetermined period of time.

Numerals 59–61 denote RS-485 receivers which form the driver/receiver section 22b. The RS-485 receiver 59 receives a data acknowledgment signal (*DACK) from the shelves 24–29, the RS-485 receiver 60 receives address/data signals on the CPU bus 23, and the RS-485 receiver 61 receives a data parity signal from the RS-485 driver 57.

In particular, the RS-485 receiver 60 receives address/data signals from the shelves 24–29 and also receives address/data information from the RS-485 driver 56.

Numeral 62 denotes a parity check section which inputs address/data signals received by RS-485 receiver 60 and performs parity check operation.

Numerals 63a and 63b denote buffer gates. Like the buffer gates 54a and 54b, the buffer gates 63a and 63b temporarily store data signals from the RS-485 receiver 60 eight bits at a time. When a timing signal is input from the timing generation section 48 as enable information, the buffer gates 63a and 63b output to the CPU 21 the temporarily stored address/data signals.

Numeral 64 denotes a NOT circuit for inverting a data acknowledgment signal from the RS-485 receiver 59, numeral 65 denotes an AND circuit for outputting the result of the AND operation between an output signal from the NOT circuit 64 and a parity OK signal from the parity check section 62.

An AND circuit 66 outputs to an OR circuit 67 the result of the AND operation between an output signal from the AND circuit 65 and a DACK window signal from the DACK window generation section 49, which will be described later. The AND circuit 66 also outputs the result of the AND operation to the DACK window signal generation section 49 as a timer reset signal.

The OR circuit 67 outputs the result of the OR operation between an output signal from the AND circuit 66 and a forcible-termination DACK signal from a retry counter 50, which will be described later.

The DACK window generation section 49 outputs a retry pulse to the NOR circuit 46 and the retry counter 50 when a timer reset signal is supplied from the AND circuit 66.

Thus, the NOR circuit 46, which has received the retry pulse, outputs a signal to the timing generation section 48 via the counter 47 so as to notify the timing generation section 48 of the reception of the retry pulse. As a result, the output signals which were output from RS-485 drivers 56–58 can be output again in accordance with the timing signals generated by the timing generation section 48.

The AND circuit 66 outputs an "H" level signal to the OR circuit 67 only when a data acknowledgment signal ("H" level signal) is input from the AND circuit 65 in a state in which the DACK window signal from the DACK window generation section 49 is at the "H" level.

In other words, after signals are output from the RS-485 drivers 56–58 to the shelves 24–29, the DACK window signal ("H" level signal) is output for a predetermined period of time on the basis of the count value of the timer, so as to wait for a data acknowledgment signal (permission signal) from shelves 24–29, which will be described later.

When no permission signal is received within the predetermined period of time, the timer in the DACK window generation section 49 is reset by an output signal (timer reset signal) from the AND circuit 66. When a retry pulse is output from the DACK window generation section 49, the RS-485 drivers 56–58 again output the same output signals as those which were sent to the shelves 24–29.

When the parity check section 62 finds a parity error, information indicating the occurrence of the parity error is output, as a timer reset signal, to the DACK window generation section 49 via the AND circuits 65 and 66, so that the timer in the DACK window generation section 49 is reset.

As in the above-described case, the DACK window generation section 49 outputs a retry pulse to the NOR circuit 46 and the retry counter 50. Thus, a CPU cycle is again executed, so that the RS-485 drivers 56–58 again output the same output signals as those which were sent to the shelves 24–29.

At this time, the shelf 24–29, which has received signals from the RS-485 drivers 56–58 in a previous operation cycle, outputs to the CM BUS conversion section 22 a data acknowledgment signal, as will be detailed later. However, this data acknowledgment signal is ignored at the AND circuit 65.

In other words, when the parity check section 62 of the CM BUS conversion circuit 22 in the SEMU 20 detects an error in read-out data information from the shelves 24–29 after the SEMU 20 outputs signals to the CM BUS 23, a data acknowledgment signal (permission signal) from the shelves 24–29 is ignored and the same signals as those which were sent from the SEMU 20 to the CM bus 23 are again output.

When the entire length of the CM BUS 23 is input through, for example, the firmware or software of the CPU 21, the predetermined period of time, which is clocked by the timer in the DACK window generation section 49 and during which a DACK signal is accepted, is changed in accordance with the input value.

When the CM BUS 23 has an entire length of 50 m, for example, a delay of about 200 nanoseconds is produced in one direction. Accordingly, a delay of 200 nanoseconds is produced during transmission of data (address and write-in data) from the CPU 21 to the CH interface sections 30–35, and a delay of 200 nanoseconds is produced during transmission of a signal (DACK signal) from the CH interface sections 30–35 to the CPU 21. Therefore, the CPU 21 is required to set the predetermined period of time for reception of the DACK signal to 400 nanoseconds +α, where α is a predetermined margin.

Therefore, the CPU 21 functions as an entire-length input section for inputting the entire length of the CPU bus 23, as well as a function as a waiting-time changing section which changes the predetermined period of time for reception of a DACK signal in accordance with the entire length input.

The retry counter 50 counts retry pulses input from the DACK window generation section 49. When the number of the retry pulses input to the DACK window generation section 49 reaches a predetermined value, the DACK window generation section 49 outputs a retry out signal and also outputs a forcible-termination DACK signal to the OR circuit 67.

That is, in the case where no permission signal is received from the shelves 24–29 even when the SEMU 20 outputs a signal to the shelves 24–29 via CM bus 23 a predetermined number of times, the retry counter 50 outputs a retry out signal to the OR circuit 67, so that the OR circuit outputs a forcible-termination DACK signal. Thus, even when no DACK signal is received, a signal serving as the DACK signal can be output to the CPU 21.

When the CPU 21 receives the forcible-termination DACK signal, the CPU 21 recognizes the signal as occurrence of a bus failure and notifies an external device of the bus failure as an apparatus failure.

Figure 6:
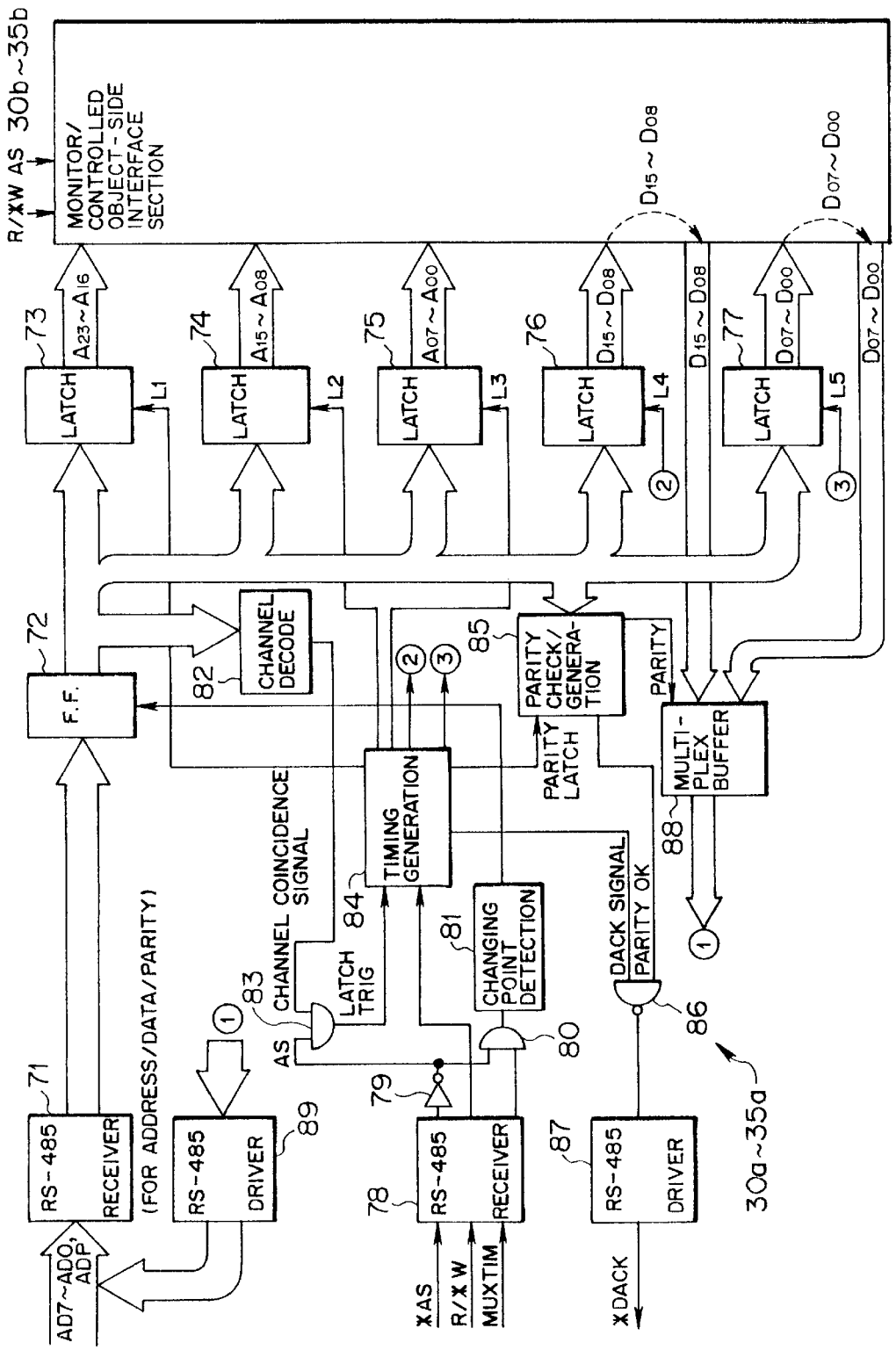
FIG. 6 is a block diagram showing a CH interface section according to the first embodiment of the present invention.

Each of the CM conversion sections 30a–35a of the CH interface sections 30–35 in the shelves 24–29 functions as a second interface section for extension bus generation section and has a structure shown in FIG. 6, for example. That is, each of the CM conversion sections 30a–35a receives address/data information and control signals transmitted from the CM interface section 21 of the SEMU 20, and determines whether the received information is directed to the shelve to which the CM conversion section belongs. When it is judged that the received information is normal information directed to a controlled object in the shelve to which the CM conversion section belongs, the CM conversion section sends a permission signal back to the SEMU 20.

In the FIG. 6, numeral 71 denotes a RS-485 receiver which receives address/data information (AD7–AD0) and a parity signal (ADP) from the CM BUS conversion circuit 22 via the CM bus 23.

Numeral 72 denotes a flip-flop circuit which fetches in address/data information (AD7–AD0) received by the RS-485 receiver 71. When a signal serving as timing information is supplied from a changing point detection section 81, which will be detailed later, to the flip-flop circuit 72, the flip-flop circuit 72 outputs the address/data information (AD7–AD0) to the latch sections 73–77.

The latch sections 73–77 separate the multiplexed address/data information (AD7–AD0) and store the separated pieces of information. Specifically, the latch section 73 latches 8-bit address information ($A_{23}$–$A_{16}$), the latch section 74 latches 8-bit address information ($A_{15}$–$A_{08}$), the latch section 75 latches 8-bit address information ($A_{07}$–$A_{00}$), the latch section 76 latches 8-bit data information ($D_{15}$–$D_{08}$), and the latch 77 latches 8-bit data information ($D_{07}$–$D_{00}$).

Numeral 78 denotes a RS-485 receiver which receives control signals (*AS, R/*W, MUXTIM) from the CM BUS conversion circuit 22 together with the above-described address/data information.

Therefore, the RS-485 receivers 71 and 78 function as a receiver which receives address information and control signals transmitted from the CM BUS conversion circuit 22 of the SEMU 20.

Numeral 79 denotes a NOT circuit for inverting an address/data strobe signal from the RS-485 receiver 78. Numeral 80 denotes an AND circuit which outputs the result of the AND operation between an output signal from the NOT circuit 79 and an address/data multiplex timing signal (MUXTIM) from the RS-485 receiver 78.

Based on the signals from the AND circuit 80, the changing point detection section 81 detects changing points of 40-bit address/data information which includes five divided pieces of information each including 8 bits and which is sent from the CM bus conversion circuit 22. Information indicating the detected change points (change point detection information) is supplied to the flip-flop circuit 72.

When the flip-flop circuit 72 receives the changing point detection information from the changing point detection section 81, the flip-flop circuit 72 outputs the stored 8-bit information to the latch sections 73–77. With this operation, one of the divided 8-bit information units can be stored in desired one of the latch sections 73–77.

Numeral 82 denotes a decoder which decodes channel information from the flip-flop circuit 72 and subsequently determines whether the channel number represented by the channel information coincides with a channel number stored in the decoder 72. Numeral 83 denotes an AND circuit which obtains the result of the AND operation between the address/data strobe signal and an output from the decoder 80 and outputs the result of the AND operation as a trigger signal.

That is, the decoder 82 determines whether or not a channel number decoded from the channel information received from the flip-flop circuit 72 coincides with the channel number stored in the decoder 82. When both the channel numbers do not coincide with each other, the AND circuit 83 does not output a latch trigger signal to the timing generation section 84. Accordingly, the decoder 82 and the AND circuit 83 function as a judgment section which judges whether the received information is information directed to the shelf to which the judgment section belongs.

Numeral 84 denotes a timing generation section. Based on the READ/WRITE control signal from the RS-485 receiver 78 and the trigger signal from the AND circuit 83, the timing generation section 84 outputs to the latch sections 73–77 signals (latch signals) each of which indicates data latch timing for each byte. After outputting the latch signal, the timing generation section 84 outputs a DACK signal to a NAND circuit 86, which will be described later, and also outputs a parity latch signal which is used in a parity check/generation section 85, which will be described later, so as to output a parity signal.

That is, when signals from the timing generation section 84 are supplied to the latch sections 73–77 as output timing information, the latch sections 73–77 output 8-bit pieces of information in a predetermined order to the monitor/controlled object-side interface sections 30a–35b.

The timing generation section 84 outputs parity latch signals to the parity check/generation section 85 on the basis of the READ/WRITE control signal, which is input through the RS-485 receiver 78. While the CPU 21 performs write control, all the signals, each of which indicates latch timing for each byte of address/data information, are output as the parity latch signals from the timing generation section 84 to the parity check/generation section 85. While the CPU 21 performs read control, only the signals, each of which indicates latch timing for each byte of address information, are output as the parity latch signals from the timing generation section 84 to the parity check/generation section 85.

The parity check/generation section 85 also has a parity check function, as well as a parity information generation function which generates a parity signal as an error detection bit and outputs it to a multiplex buffer 88, which will be described later.

That is, when a parity latch signal from the timing generation section 84 is input to the parity detection/generation section 85, the parity detection/generation section 85 performs parity check for the address/data signals (AD7–AD0) and the data parity signal (ADP), which are received by the RS-485 receiver 71 and are supplied to the parity detection/generation section 85 via the flip-flop circuit 72. The result of the parity-check is output to the NAND circuit 86.

In other words, when the CM BUS conversion sections 30a–35a receive address/data signals and control signals from the CM BUS conversion circuit 22, the parity check/generation section 85 detects an error in address information of three blocks or an error in write-in data information from the CPU 21. This parity check is performed on the basis of the data parity signal (ADP) added to the information received by the RS-485 receiver 71.

The NAND circuit 86 inputs a signal indicating the result of the parity check from the parity check/generation section 85, as well as the DACK signal from the timing generation section 84. When the result of the parity check is OK, the NAND circuit 86 outputs an inverted DACK signal to the RS-485 driver 87. When the result of the parity check is NG, the NAND circuit 86 does not output the inverted DACK signal to the RS-485 driver 87.

The RS-485 driver 87 receives a signal from the NAND circuit 86. Therefore, the RS-485 driver 87 receives an inverted DACK signal from the AND gate 86 when the result of the parity check is OK, and sends it to the CM BUS conversion circuit 22 as a data acknowledgment signal (*DACK).

That is, when an error is detected by the parity check at the above-described parity check/generation section 85, each of the monitor/controlled object-side interface sections 30b–35b is controlled not to access the monitor/controlled objects 36–41 connected thereto, and a parity NG signal is output to the NAND circuit 86 so as to prevent a DACK signal (permission signal) from being transmitted to the NAND circuit 86.

Therefore, the timing generation section 84, the parity check section 85, the NAND circuit 86, and the RS-485 driver 87 function as a permission signal send-back section which sends a DACK signal back to the SEMU 20, as a permission signal, when the decoder 82 and the AND circuit 83 determines that the received signal is normal information directed to the monitor/controlled objects 36–41 in the shelf to which the permission signal send-back section belongs.

Numeral 88 denotes a multiplex buffer. When CPU 21 performs the read-out control, the multiplex buffer 88 receives read-out data ($D_{15}$–$D_{08}$ and $D_{07}$–$D_{00}$) from the monitor/controlled object 36–41 via the monitor/controlled object-side interface section 30b–35b, and multiplexes the read-out data together with a parity bit generated by the parity check/generation section 85 so as to output the multiplexed data to the RS-485 driver 89.

The RS-485 driver 89 transmits the multiplexed data output from the multiplex buffer 88 to the SEMU 20 via the CM bus 23.

Therefore, the above-described parity check/generation section 85, the multiplex buffer 88, and the RS-485 driver 89 function as a second error-detection-bit addition section, which adds an error detection bit to multiplexed data and transmits it.

The operation of the control system according to the first embodiment of the present invention having the above-described structure will now be described in detail with reference to the timing charts shown in FIGS. 7 and 8 and the flowchart shown in FIG. 9.

First, a description will be given of the case where address/data are output to a desired channel so as to perform write-in control. In this case, the CPU 21 sends address/data through the CM bus 23 to one of the shelves 24–29 which accommodates the desired channel.

In detail, when the CPU 21 in the SEMU 20 outputs a signal which is to be transmitted to the desired channel, the signal to be transmitted is converted to an 8-bit serial signal by the CM BUS conversion circuit 22. The 8-bit serial signal, together with control signals, are transmitted through the CM bus 23 to one of the shelves 24–29 which accommodates the desired channel.

Figure 7:
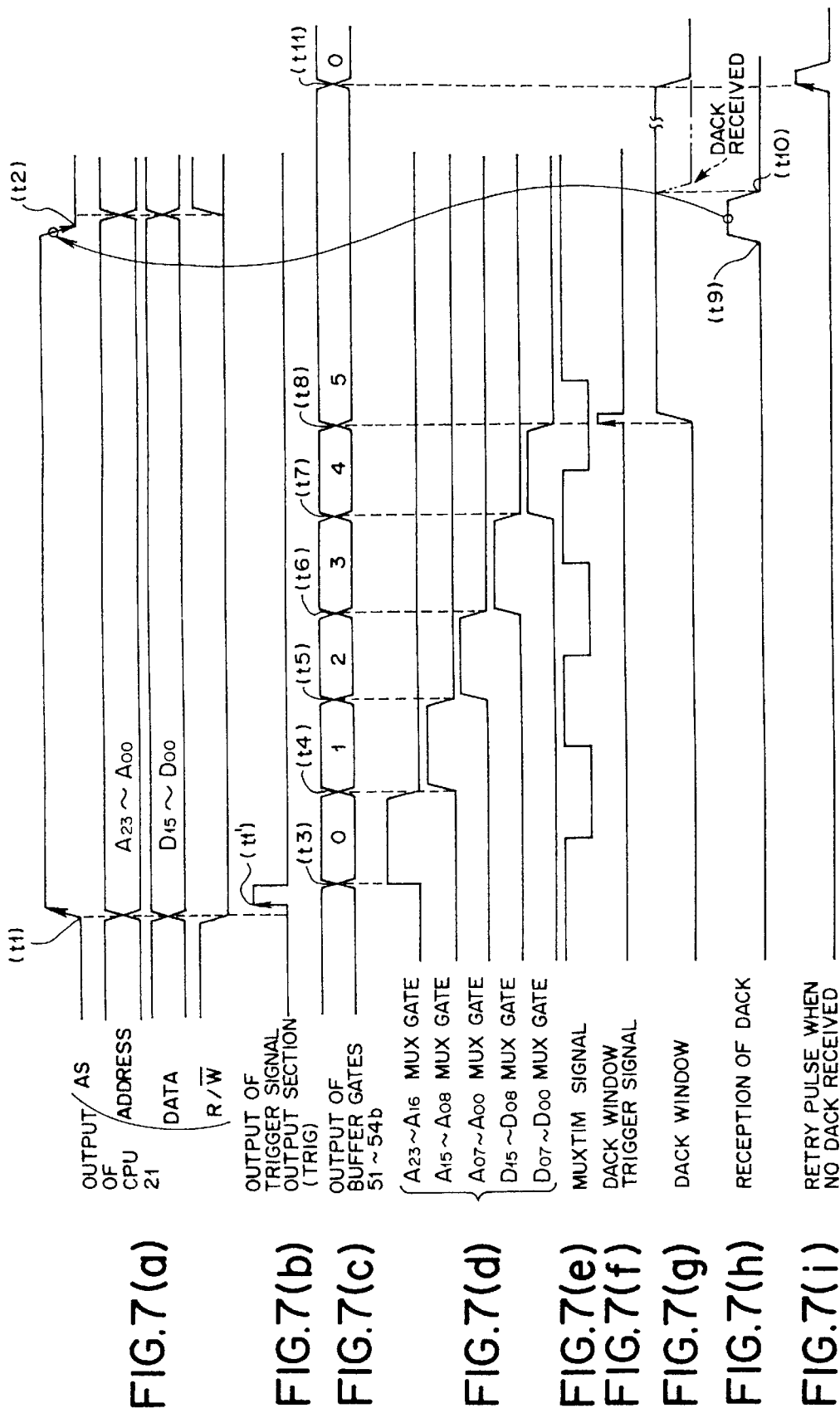
FIG. 7(a)–FIG. 7(i) are timing diagrams for explaining the operation of a CM BUS conversion section at the SEMU according to the first embodiment of the present invention.

Specifically, the CPU 21 outputs 40-bit address/data information along with control signals (an address/data strobe signal (AS) and a READ/WRITE control signal (R/W)) (see the period of time between (t1) and (t2) in (a) of FIG. 7). The thus-output address/data information are latched by the buffer gates 51–54b such that the buffer gates 51–54b hold different 8-bit pieces of the information.

When the level of the address/data strobe signal rises after the above-described address/data information is latched, the trigger signal output section 45 in the CM BUS conversion circuit 22 outputs a trigger signal (see point in time (t1') in (b) of FIG. 7). Based on the timing information generated by the timing generation section 48, address/data latched by the buffer gates 51, 52, . . . , 54a, 54b are successively transmitted in the form of a serial signal via the RS-485 driver 56 and the CM bus 23.

In detail, the address information ($A_{23}$–$A_{16}$) stored in the buffer gate 51 is output on the basis of the timing information from the timing generation section 48 (see the period of time between (t3) and (t4) in (c) and (d) of FIG. 7).

Similarly, the address information ($A_{15}$–$A_{08}$) stored in the buffer gate 52 is output during the period of time between (t4) and (t5) in (c) and (d) of FIG. 7, the address information ($A_{07}$–$A_{00}$) stored in the buffer gate 53 is output during the period of time between (t5) and (t6) in (c) and (d) of FIG. 7.

The data information ($D_{15}$–$D_{08}$) stored in the buffer gate 54a is output during the period of time between (t6) and (t7) in (c) and (d) of FIG. 7, and the data information ($D_{07}$–$D_{00}$) stored in the buffer gate 54b is output during the period of time between (t7) and (t8) in (c) and (d) of FIG. 7.

Further, control signals (address/data strobe signal (*AS), READ/WRITE control signal (R/*W), and address/data multiplex timing signal (MUXTIM)) required to perform time-division-multiplex communication are transmitted for each data block synchronously with transmission thereof (see (a) and (e) of FIG. 7).

The parity generation section 55 generates a data parity signal (ADP) on the basis of the address/data information output from the buffer gates 51 to 54b. The thus-generated data parity signal is also transmitted along with the above-described address/data information and control signals.

After outputting a signal which indicating data latch timing, the timing generation section 48 outputs a trigger signal to the DACK window generation section 49 so as to cause the DACK window generation section 49 to perform DACK window processing (see point in time (t8) in (f) of FIG. 7).

Thus, the DACK window generation section 49 outputs a DACK window signal ("H" level signal) to the AND circuit 66, so that the DACK window generation section 49 enters a state for waiting for a DACK signal (see point in time (t8) in (g) of FIG. 7).

Figure 8:
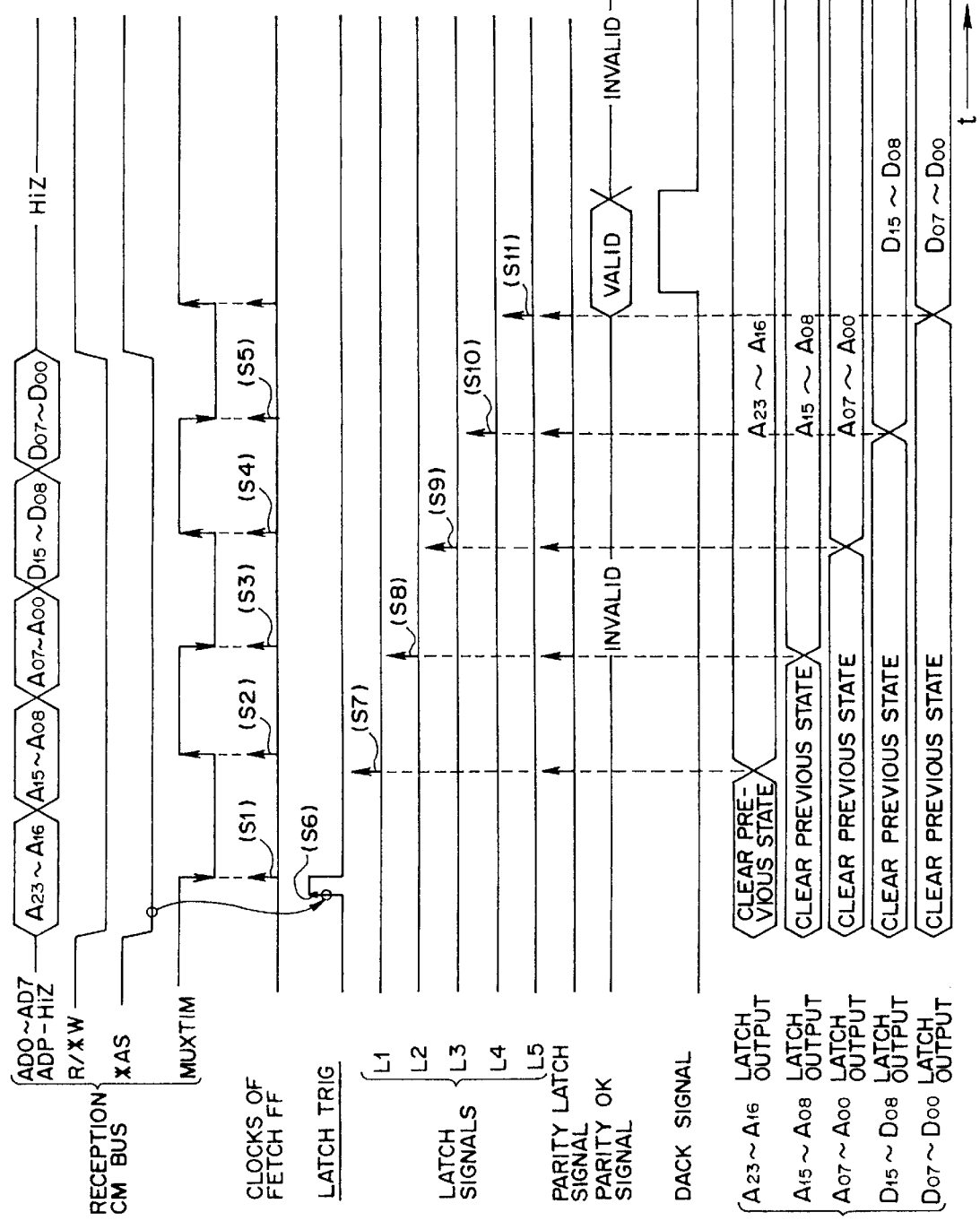
FIG. 8(a)–FIG. 8(h) are timing diagrams for explaining the operation of a CM BUS conversion section at the CH interface section according to the first embodiment of the present invention.

The signals transmitted from the SEMU 20 via CM bus 23 are received by the RS-485 receivers 71 and 78 of the CM BUS conversion section 30a–35a in one of the shelves 24–29 which accommodates the desired channel (see (a) of FIG. 8).

Moreover, the AND circuit 80 of the CM BUS conversion section 30a–35a receives the data multiplex timing signal (MUXTIM) via the RS-485 receiver 78 and also receives an inverted strobe signal. The data strobe signal (*AS) becomes effective when it is in the "L" level. That is, when the data strobe signal (*AS) is low, the data multiplex timing signal is output from the AND circuit 80.

The changing point detection section 81 inputs the data multiplex timing signal from the AND circuit 80, and when a changing point is detected, the changing point detection section 81 outputs pulse signals to the flip-flop circuit 72, in which the pulse signals are used as flip-flop clocks (see points in time between (s1), (s2), . . . , (s5)).

Since the flip-flop circuit 72 has taken in the address/data signals (including the data parity signal) which was received by the RS-485 receiver 71, the flip-flop circuit 72 outputs them to the latch sections 73–77 in accordance with the flip-flop clocks. Thus, the latch sections 73–77 can fetch the multiplexed address/data information (AD7–AD0) in a separated manner.

When the AND circuit 83 of the CM BUS conversion section 30a–35a receives a channel coincidence signal, which indicates that the received address/data signals are directed to the channel of the shelve to which the CM BUS conversion section belongs and also receives the address/data strobe signal (AS), the AND circuit 83 outputs a latch trigger signal (LATCH TRIG) (see point in time (s6) in (c) of FIG. 8).

When the timing generation section 84 receives the latch trigger signal, the timing generation section 84 outputs signals (L1–L5), each of which indicates latch timing, to the latch sections 73–77, and also outputs a parity latch signal to the parity check/generation section 85 so as to perform parity check in the parity check/generation section 85 (see points in time (s7), (s8), . . . , (s11) of (d) and (e) of FIG. 8).

The latch sections 73–77 output data to a channel, which is a desired one of the monitor/controlled objects 36–41, via the monitor/controlled object-side interface section 30b–35b in accordance with signals indicating latch timings output from the timing generation section 84 (see points in time (s7), (s8), . . . , (s11) in (h) of FIG. 8)

The parity check/generation section 85, which has received the parity latch signal output from the timing generation section 84, checks the data parity signal from the flip-flop circuit 72. When all the forty bits of the received address/data information are normal, a parity OK signal is output (see (f) of FIG. 8).

The NAND circuit 86 outputs a data acknowledgment signal (*DACK) serving as a permission signal via the RS-485 driver 87, only when it simultaneously receives the parity OK signal from the parity check/generation section 85 and the DACK signal from the timing generation section 84, which DACK signal is output after the signals indicating latch timings are output (see (g) of FIG. 8). Thus, in each cycle of the CPU 21, the CH interface sections 30–35 can inform the SEMU 20 of completion of reception of normal signals directed to the channel of the shelf to which the CH interface section belongs.

Therefore, on the basis of the data acknowledgment signal, it is possible to determine whether or not signals transmitted from the CPU 21 to the shelves 24–29 were normal.

When the data acknowledgment signal (*DACK) is output to the CM BUS conversion circuit 22 of the SEMU 20 in the above-described manner, the CM BUS conversion circuit 22 receives the DACK signal if the CM BUS conversion circuit 22 is in a state in which it can receive the DACK signal (i.e. in a state in which the DACK window generation section 49 is outputting a DACK window signal to the AND circuit 66). When the CM BUS conversion circuit 22 receives the DACK signal (see the period of time between (t9) and (t10) in (h) of FIG. 7), the DACK window signal becomes the "L" level (see a dotted line in (g) of FIG. 7).

Figure 9:
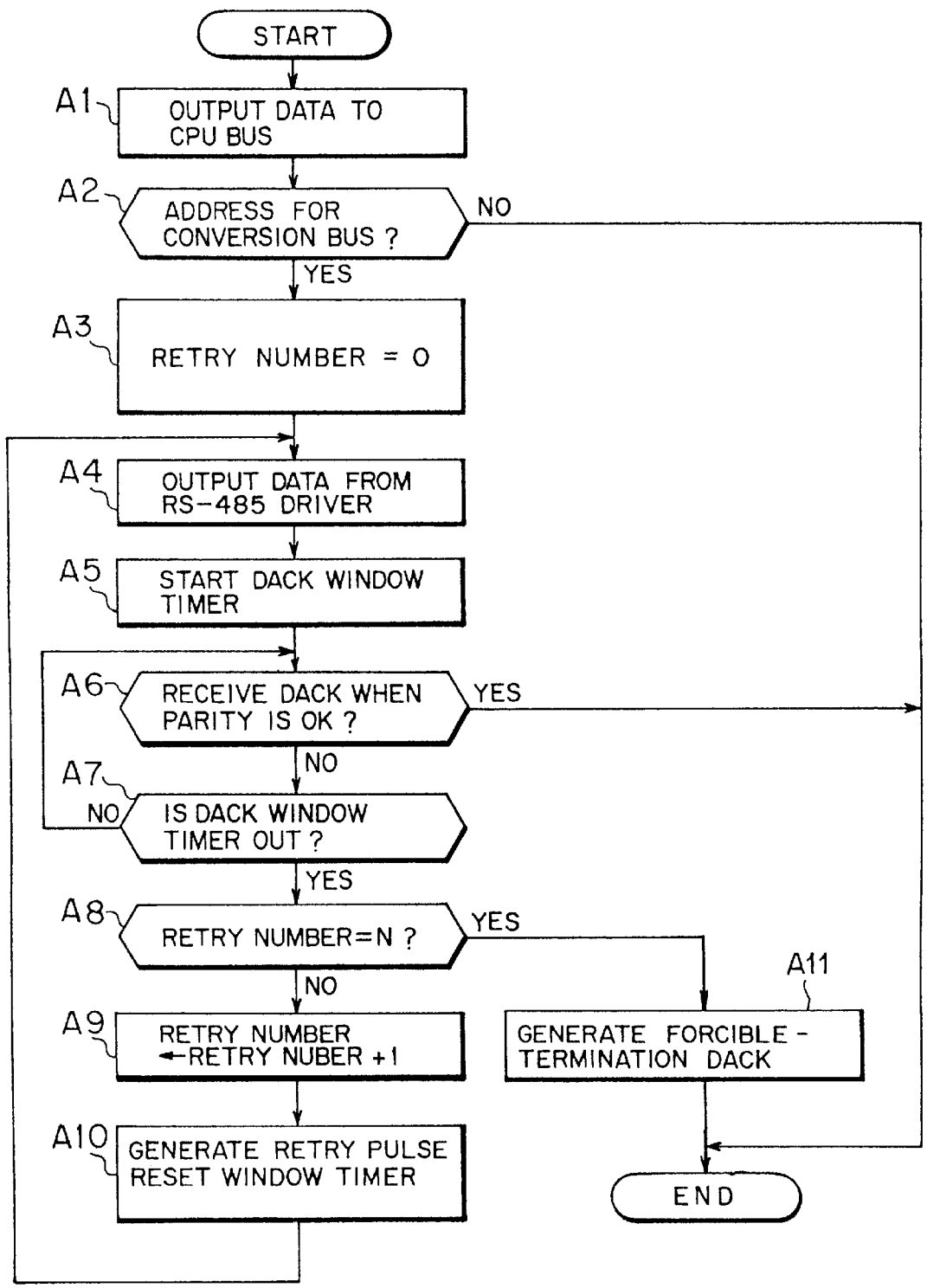
FIG. 9 is a flowchart for explaining processing for signal retransmission according to the first embodiment of the present invention.

In the case where the CM BUS conversion circuit 22 does not receive the DACK signal even through it is in the DACK signal receivable state, the CM BUS conversion circuit 22 again sends the same address/data as those which were transmitted via the CM bus 23 to the shelf 24–29 which accommodates the desired channel, as shown in the flowchart shown in FIG. 9.

That is, as described above, data is output from the CPU 21 of the SEMU 20 to the CM BUS conversion circuit 22 via the CPU bus 21A (step A1).

When the address information of the data output to the CPU bus 21A is the address that must be output to the CM bus 23 (the "Yes" route of step A2), the retry number (i.e. the number of times of data retransmission to the CM bus 23), which is counted by the retry counter 50, is set to "0" (step A3). Subsequently, the RS-485 drivers 56–58 send the data to the CM bus 23 in the above-described manner (step A4).

Subsequently, the DACK window generation section 49 outputs a DACK window signal to the AND circuit 66 (see (g) of FIG. 7) so as to start window processing for receiving a DACK signal from the shelf 24–29 which accommodates a channel to which the data is to be transmitted. Simultaneously with this, the timer is started to clock the predetermined period of time during which the window processing is to be performed (step A5).

Until it is judged through clocking by the time that the predetermined period of time has elapsed, reception of a DACK signal is waited (loop formed by the "NO" route of step A6 and the "NO" route of step A7)). When the DACK signal is received before the predetermined period of time has elapsed, the SEMU 20 does not retransmit the data (the "YES" route of step A6). When the DACK signal is not received even after the predetermined period of time has elapsed, the SEMU 20 retransmits the data (the "YES" route of step A7).

That is, when the retry number is not greater than a predetermined number N (where N is a natural number), "1" is added to the retry number counted by the retry counter 50. Subsequently, a retry pulse is output from the DACK window generation section 49, and the period of time for the window processing clocked by the timer is reset (step A10, see point in time (t11) in (f) and (i) of FIG. 7.

Thus, the same date as the previously transmitted data is again transmitted through the CM bus 23 to the shelf 24–29 which accommodates the desired channel. Subsequently, as in the above-described case, reception of a DACK signal is waited so as to receive it (from step A10 to step A4, see point in time (t11) in (c) of FIG. 7).

When it is judged at step A8 that the above-described retransmission from the CM BUS conversion circuit 22 has been repeated N times, the retry counter 50 outputs a retry-out signal to the OR circuit 67 so as to perform recovery processing. Thus, the OR circuit 67 generates a forcible-termination DACK signal and outputs it to the CPU 21 (step A11). This allows the CPU 21 to notify it to the outside as a bus failure.

Unlike the case of write-in control wherein data information is output, data information is not output from the CPU 21 when read-out control is performed in which the CPU 21 outputs only the address to the desired channel. Accordingly, the CM BUS conversion circuit 22 has a structure such that address information, a parity signal for the address information, and control signals similar to those used in the write-in control are output to the CM bus 23.

In the CM BUS conversion section 30a–35a, address information is output from the latch sections 73–75 to a desired monitor/controlled object 36–41 via the monitor/controlled object-side interface section 30b–35b. The monitor/controlled object 36–41 outputs through the monitor/controlled object-side interface section 30b–35b to the multiplex buffer 88 read-out information which corresponds to the input address information.

The multiplex buffer 88 multiplexes the read-out information, which is input through the monitor/controlled object-side interface section 30b–35b, together with a parity signal generated by the parity check/generation section 85, and transmits the multiplexed information including the parity signal to the CM BUS conversion circuit 22 via the RS-485 driver and the CM bus 23.

The parity check/generation section 85 performs parity check for the address information output from the CPU 21. When the parity is OK, a data acknowledgment signal (*DACK) is output through the NAND circuit 86, the RS-485 driver 87, and the CM bus 23, as a permission signal which indicates that normal address information has been received.

Therefore, using this data acknowledgment signal, it is possible to judge whether the signals transmitted from the CPU 21 to the shelves 24–29 were normal. Moreover, it is possible to judge whether the data sent back from the shelves 24–29 to the CPU 21 is normal.

The parity check section 62 of the CM BUS conversion circuit 22 performs parity check for the read-out data received via the CM bus 23 and the RS-485 receiver 60. When the result of the parity check is NG (even through a data acknowledgment signal is received), the processing for retransmission of address information, which is similar to that shown in the flowchart of FIG. 9, is repeated until the result of the parity check becomes OK.

As described above, in the control system capable of coping with bus extension according to the first embodiment of the present invention, the CM bus 23 is formed by a bus which complies with a standard (RS-485) which relates to mutual connection between apparatuses in a data communication system and which allows a long distance transmission. Accordingly, each channel can directly access to the bus, so that the function of the channel section can be simplified. This makes it possible to suppress an increase in product cost, while maintaining the level of the monitor/control function, even when the number of channels increases due to an increase in the transmission capacity.

That is, since the CPU bus 21A is directly used in place of the CM bus 23 serving as a serial bus, the number of signals exchanged between the equipment CPU 21 and the channels can be decreased. In addition, an increase in cost can be suppressed even when the CM bus 23 is extended.

The access time required for the firmware of the CPU 21 to access to a channel is equal to the access time required for direct access to a memory. Accordingly, it is expected that the processing speed increases considerably compared to the case where communication between the CPU 21 and the channels is provided through packet communication between racks.

In particular, when a multiplex radio apparatus adapted to SDH is applied to the control system capable of coping with bus extension according to the present embodiment, channels are added in a manner adapted to STM-1 (Synchronous Transport Module Level 1). In this case, six to eight channels are mounted in a single unit apparatus, and this unit apparatus is formed by two or three racks. Even in such a case, all the STM-1 channels can be monitored and controlled by a CPU provided in the single unit apparatus.

Since use of a parity signal makes it possible to judge whether signals transmitted from the SEMU 20 to the CH interface sections 30–35 are normal, as well as to judge whether signals transmitted from the CH interface sections 30–35 to the SEMU 20 are normal, it is possible to increase the reliability of the monitor/control function provided for the monitor/controlled objects 36–41.

Since it is possible to input the entire length of the CM bus 23 and to set, on the basis of the input entire length of the CM bus 23, a period of time during which an acknowledgment signal is waited for reception thereof, the unnecessary waiting time can be minimized, so that the processing capability of the CPU can be increased.

The CM BUS conversion circuit 22 can notify an external apparatus of occurrence of a failure through the firmware of the CPU 21 when no DACK signal is received even though retransmission of signals is repeated a predetermined number of times. Accordingly, recovery processing for a bus failure can be immediately performed.

In the above-described embodiment, a parity signal is checked so as to determine whether signals transmitted from the SEMU 20 to the CH interface sections 30–35 are normal and whether signals transmitted from the CH interface sections 30–35 to the SEMU 20 are normal. However, the present invention is not limited thereto, and any other method may be used so as to check the above-described signals.

In the present invention, the processing for retransmission of address/data as shown in FIG. 9 may be omitted in some cases. In these cases, when it is determined that no DACK signal is received by the DACK window generation section 49 within a predetermined period of time, a signal indicating this is output to the retry counter 50, which in turn outputs a retry-out signal to the OR circuit 67, so that the occurrence of a failure can be informed to the CPU 21.

c) Second Embodiment

Figure 10:
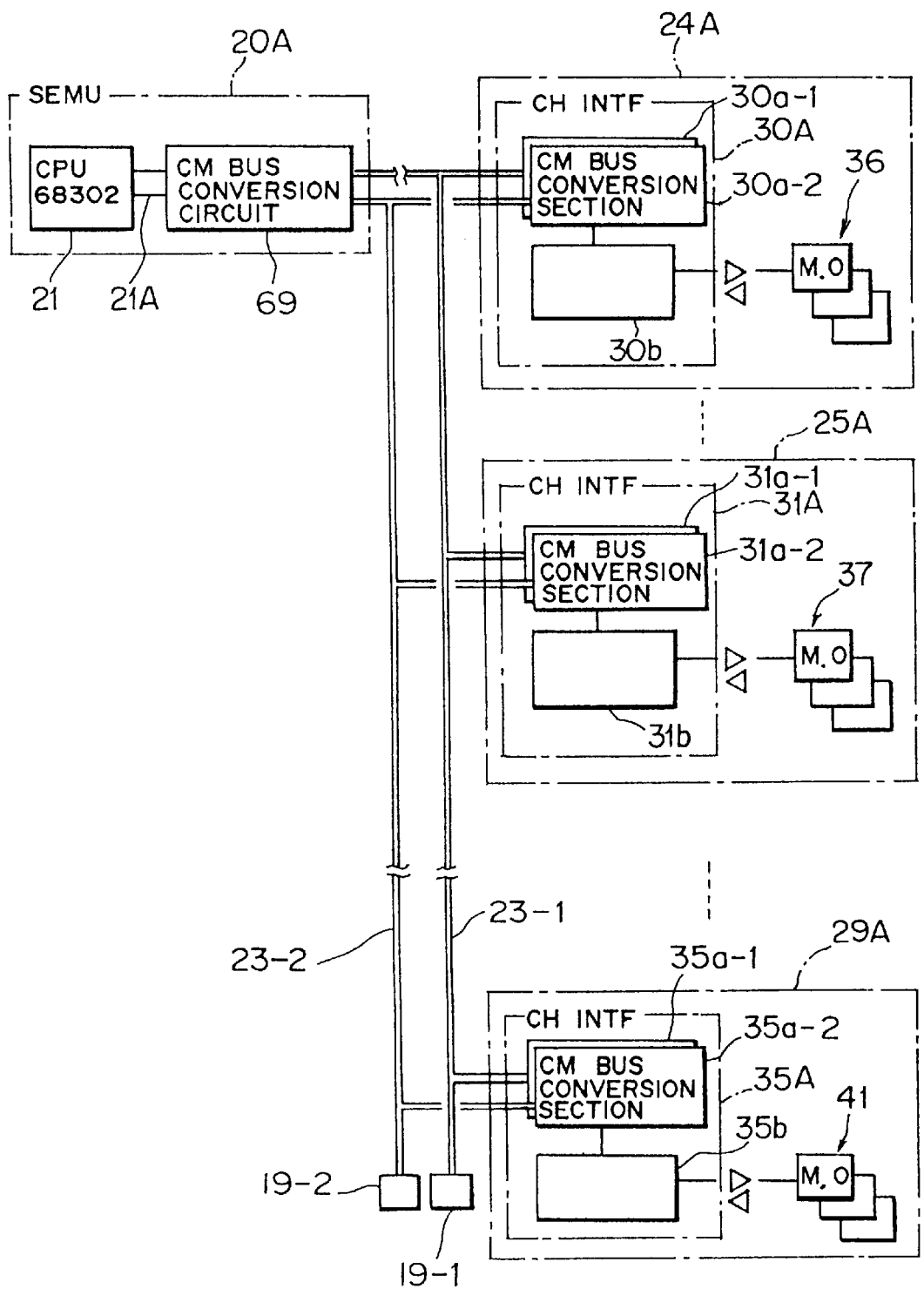
FIG. 10 is a block diagram showing a control system capable of coping with bus extension according to a second embodiment of the present invention.

FIG. 10 is a block diagram showing a control system capable of coping with bus extension according to a second embodiment of the present invention. In the control system capable of coping with bus extension shown in FIG. 10, an SEMU 20A and shelves 24A–29A are connected with each other via duplicated CM buses (for #1 system and #2 system) 23-1 and 23-2.

Numerals 19-1 and 19-2 denote terminating sections similar to the terminating section 19 of the above-described first embodiment.

Figure 11:
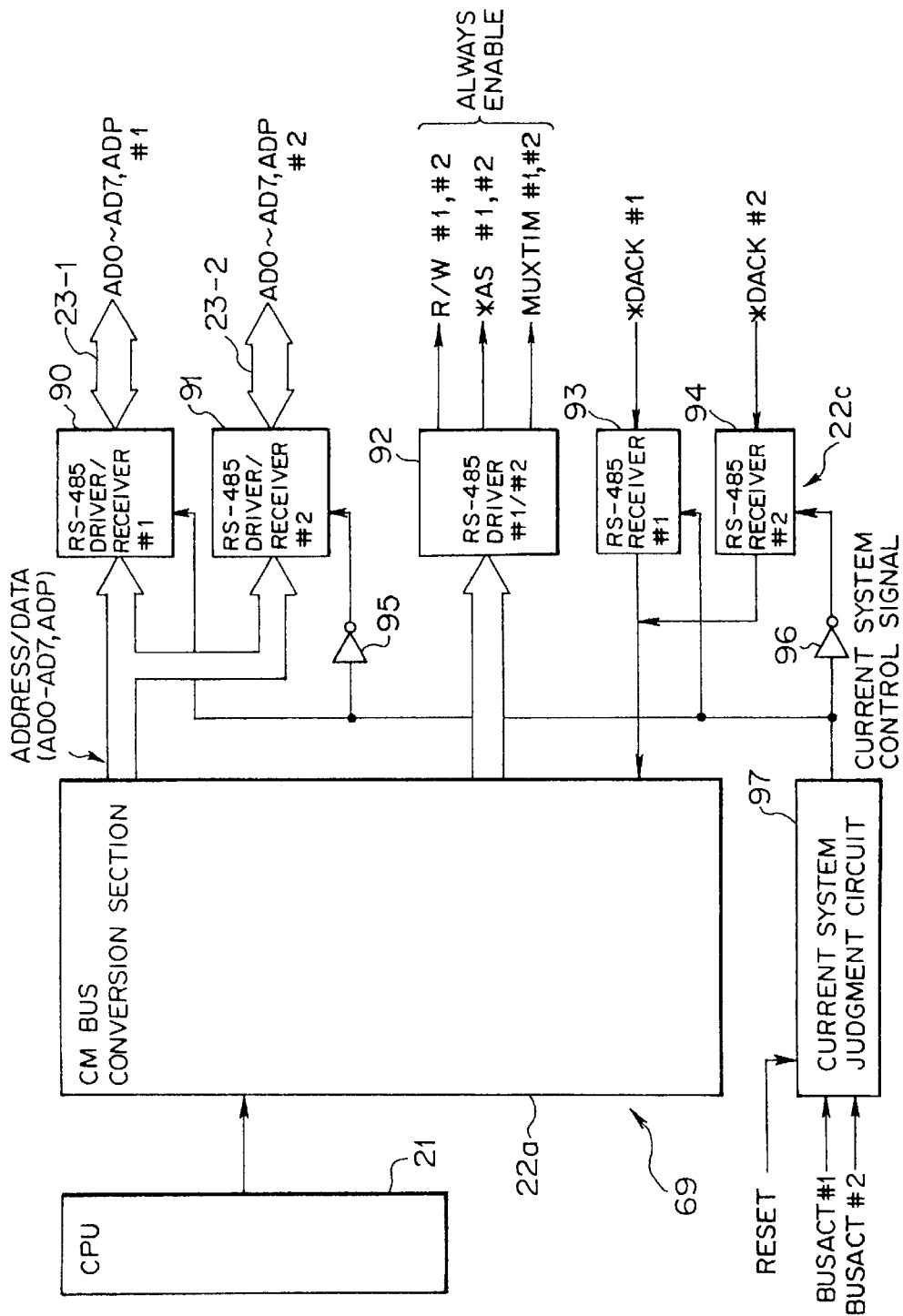
FIG. 11 is a block diagram showing an SEMU according to the second embodiment of the present invention.

In detail, the SEMU 20A has the structure shown in FIG. 11. That is, although a CM bus conversion circuit 69 of the SEMU 20A shown in FIG. 11 has a structure different from that of the CM bus conversion circuit of the SEMU 20 of the first embodiment, the CPU 21 has similar functions in both embodiments.

The CM bus conversion circuit 69 is composed of a CM BUS conversion section 22a, a driver/receiver section 22c, and a current system judgment circuit 97. Since the CM BUS conversion section 22a has the same structure as that of the CM BUS conversion section of the first embodiment, a description therefor will be omitted.

The driver/receiver section 22c includes RS-485 driver/receivers 90 and 91, an RS-485 driver/receiver 92, and RS-485 receivers 93 and 94 so as to cope with the CM bus 23-1 for signals of the #1 system, and the CM bus 23-2 for signals of the #2 system.

The RS-485 driver/receiver 90 is connected to the CM bus 23-1 so as to send and receive 8-bit address/data information (AD7–AD0) and a data parity signal (ADP) as signals of the #1 system. The RS-485 driver/receiver 91 is connected to the CM bus 23-2 so as to send and receive 8-bit address/data information (AD7–AD0) and a data parity signal (ADP) as signals of the #2 system.

Accordingly, the RS-485 driver/receivers 90 and 91 have the same functions as do the RS-485 drivers 56 and 57 and the RS-485 receivers 60 and 61 of the first embodiment.

The RS-485 driver 92 has the same function as does the RS-485 driver 58 of the first embodiment. The RS-485 diver 92 receives control signals (*AS, R/*W, MUXTIM) from the CM BUS conversion section 22a and sends them, together with the above-described address/data signals, as signals of the #1 system and signals of the #2 system.

Moreover, the RS-485 receivers 93 and 94 have the same function as do the RS-485 receiver 59 of the first embodiment. That is, the RS-485 receiver 93 receives, as a signal of the #1 system, a data acknowledgment signal (*DACK), which serves as a permission signal, from the shelves 24A–29A. The RS-485 receiver 94 receives, as a signal of the #2 system, a data acknowledgment signal (*DACK) from the shelves 24A–29A.

Figure 12:
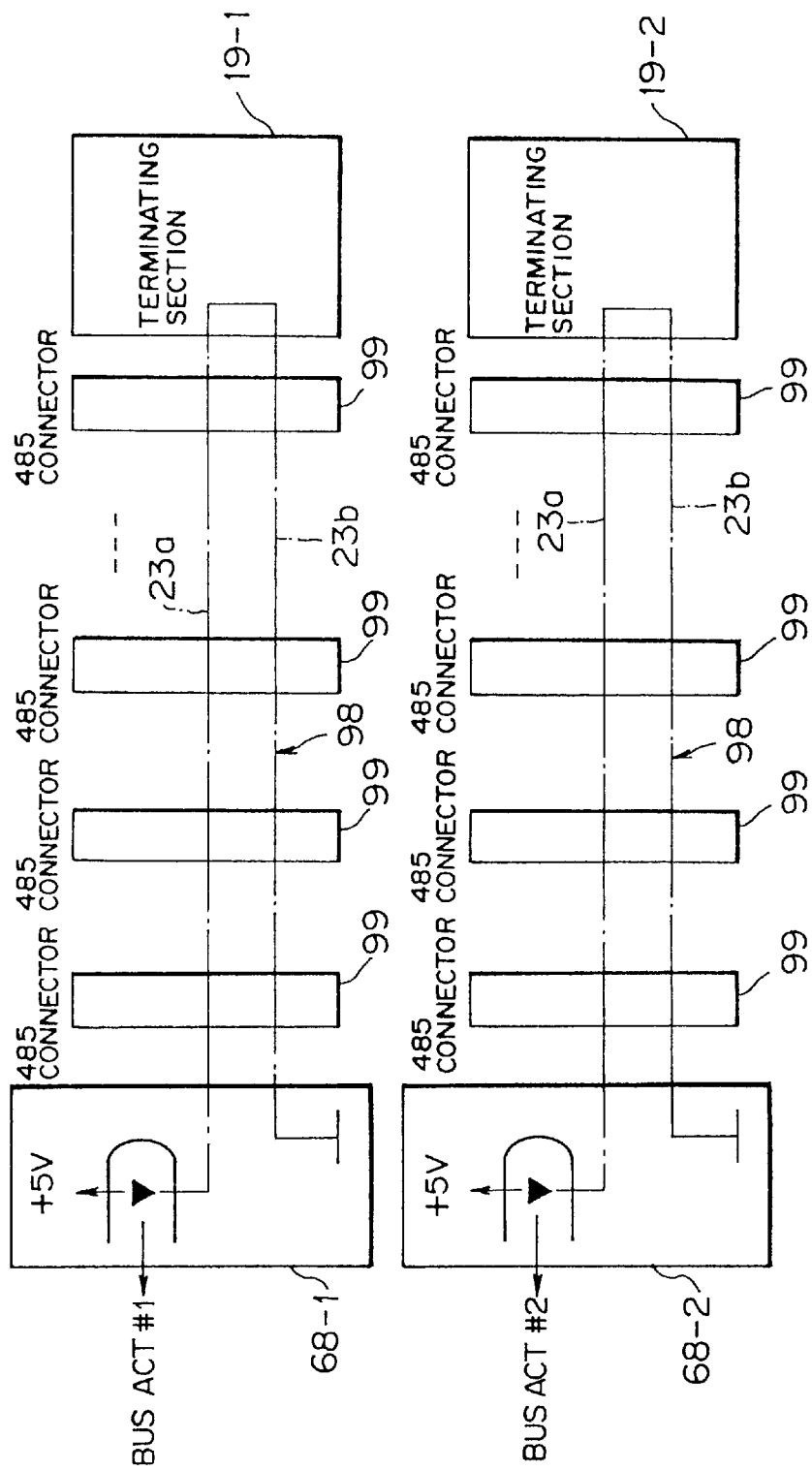
FIG. 12 is a block diagram showing a break detection line in a CM bus according to the second embodiment of the present invention.

Each of the above-described duplicated CM buses 23-1 and 23-2 has two signal transmission cables for break detection, as shown in FIG. 12, as well as signal lines similar to those shown in FIG. 3.

In detail, the signal transmission cables 23a and 23b are connected with each other at the terminating sections 19-1 and 19-2, thereby forming respective loops. That is, the signal transmission cables 23a and 23b are looped at the their ends to form respective break detection lines 98.

The signal transmission cables 23a and 23b of the CM bus 23-1 for the #1 system are connected to a break detection section 68-1 at the side of the SEMU 20. The signal transmission cables 23a and 23b of the CM bus 23-2 for the #2 system are connected to a break detection section 68-2 at the side of the SEMU 20. The break detection sections 68-1 and 68-2 are not illustrated in FIGS. 10 and 11.

Each of the break detection sections 68-1 and 68-2 detects the state (broken/connected state) of the signal transmission cable 23a or 23b on the basis of variations of the signal (for example, variations of voltage) from the corresponding break detection line 98 of the CM bus 23-1 or 23-2. The result of detection by the break detection section 68-1 is output therefrom as a status signal BUSACT#1, while the result of detection by the break detection section 68-2 is output therefrom as a status signal BUSACT#2.

When a break in the signal transmission cable 23a or 23b is detected by the corresponding break detection section 68-1 or 68-2, alarm information indicating a bus failure is output to, for example, the firmware of the CPU 21.

Numeral 99 denotes each of connectors for connection and junction of the CM buses 23-1 and 23-2.

The current system judgment circuit 97 receives the status signals BUSACT#1 and BUSACT#2 from the break detection sections 68-1 and 68-2 and also receives a status reset signal from the CPU 21, and on the basis of the status signals BUSACT#1 and BUSACT#2 received from the break detection sections 68-1 and 68-2, determines which system must be used as a current system.

For example, when it is detected on the basis of the status signals BUSACT#1 and BUSACT#2 from the break detection sections 68-1 and 68-2 that a break has occurred in a system that has been used as a current system, the result of the detection is used as trigger information for performing switching operation so as to use a spare system in place of the current system.

A current system control signal output from the current system judgment circuit 97 is input as is to the RS-485 driver/receiver 90 and the RS-485 receiver 93, and is also input to the RS-485 driver/receiver 91 and the RS-485 receiver 94 after been inverted by NOT circuits 95 and 96.

Therefore, when an "H" level signal serving as the current system control signal is output to the RS-485 driver/receiver 90 or 91 and the RS-485 receiver 93 or 94 in the #1 system or #2 system which has been determined to be used as a current system, an inverted signal of the control signal is output to the RS-485 driver/receiver 90 or 91 and the RS-485 receiver 93 or 94 in the system which has been determined to be used as a spare system.

In this case, it may be designed such that when both the CM buses 23-1 and 23-2 are normal, the #1 system which performs signal exchange via the CM bus 23-1 is used as a current system.

As in the first embodiment, each of the shelves 24A–29A accommodates a plurality of objects 36–41 to be monitored and controlled. However, the shelves 24A–29A differ from those of the first embodiment in that CH interfaces 30A–35A in the shelves 24A–29A have a structure for coping with the duplicated buses. In order to simplify the description, the structure of the CH interface 30A of the shelf 24A will be described below, because the remaining CH interface sections 31A–35A have the same structure as the CH interface 30A.

Figure 13:
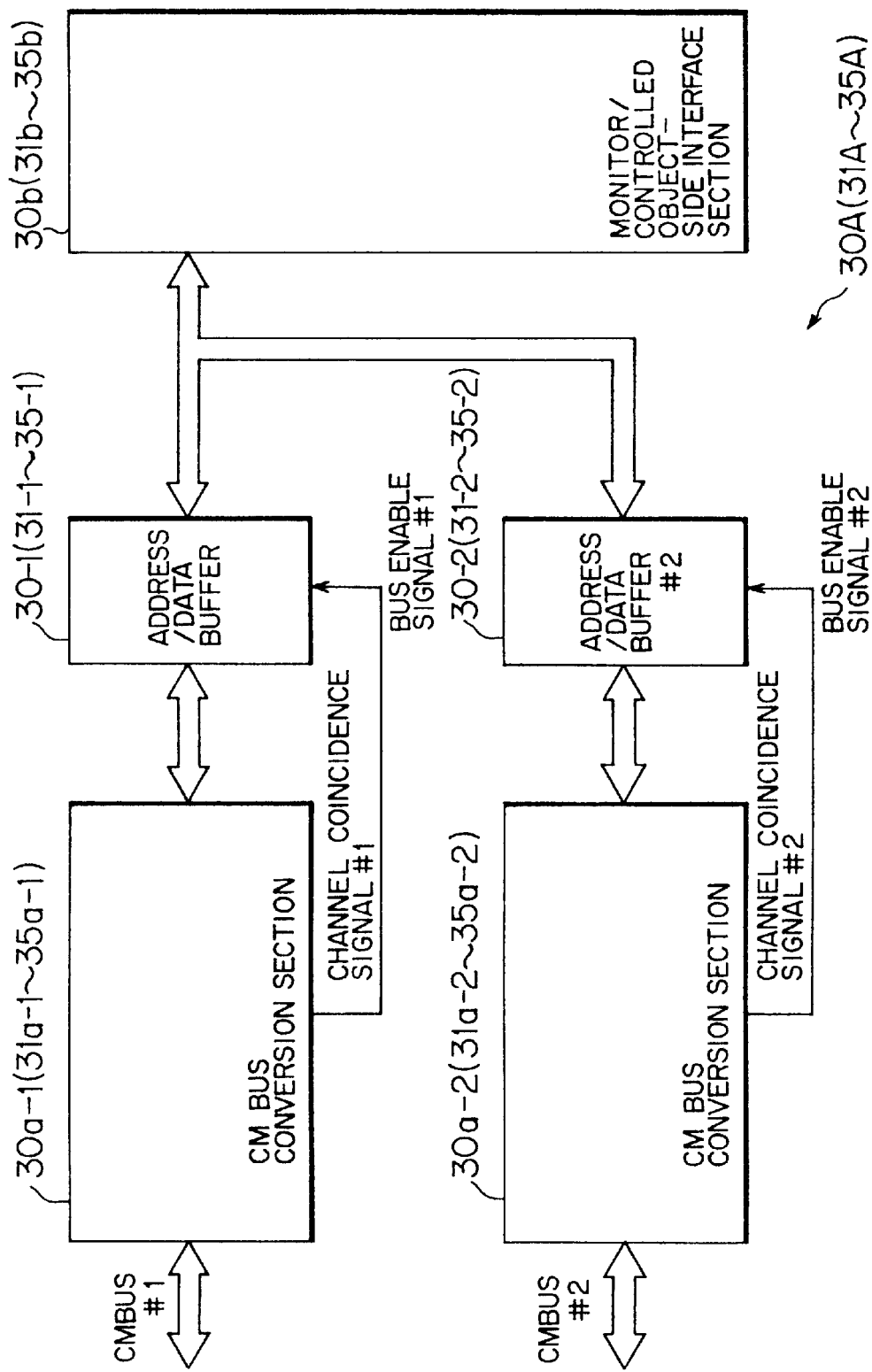
FIG. 13 is a block diagram showing a CH interface section according to the second embodiment of the present invention.

Specifically, the CH interface 30A of the shelf 24A has the structure as shown in FIG. 13. In FIG. 13, numerals 30a-1 and 30a-2 denote duplicated CM BUS conversion sections, each having the same structure as the CM BUS conversion section 30a of the first embodiment.

The CM BUS conversion section 30a-1 is adapted to exchange signals with the CM bus 23-1 for the #1 system and is connected through an address/data buffer 30-1 (not illustrated in FIG. 10) to a monitor/controlled interface section 30b.

The CM BUS conversion section 30a-2 is adapted to exchange signals with the CM bus 23-2 for the #2 system and is connected through an address/data buffer 30-2 (not illustrated in FIG. 10) to the monitor/controlled interface section 30b.

Channel coincidence signals from decoders 82 of the CM BUS conversion sections 30a-1 and 30a-2 are output, as bus enable signals, to the address/data buffers 30-1 and 30-2. This configuration makes it possible to enable only one of the address/data buffers 30-1 and 30-2 for the system used as a current system.

Similarly, CM BUS conversion sections 31a-1–35a-1 and 31a-2–35a-2 of the CH interfaces 31A–35A in the shelves 25A–29A have the same structure as the CM BUS conversion sections 31a–35a in the first embodiment.

The CM BUS conversion sections 31a-1–35a-1 are adapted to exchange signals with the CM bus 23-1 for the #1 system and are connected through address/data buffers 31-1–35-1 (not illustrated in FIG. 10) to monitor/controlled interface sections 31b–35b, as shown in FIG. 13.

The CM BUS conversion sections 31a-2–35a-2 are adapted to exchange signals with the CM bus 23-2 for the #2 system and are connected through address/data buffers 31-2–35-2 (not illustrated in FIG. 10) to the monitor/controlled interface sections 31b–35b, as shown in FIG. 13.

Channel coincidence signals from decoders 82 of the CM BUS conversion sections 31a-1–35a-1 and 31a-2–35a-2 are output, as bus enable signals, to the address/databuffers 31-1–35-1 and 31-2–35-2. This configuration makes it possible to enable only the address/data buffers 31-1–35-1 or 31-2–35-2 for the system used as a current system.

Since the monitor/controlled interface section 30b is the same as in the first embodiment, a description therefor will be omitted.

By virtue of the above-described structure, in the control system capable of coping with bus extension according to the second embodiment of the present invention, one of the #1 system utilizing the CM bus 23-1 or the #2 system utilizing the CM bus 23-2 is used as a current system so as to exchange information between the SEMU 20A and the shelves 24A–29A.

In other words, the current system judgment circuit 97 of the SEMU 20A determines a system to be used as a current system on the basis of the break detection information from the break detection sections 68-1 and 68-2.

Although the shelves 24A–29A do not receive from the SEMU 20A information as to which one of the #1 and #2 systems is used as a current system while the other is used as a spare system, the shelves 24A–29A can recognize which one of the #1 and #2 systems is used as a current system while the other is used as a spare system, because effective addresses are output from the SEMU 20 to the shelves 24A–29A through the system which is used as a current system.

Each signal line of a CM bus is completed by a single wire provided for transmission between racks. Therefore, if the wire is cut at a point between racks, it becomes impossible to monitor and control the channels which are accommodated in the racks located on the far side of the cut point as viewed from the CPU 21. In addition, the channels accommodated in the racks located between the CPU 21 and the cut point fall in a state in which they are not electrically terminated, so that the reliability as a monitor/control system deteriorates.

In order to solve the above-described problems, the following operation is performed. When the break detection section 68-1 or 68-2 of the SEMU 20A detects a break of the signal transmission cable 23a or 23b which has been used as a current system, the result of the detection is used as trigger information so as to use the spare system in place of the current system. This is also notified, as a bus failure, to the firmware of the CPU 21 through interruption processing. The firmware recognizes the failure as an emergency, and notifies it as a device failure (alarm information) to an external device while stopping other kinds of processing. This makes it possible to quickly perform recovery processing for the bus failure and to maintain the reliability as a monitor/control system.

As described above, since each signal line of a CM bus is completed by a single wire provided for transmission between racks, upon the wire being cut at a point between racks, it becomes impossible to monitor and control the channels which are accommodated in the racks located on the far side of the cut point as viewed from the CPU 21. However, when the current system is replaced by the spare system, the monitor and control for the channel located on the far side of the cut point can be continued.

As described above, in the control system capable of coping with bus extension according to the second embodiment of the present invention, the signal transmission cables 23a and 23b among the signal transmission cables forming the CM buses 23-1 and 23-2 are looped at their ends so as; to form a break detection lines 98. When a break of the signal transmission cable 23a or 23b is detected on the basis of the signal from the break detection lines 98 in the SEMU 20A, alarm information is output as a device failure. Accordingly, recover processing for the failure can be performed immediately.

Moreover, the use of the duplicated CM buses 23-1 and 23-2 enhances the reliability in exchange of information between the SEMU 20A and the shelves 24A–29A and increases the availability of the firmware.

(d) Third Embodiment

Figure 14:
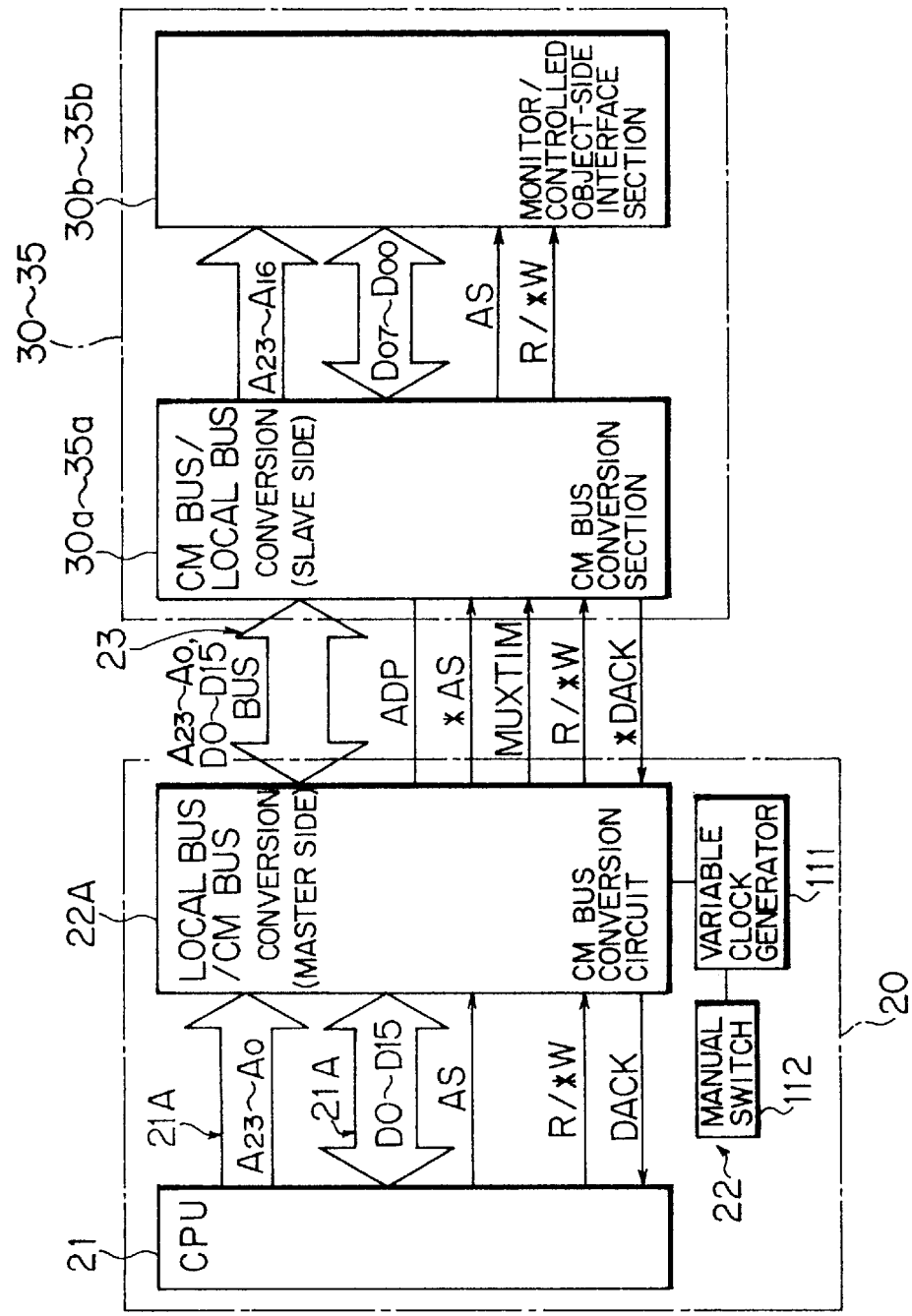
FIG. 14 is a block diagram showing a control system capable of coping with bus extension according to a third embodiment of the present invention.
Figure 15:
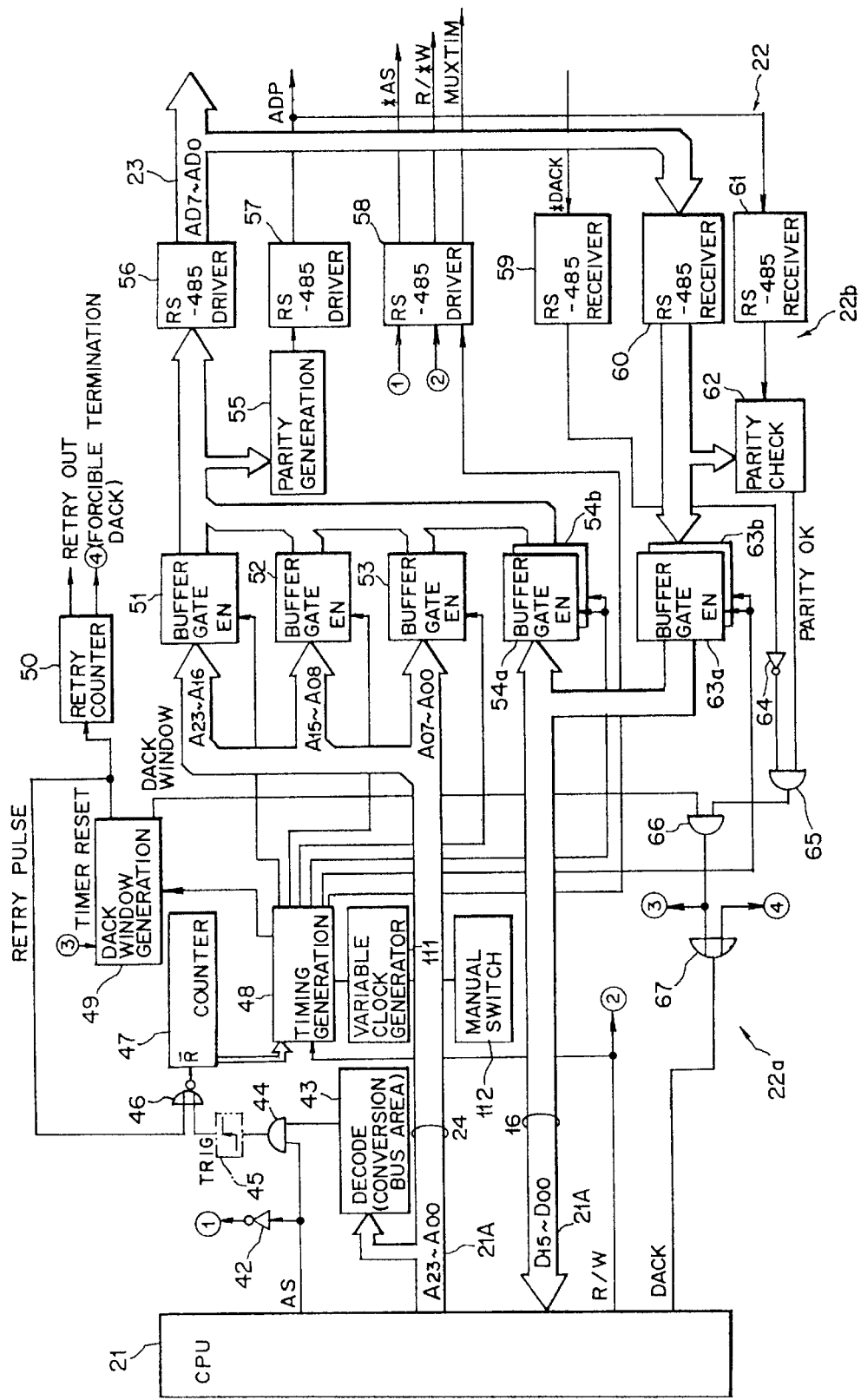
FIG. 15 is a block diagram showing an SEMU according to the third embodiment of the present invention.

FIG. 14 is a block diagram showing a control system capable of coping with bus extension according to a third embodiment of the present invention. FIG. 15 is a block diagram showing an SEMU 20 according to the third embodiment of the present invention.

The control system capable of coping with bus extension according to the present embodiment is basically the same as that of the first embodiment except that a variable clock generator 111 and a manual switch 112 are connected to the CM BUS conversion circuit 22 which serves as a first interface section for extension bus generation.

Numeral 22A in FIG. 14 collectively denotes other circuit components (see numerals 42–67 in FIG. 15) which form the CM BUS conversion circuit 22.

The variable clock generator 111 can vary the speed of clocks which are used to transmit address/data signals ($A_{23}$–$A_0$, $D_0$–$D_{15}$) and control signals (ADP, *AS, MUXTIM, R/*W) from the CM BUS conversion circuit 22. Thus, the variable clock generator 111 functions as a variable transmission clock generator.

That is, the variable clock generator 111 is used to generate transmission timing signals used for transmitting the above-described address/data signals and the control signals. Signals are transmitted from the CM BUS conversion circuit 22 at a speed corresponding to the speed of clocks generated by the variable clock generator 111.

The manual switch 112 is used to set the speed of clocks generated by the variable transmission clock generator 111, thereby providing a function as a clock speed setting section.

The manual switch 112 allows an operator to set the speed of clocks generated by the variable clock generator 111 such that the clock speed varies in accordance with the number of times of output of the above-described address/data signals and control signals.

Specifically, as in the first embodiment, when the DACK window generation section 49 receives, within a predetermined period of time, no DACK signal from the CH interface sections 30–35 of the shelves 24–29 at the receiving side, the DACK window generation section 49 outputs a retry pulse so as to cause the RS-485 drivers 56–58 to again output signals which was output to the shelves 24–29. In the present embodiment, the variable clock generator 111 is operated to vary the clock speed of the transmission signals until the number of times of retransmission of signals reaches a number of times at which the retry counter 50 output a retry-out signal.

In the present embodiment, the number of times of retransmission of the transmission signals is reported to an operator at the side of the SEMU 20 via the CPU 21. This allows the operator to vary the clock speed for transmitting the transmission signals through operation of the manual switch 112.

For example, the operator can set the clock speed of the transmission signals, through operation of the manual switch 112, such that the clock speed of the transmission signals, which is set by the variable clock generator 111, is gradually lowered in accordance with the number of times of retransmission of the transmission signals. This operation allows the operator to find a highest clock speed at which or under which speed communications can be performed normally.

By virtue of the above-described structure, in the control system capable of coping with bus extension according to the third embodiment of the present invention, when the CPU 21 accesses one of the control objects 36–41 for writing operation, the address/data signals ($A_{23}$–$A_0$, $D_0$–$D_{15}$) and control signals (ADP, *AS, MUXTIM, R/*W) are transmitted from the CM BUS conversion circuit 22 to corresponding one of the CH interfaces 30–35 of the shelves 24–29 at the cock speed set by the variable clock generator 111.

When the CH interface section 30–35 has input the transmission signals from the CM BUS conversion circuit 22 as normal information for its control object 36–41, the CH interface section 30–35 outputs to the CM BUS conversion circuit 22 data acknowledgment (DACK) signal (*DACK) indicating the completion of the reception.

After the above-described address/data signals and control signals are transmitted as transmission signals to the shelve 24–29 via the CM bus 23, the DACK window generation section 49 in the CM BUS conversion circuit 22 waits for the DACK signal from the CH interface section 30–35 for the predetermined period of time.

When no permission signal is received within the predetermined period of time, the DACK window generation section 49 outputs a retry pulse (see point in time (t11) in (i) of FIG. 7), so that the above-described address/data signals and control signals are again output from the RS-485 drivers 56–58.

The number of times of retransmission of the above-described transmission signals is notified to the operator at the side of the SEMU 20 via the CPU 21. Before the number of times of the retransmission reaches the number at which the retry counter 50 outputs a retry-out signal, the operator operates the above-described manual switch 112 so as to set the variable clock generator 111 such that the clock speed of the transmission signals to be retransmitted is gradually decreased.

When a retry out occurs even after the clock speed is decreased in the above-described manner, the operator operates the manual switch 112 so as to set the variable clock generator 111 such that the clock speed is further decreased when the transmission signals are retransmitted at the next time.

The circuit is configured such that when the above-described retry out occurs, the CPU 21 receives a forcible-termination DACK signal from the OR circuit 67. This allows the CPU 21 to recognize the occurrence of the retry out.

When the speed of the clocks generated by the variable clock generator 111 is gradually decreased, there can be obtained a state in which the retry out of the CM bus 23 is not recognized by the CPU 21. The clock speed at that time is the highest transmission clock speed at which or below which the communication can be performed.

In the case where a cable serving as the CM bus 23 is made longer because of the long distance (e.g., about 50 m) between the SEMU 20 and the shelves 24–29, or in the case where the system is installed at a place where a large noise exists, an error occurs during the transmission of information (signals). In such cases, the CPU detects such an error in the transmitted information on the basis of the absence of a response signal (the fact that no DACK signal has been received).

In such cases, the transmission clock speed for retransmission of the signals is varied so as to perform access to a desired address even when an error occurs during the retransmission of the signals. This makes it possible to prevent occurrence of retry out, so that normal monitoring and controlling can be continued without stopping the access to the address by the CPU.

As described above, in the control system capable of coping with bus extension according to the third embodiment of the present invention, the CM BUS conversion circuit 22 has the variable clock generator 111 and the manual switch 112. Accordingly, even when an error occurs during the retransmission of signals due to a long (e.g., about 50 m) cable which serves as the CM bus 23 and is provided between the SEMU 20 and the shelves 24–29, or due to noise at the installation place, the occurrence of retry out is prevented by varying the transmission clock speed for retransmission of the signals.

This makes it possible to continue normal monitoring and controlling, without stopping the access to the address by the CPU, thereby mitigating the restrictions on the construction of the system, such as a restriction on the cable Length and a restriction on noise at the installation site.

In the present embodiment, the manual switch 112 is used to set the variable clock generator 111 such that the clock speed of transmission signals to be retransmitted is gradually decreased in accordance with the number of times of retransmission of the transmission signals, which number is output from the decode circuit 114. However, when the system is constructed through use of a short (about 8 m) CM bus 23, the manual switch 112 may be operated to set the variable clock generator 111 such that the clock speed of the transmission signals is increased. This further increases the data transmission speed.

(e) Fourth Embodiment

Figure 16:
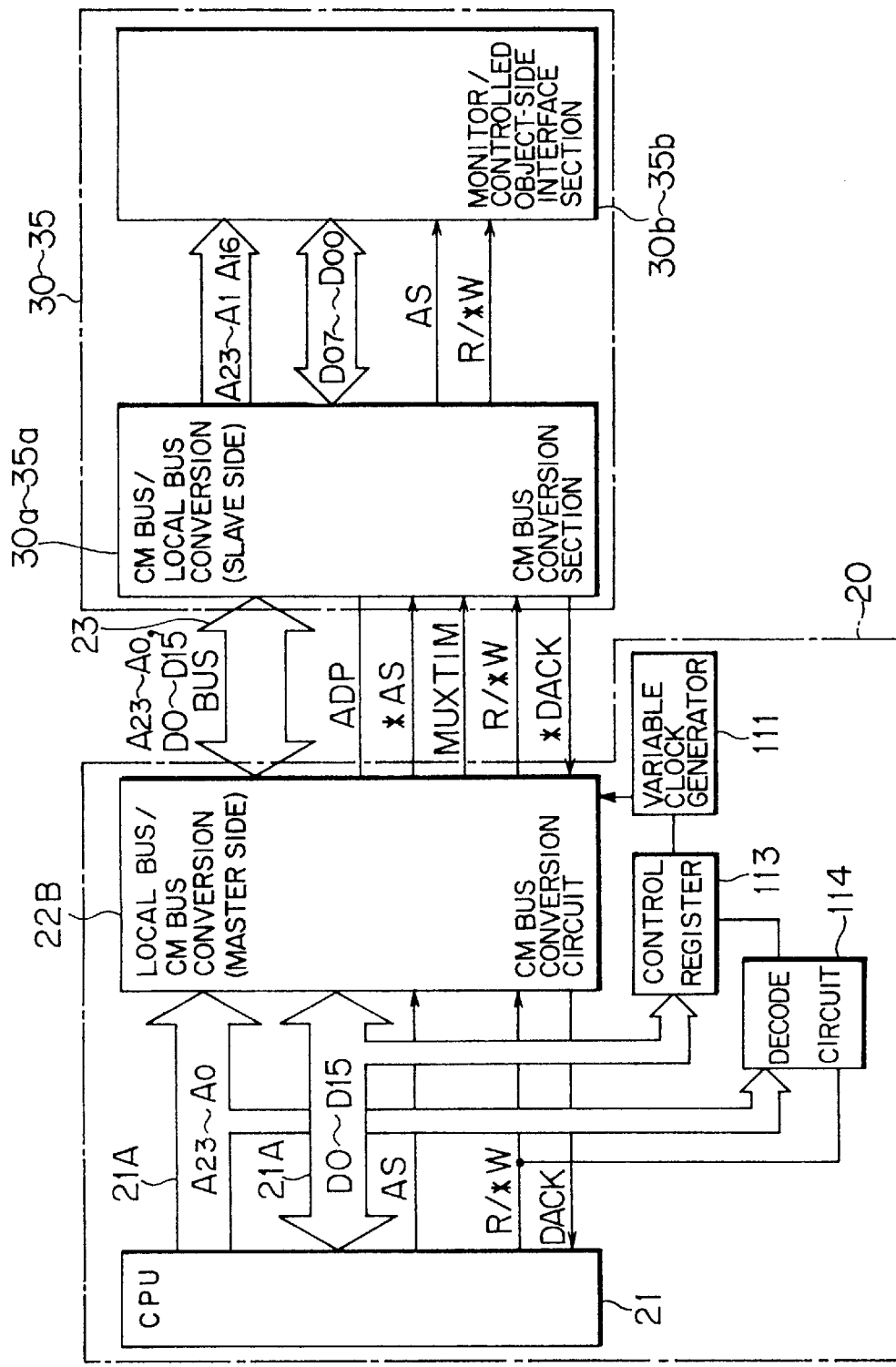
FIG. 16 is a block diagram showing a control system capable of coping with bus extension according to a fourth embodiment of the present invention.

FIG. 16 is a block diagram showing a control system capable of coping with bus extension according to a fourth embodiment of the present invention. FIG. 17 is a block diagram showing an SEMU 20 according to the fourth embodiment of the present invention.

The control system capable of coping with bus extension according to the present embodiment is basically the same as that of the third embodiment except that a decode circuit 114 is provided and a control register 113 is provided, as a clock speed setting means, in place of the manual switch 112, whereby the speed of clocks generated by the variable transmission clock generator 111 is automatically set.

Numeral 22B in FIG. 16 collectively denotes other circuit components (see numerals 42, 44–67 in FIG. 17) which form the CM BUS conversion circuit 22.

The decode circuit 114 includes a decoder 43 for decoding 24-bit address information output from the CPU 21 and is adapted to perform the NOR operation between the decode result output from the decoder 43 and the R/W signal which indicates the kind of control performed by the CPU 21. The result of the NOR operation is output to the control register 113 as detection information which indicates occurrence of processing for retransmission of transmission signals.

The control register 113 holds clock speed information which is set in accordance with the number of times of output of the address/data signals ($A_{23}$–$A_0$, $D_0$–$D_{15}$) and control signals (ADP, *AS, MUXTIM, R/*W) from the CM BUS conversion circuit 22. Thus, the control register 113 functions as a setting/changing register.

Upon reception of the detection information indicating occurrence of processing for retransmission of transmission signals, which information is output from the decode circuit 114, the control register 113 outputs the clock speed information held therein in accordance with the number of times the retransmission of the transmission signals has been performed, so that the speed of the transmission clocks generated by the variable clock generator 111 is set.

By virtue of the above-described structure, in the control system capable of coping with bus extension according to the fourth embodiment of the present invention, when the CPU 21 accesses one of the control objects 36–41 for writing operation, the address/data signals ($A_{23}$–$A_0$, $D_0$–$D_{15}$) and control signals (ADP, *AS, MUXTIM, R/*W) are transmitted from the CM BUS conversion circuit 22 to corresponding one of the CH interfaces 30–35 in the shelves 24–29 at the cock speed set by the variable clock generator 111, as in the third embodiment.

When the CH interface section 30–35 has fetched the transmission signals from the CM BUS conversion circuit 22 as normal information for its control object 36–41, the CH interface section 30–35 outputs to the CM BUS conversion circuit 22 a data acknowledgment (DACK) signal (*DACK) indicating the completion of the reception of the information.

After the above-described address/data signals and control signals are transmitted as transmission signals to the shelve 24–29 via the CM bus 23, the DACK window generation section 49 in the CM BUS conversion circuit 22 waits for the DACK signal from the CH interface section 30–35 for the predetermined period of time.

When no permission signal is received within the predetermined period of time, the DACK window generation section 49 outputs a retry pulse (see point in time (t11) in (i) of FIG. 7), so that the above-described address/data signals and control signals are again output from the RS-485 drivers 56–58.

The number of times of retransmission of the above-described transmission signals is counted by the decode circuit 114, and the control register 113 sets the variable clock generator 111, in accordance with the number of times of the retransmission output from the decode circuit 114,, such that the clock speed of the transmission signals to be retransmitted is gradually and automatically decreased.

When the speed of the clocks generated by the variable clock generator 111 is gradually decreased, there can be obtained a state in which the retry out of the CM bus 23 is not recognized by the CPU 21. The cock speed at that time is the highest transmission clock speed at which or below which the communication can be performed.

The circuit is configured such that when the above-described retry out occurs even after the speed of clocks generated by the variable clock generator 111 is decreased in the above-described manner, the CPU 21 receives a forcible-termination DACK signal from the OR circuit 67. This allows the CPU 21 to recognize the occurrence of the retry out.

Especially, in the case where a cable serving as the CM bus 23 is made longer because of the long distance (e.g., about 50 m) between the SEMU 20 and the shelves 24–29, or in the case where the system is installed at a place where a large noise exists, an error occurs during the transmission of information (signals). In such cases, the CPU detects such an error in the transmitted information on the basis of the absence of a response signal (the fact that no DACK signal has been received).

In such cases, the transmission clock speed for retransmission of the signals is varied so as to perform access to a desired address even when an error occurs during the retransmission of the signals. This makes it possible to prevent occurrence of retry out, so that normal monitoring and controlling can be continued without stopping the access to the address by the CPU.

As described above, in the control system capable of coping with bus extension according to the fourth embodiment of the present invention, the CM BUS conversion circuit 22 has the variable clock generator 111 and the control register 113. Accordingly, even when an error occurs during the retransmission of signals due to a long (e.g., about 50 m) cable which serves as the CM bus 23 and is provided between the SEMU 20 and the shelves 24–29, or due to noise at the installation place, the occurrence of retry out is prevented by varying the transmission clock speed for retransmission of the signals. This makes it possible to continue normal monitoring and controlling, without stopping the access to the address by the CPU, thereby mitigating the restrictions on the construction of the system, such as a restriction on the cable length and a restriction on noise at the installation site.

Moreover, the adjustment of the transmission clock speed for preventing the occurrence of retry out can be automatically performed while the control system is actually operated as a control system capable of coping with bus extension. This makes it possible to avoid the occurrence of retry out by changing the transmission clock speed, while eliminating the necessity of operator's work, so that the reliability in operating the system can be enhanced.

(f) Fifth Embodiment

Figure 18:
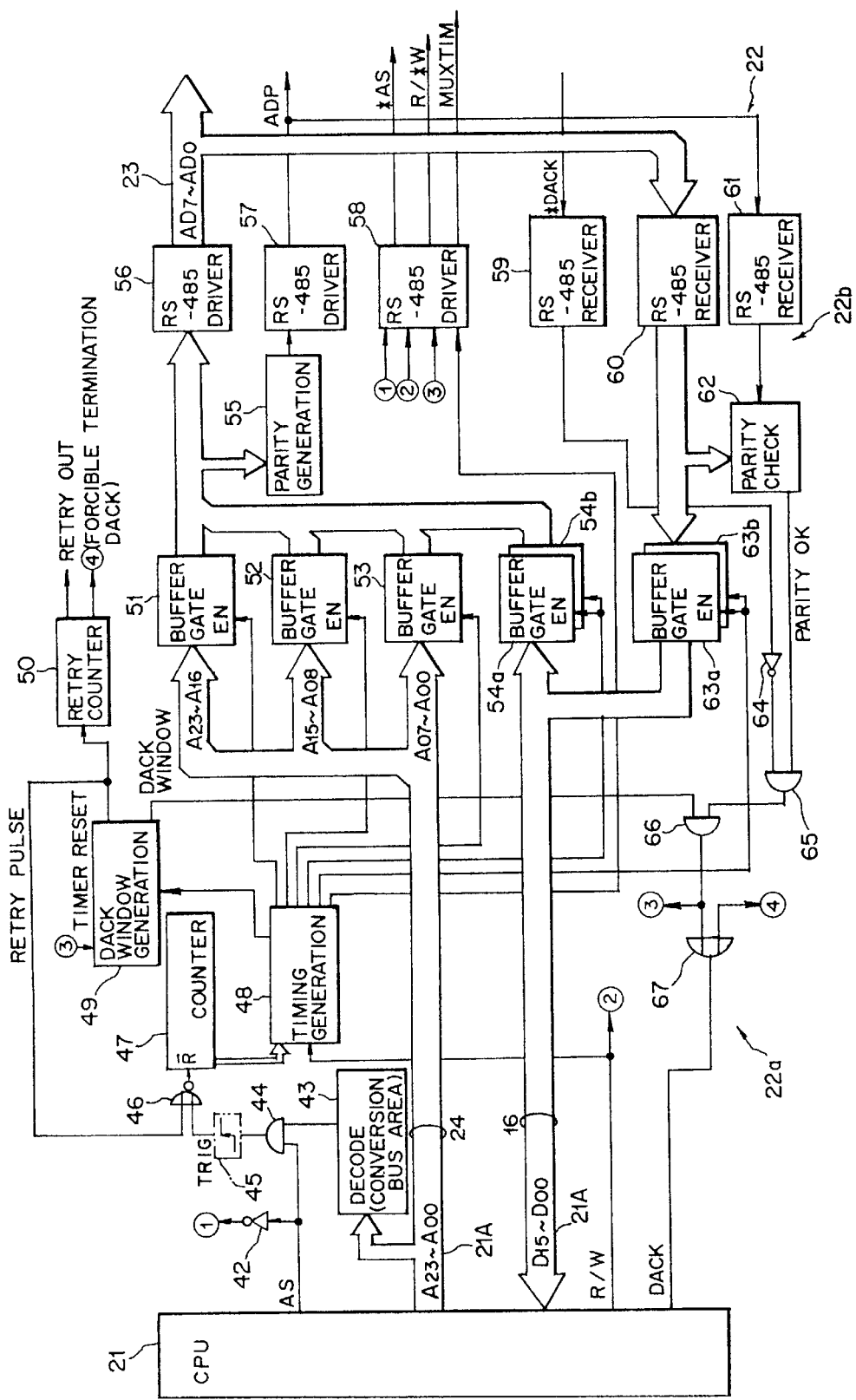
FIG. 18 is a block diagram showing an SEMU according to a fifth embodiment of the present invention.
Figure 19:
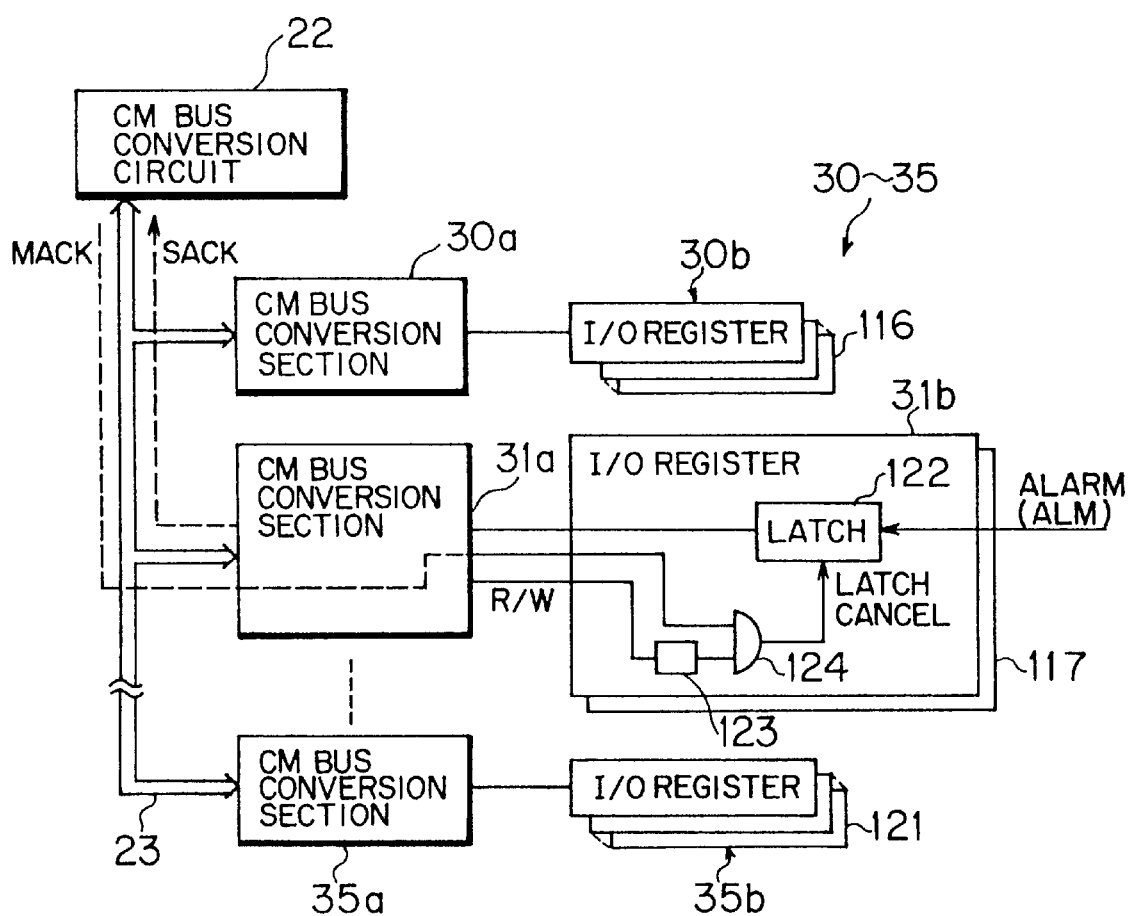
FIG. 19 is lock diagram showing a CH interface section of a control system capable of coping with bus extension according to the fifth embodiment of the present invention.

FIG. 18 is a block diagram showing an SEMU 20 of a control system capable of coping with bus extension according to a fifth embodiment of the present invention. FIG. 19 is a block diagram showing a main portion of the control system capable of coping with bus extension according to the fifth embodiment of the present invention.

In the control system capable of coping with bus extension according to the present embodiment, the software in the SEMU 20 employs a polling method for the monitor/controlled objects 36–41 (see FIG. 2). In addition, the read-break method is employed when data of the monitor/controlled objects 36–41 of the CH interface sections 30–35 are read out by the SEMU 20. This makes it possible to reliably transmit information from the hardware to the software regardless of the polling period. In FIGS. 18 and 19, same portions as those shown in FIGS. 2 and 5 are denoted by the same reference numbers.

In each of the shelves 24–29, a DACK signal (SACK signal) is transmitted to the CM BUS conversion circuit 22 as a permission signal, which is a response to the reception of address/data signals including control information. In addition, the CM BUS conversion circuit 22 of the SEMU 20 according to the present embodiment sends a MACK signal back to the shelves 24–29 as a permission signal reception notification, which indicates the reception of the DACK signal (SACK signal), as shown in FIG. 18.

In detail, when it is judged by the AND circuit 66 that a DACK signal for transmission signals which have been judged as been normal by parity check has been received, a high level signal "1" is output as a signal indicating the reception of the DACK signal. This signal is sent back, as a MACK signal, to the CH interface sections 30–35 of the shelves 24–29 via the RS-485 driver 58.

Accordingly, the AND circuit 66 and the RS-485 driver 58 function as a permission signal reception notification section, which upon reception of a permission signal (DACK signal) from the permission signal send-back sections 84–87 (see FIG. 6), notifies the shelves 24–29 of the reception of the permission signal.

As shown in FIG. 19, the monitor/controlled object-side interface sections 30b–35b includes I/O registers 116–121 for performing data read/write operation for each of the monitor/controlled objects 36–41. Each of the I/O registers 116–121 consists of a latch section 122, a read judgment section 123, and an AND circuit 124. FIG. 19 shows in detail only the structure of the I/O register 117 of the monitor/controlled object-side interface section 31b.

The latch section 122 functions as a register for latching read-out data from the control objects 36–41, and employs the read-break method for reading out data.

For example, when an alarm signal ALM is generated from one of the control objects 46–41, the latch section 122 latches data indicating the generation of the alarm signal ALM. Even after the generation of the alarm signal ALM is stopped, the latch section 122 holds the data until the data is read out by a software (CPU 21).

The read judgment section 123 operates on the basis of the READ/WRITE control signal (R/*W) from the CM BUS conversion section 31a. When a read-out control signal is input, the read judgment section 123 outputs a high level signal "1" as a signal indicating the reception of the read-out control signal.

When the AND circuit 124 simultaneously receives the read-out control signal from the read judgment section 123 and the MACK signal, which serves as a signal confirming the reception of a DACK signal, the AND circuit 124 outputs to the latch section 122 a high level signal "1" as a latch canceling signal.

In other words, the data latched by the latch section 122 is canceled when the read-out control signal from the read judgment section 123 and the MACK signal, serving as a signal that indicates the reception of the DACK signal, are simultaneously received.

In detail, after the CPU 21 of the SEMU 20 reads out the read-out data latched in the latch section 122, a MACK signal serving as a permission signal reception notification is output from the CM BUS conversion circuit 22 via the RS-485 driver 58 thereof. When this MACK signal is received by the CM BUS conversion section 31a, the latch of the data in the latch section 122 is canceled.

The operation of the control system according to the fifth embodiment of the present invention having the above-described structure will now be described in detail with reference to FIG. 20.

First, a description will be given of the case where a memory read out request is generated from the CPU 21. In this case, the CM BUS conversion section 22 at the master side transmits to the CH interface sections 30–35 address information together with read-out control information (see signal (s1) in FIG. 20).

In the monitor/controlled object-side interface section 31b in one of the CH interface sections 30–35 which corresponds to the read-out control information (e.g., CH interface section 31), the read-out data latched in the latch section 122 of the I/O register 117 (data obtained through monitor for the control object 37) is read out.

Figure 20:
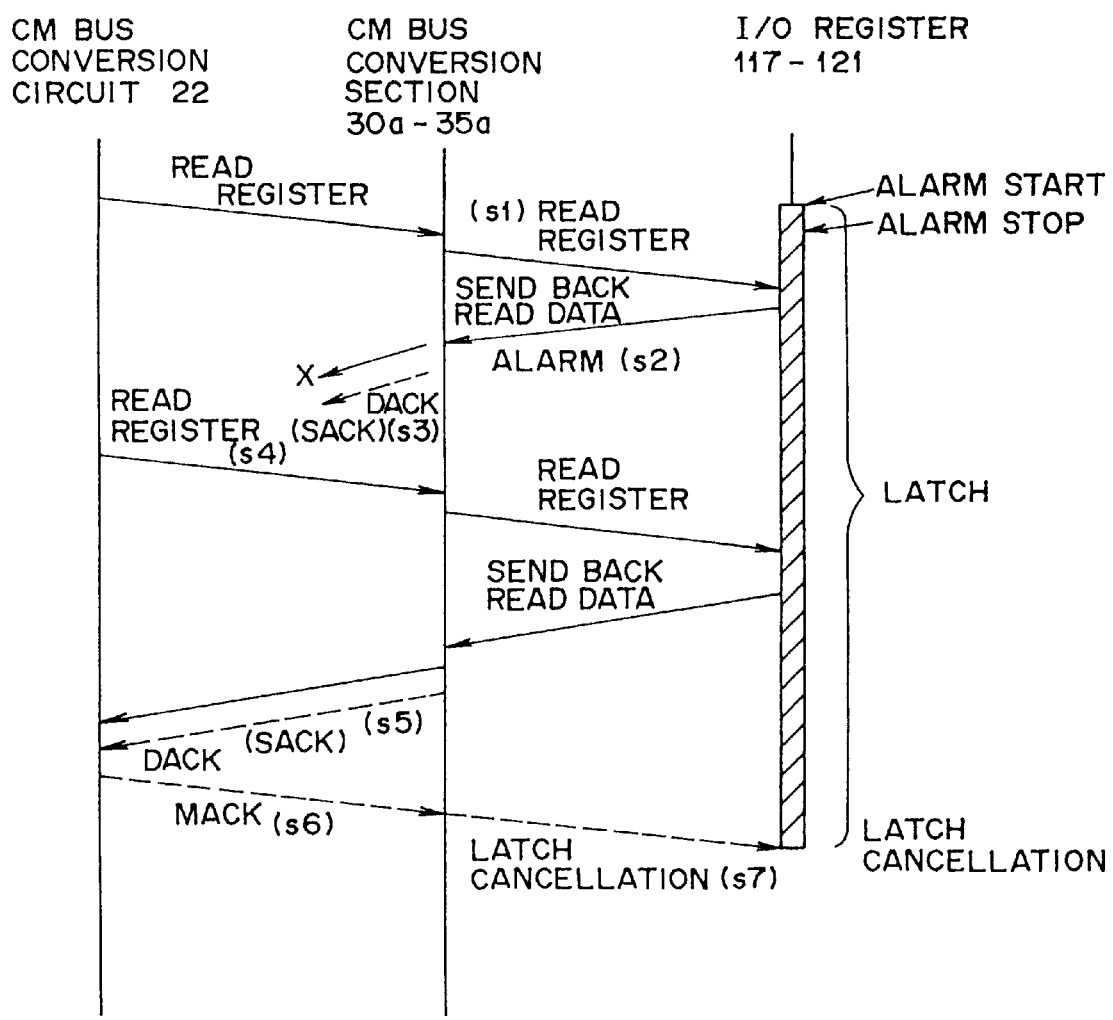
FIG. 20 is a signal sequence diagram for explaining the operation of the control system capable of coping with bus extension according to the fifth embodiment of the present invention.

The read-out data, which has been read out as the data designated by the read-out control information, is transmitted via the CM BUS conversion section 31a (see signal (s2) in FIG. 20). In this state, since no MACK signal has been received, the latched sate is not canceled.

Together with the read-out data, the CM BUS conversion section 31a sends a data acknowledgment signal DACK (SACK) as a signal indicating the reception of a normal read-out signal directed to the monitor/controlled object 37 accommodated in the shelve to which the CM BUS conversion section 31a belongs (see signal (s3) in FIG. 20).

When the parity check section 62 determines that the parity of the above-described read-out data transmitted to the CM BUS conversion circuit 22 is abnormal, the CPU 21 cannot recognize the reception of the DACK signal. In this case, the DACK window generation section 49 outputs a retry pulse, so that the read-out control information, together with the address information, is again transmitted to the CH interface sections 30–35 (see signal (s4) in FIG. 20).

At this time, in the I/O register 117 of the monitor/controlled object-side interface section 31b, the data which was latched by the latch section 122 in response to the previous read-out control signal has not been canceled and therefore can be read out from the latch section 122. Thus, the read-out data and a DACK signal are transmitted to the CM BUS conversion circuit 22 via the CM BUS conversion section 31a and the CM bus 23 in the same manner as in the above-described case (see signal (s5) in FIG. 20).

When a DACK signal is received in a state in which the result of parity check performed by the parity check section 62 of the CM bus conversion circuit 22 indicates that the parity of the received data is normal, the CPU 21 can recognize the reception of the DACK signal. In this case, the CPU 21 receives the high level signal "1" output from the AND circuit 66 as a MACK signal, and sends the MACK signal back to the CH interface section 31 via the RS-485 driver 58 (see signal (s6) in FIG. 20).

Since the I/O register 117 of the monitor/controlled object-side interface section 31b of the CH interface 31 receives the MACK signal together with a read-out control signal, the latched state of the latch section 122 is canceled (see signal (s7) in FIG. 20).

Figure 21:
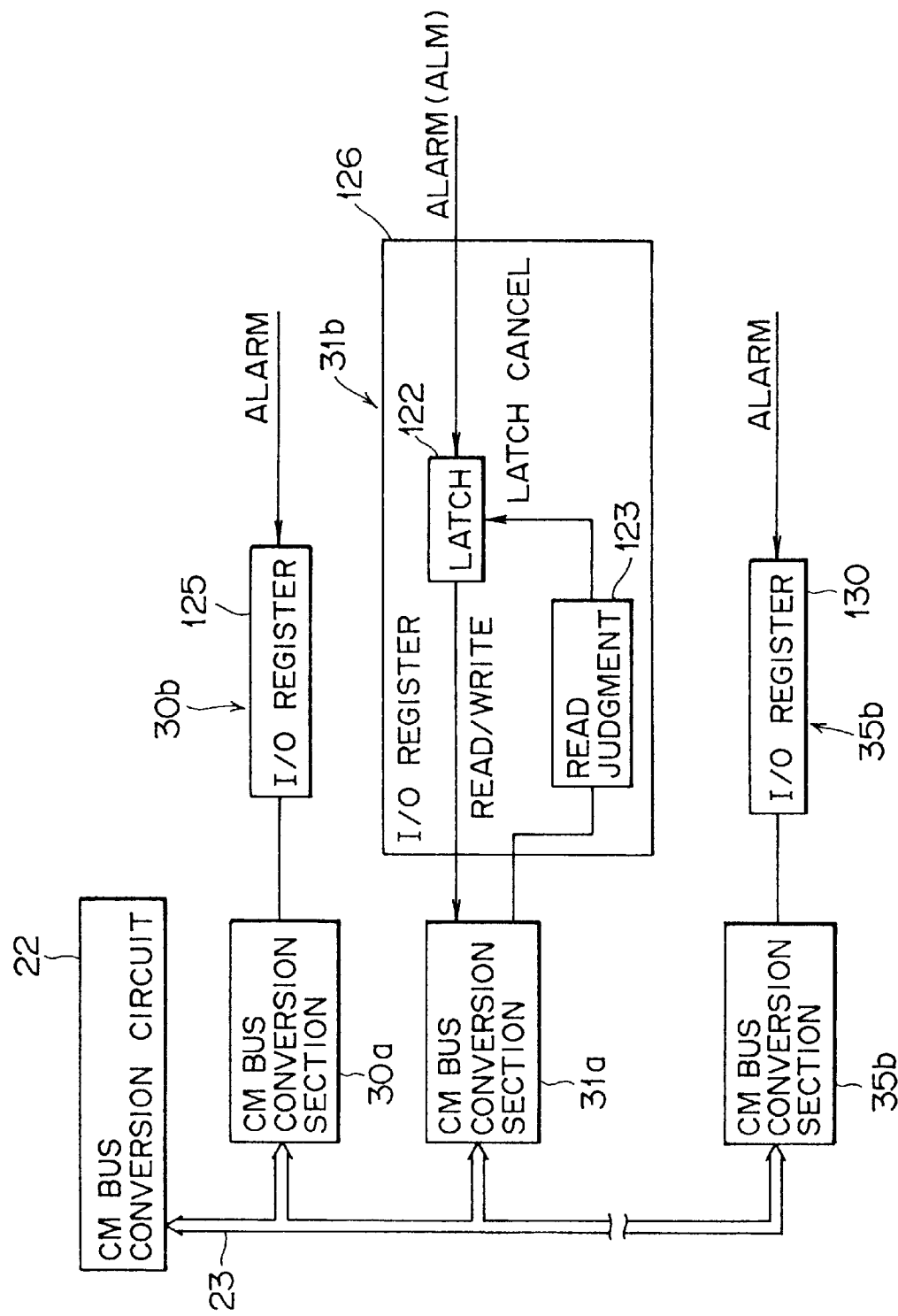
FIG. 21 is a block diagram for explaining the action and effects of the control system capable of coping with bus extension according to the fifth embodiment of the present invention.

Each of I/O registers 125–130 shown in FIG. 21 includes a read judgment section 123 and a latch section 122, which are similar to those used in the above-described I/O registers (see numerals 116–121). However, latching of data is performed by hardware and the latched sate is canceled by software when the data is read out by the software, whereby the read-break method is realized.

In detail, in the circuit shown in FIG. 21, when the read judgment section 123 receives a read-out control signal, it outputs to the latch circuit 122 a signal which indicates reception of the read-out control signal and which serves as a latch cancellation signal.

Figure 22:
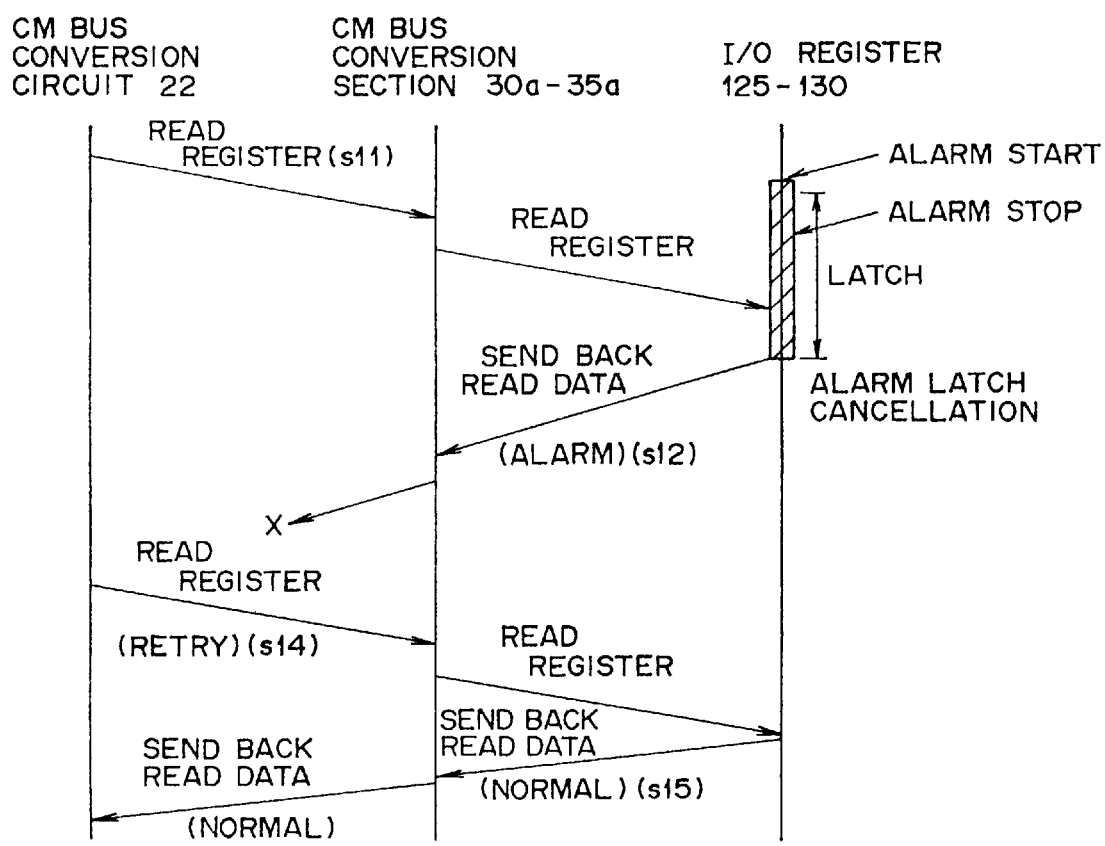
FIG. 22 is a signal sequence diagram for explaining the action and effects of the control system capable of coping with bus extension according to the fifth embodiment of the present invention.

The operation of the control system having the above-described structure will now be described. As shown in FIG. 22, when a memory read out request is generated from the CPU 21, the CM BUS conversion circuit 22 at the master side transmits to the CH interface sections 30–35 address information together with read-out control information (see signal (s11) in FIG. 22).

When the CH interface sections 30–35 receive the read-out control information, the latch section 122 of the I/O register 125–130 (e.g., I/O register 126) in one of the monitor/controlled object-side interface sections 30b–35b, which corresponds to the control information, latches data to be read out (for example, information indicating the generation of an alarm signal ALM).

Subsequently, the data latched in the latch section 122 of the I/O register 126 is read out as the data designated by the read-out control information, and is transmitted via the CM BUS conversion section 31a (see signal (s12) in FIG. 22). At this time, the data latched in the latch section 122 is canceled.

When the parity check section 62 determines that the parity of the above-described read-out data transmitted to the CM BUS conversion circuit 22 is abnormal, the CPU 21 cannot recognize the reception of the DACK signal. In this case, the DACK window generation section 49 outputs a retry pulse, so that the read-out control information, together with the address information, is again transmitted to the CH interface sections 30–35 (see signal (s14) in FIG. 22).

However, in the I/O register 126, the data latched in the latch section 122 has already been canceled after the data was read out. Therefore, data in the latching section 122 after the cancellation of the latched state is read out (see signal (s15) in FIG. 22), so that read-out data designated by the read-out control signal can not be read out.

In the control system capable of coping with bus extension according to the present embodiment, as shown in FIGS. 18–20, data can be latched by the hardware (latch section 122) until the software (CPU 21) recognizes the data. Therefore, in this system as well, there can be obtained the merit of the read-break method. That is, it is possible to reliably transmit information from the hardware to the software regardless of the polling period.

As described above, in the control system capable of coping with bus extension according to the fifth embodiment of the present invention, the data latched by the latch section 122 can be canceled when a MACK signal serving as a permission signal reception notification is received from the RS-458 driver 58 after the control section reads out the read-out data latched in the latch section 122. Therefore, data can be latched by the hardware until the software recognizes the data. Accordingly, in this system as well, there can be obtained the merit of the read-break method. That is, it is possible to reliably transmit information from the hardware to the software regardless of the polling period.

(g) Sixth Embodiment

Figure 23:
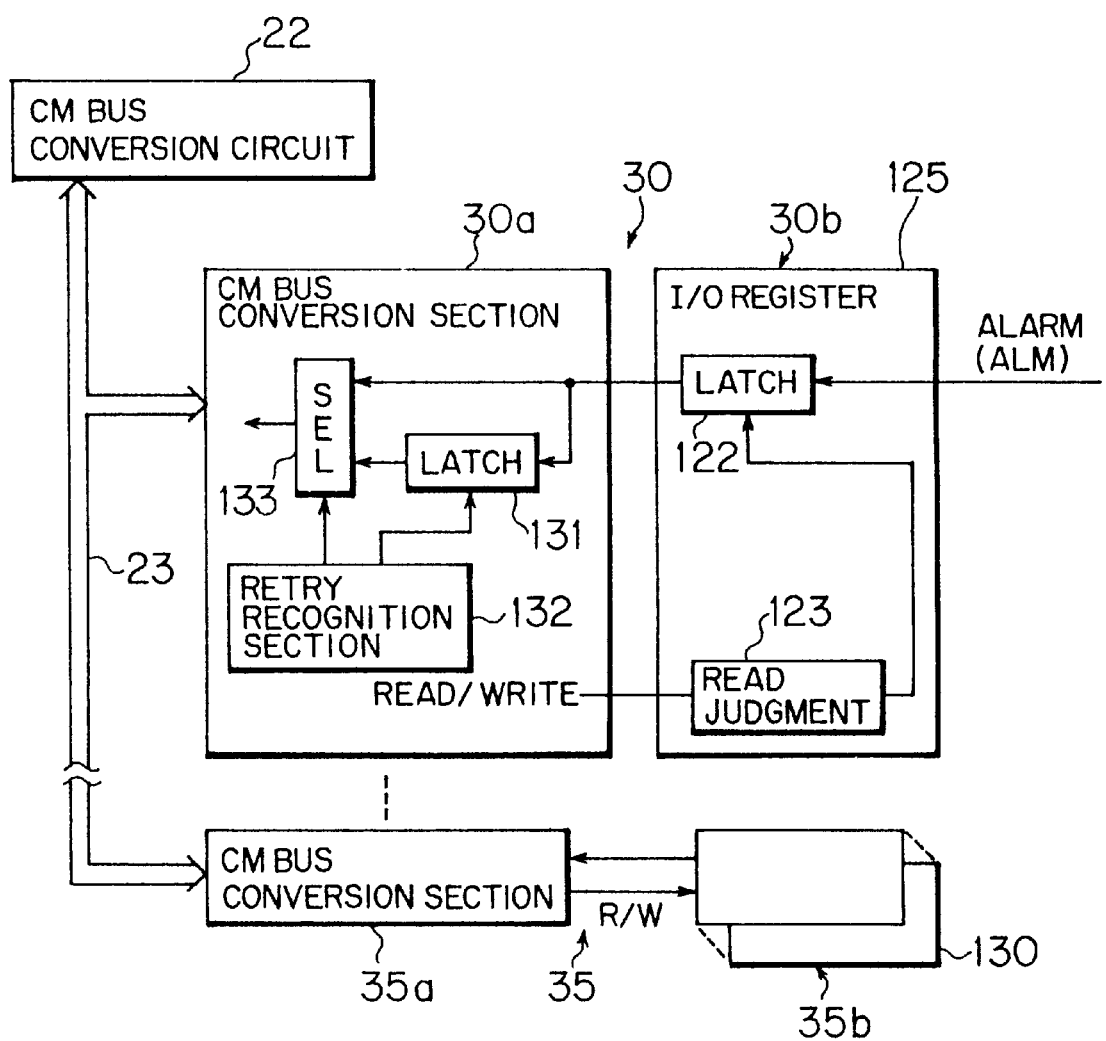
FIG. 23 is a block diagram showing a main portion of a control system capable of coping with bus extension according to a sixth embodiment of the present invention.

FIG. 23 is a block diagram showing a main portion of a control system capable of coping with bus extension according to a sixth embodiment of the present invention. As in the control system according to the fifth embodiment, in the control system shown in FIG. 23, the software of the SEMU 20 employs the read-break method when data read-out operation is performed for the monitor/controlled objects 36–41 (see FIG. 2), thereby making it possible to reliably transmit information from the hardware to the software regardless of the polling period.

The SEMU 20 according to the present embodiment is basically the same as the SEMU 20 according to the fifth embodiment. That is, as in the fifth embodiment, the CM BUS conversion circuit 22 has a structure such that when a DACK signal (SACK signal) is received from a shelve 24–29, the CM BUS conversion circuit 22 sends back to the shelve 24–29 a MACK signal serving as a permission signal reception notification, thereby notifying the reception of the DACK signal (SACK signal).

From the view point of functions, the monitor/controlled object-side interface sections 30b–35b includes I/O registers 125–130 for performing data read/write operation for each of the monitor/controlled objects 36–41, as shown in FIG. 23. Each of the I/O registers 125–130 consists of a latch section 122 and a read judgment section 123, which are the same as those shown in FIG. 21. FIG. 23 shows in detail only the structure of the I/O register 125 of the monitor/controlled object-side interface sections 30b.

Figure 24:
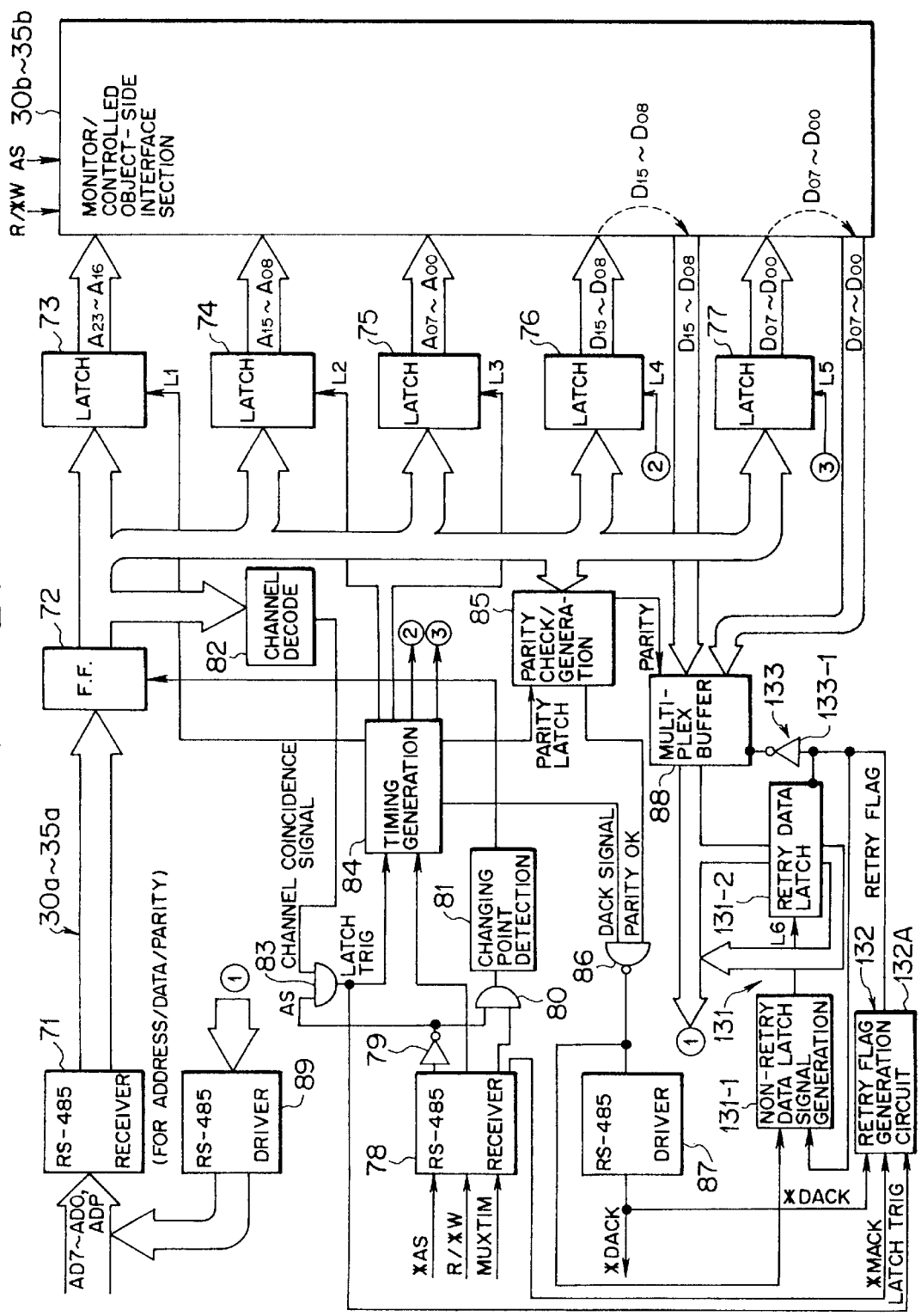
FIG. 24 is a block diagram showing a CH interface section according to the sixth embodiment of the present invention.

From the view point of functions, each of the CM BUS conversion sections 30a–35a includes a latch section 131, a retry recognition section 132, and a selector L33. Specifically, each of the CM BUS conversion sections 30a–35a has a hardware structure as shown in FIG. 24.

The latch section 131 functions as a data holding section for temporarily holding data output from the latch section 122.

The retry recognition section 132 judges whether data received from the SEMU 20 is retry data. In detail., when the SEMU 20 outputs address information together with read-out control information so as to perform data read-out control for the shelves 24–29, notification information is output from the AND circuit 86. The retry recognition section 132 judges, on the basis of the notification information from the AND circuit 86, whether the read-out control information and address information are output by retransmission processing. Thus, the retry recognition section 132 functions as a retransmission output recognition section.

The selector (SEL) 133 outputs to the SEMU 20 the read-out data which is output from the latch section 122 when it is judged by the retry recognition section 132 that the read-out control information and the address information was output first time. When it is judged by the retry recognition section 132 that the read-out control information and the address information was output by retransmission processing, the selector (SEL) 133 outputs to the SEMU 20 the data which is held in the latch section 131. Thus, the selector 133 functions as an output data selecting section.

In detail, the latch section 131 includes a non-retry data latch signal generation section 131-1 and a retry data latch section 131-2, as shown in FIG. 24.

The non-retry data latch signal generation section 131-1 receives a DACK signal (*DACK) from the NAND circuit 86 and a retry flag from a retry flag generation circuit 132A, which will be described later. The non-retry data latch signal generation section 131-1 detects an edge of the DACK signal, and outputs a non-retry data latch signal (L6) to the retry data latch section 131-2 when the retry flag is not set.

The retry data latch section 131-2 latches multiplexed read-out data ($D_{15}$–$D_{00}$ and parity data) from the multiplex buffer 88 when the retry data latch section 131-2 receives a non-retry data latch signal from the non-retry data latch signal generation section 131-1. When the retry data latch section 131-2 receives a retry flag from the retry flag generation circuit 132A, which will be described later, the retry data latch section 131-2 outputs the latched data to the CM bus 23 via the RS-485 driver 89.

Figure 25:
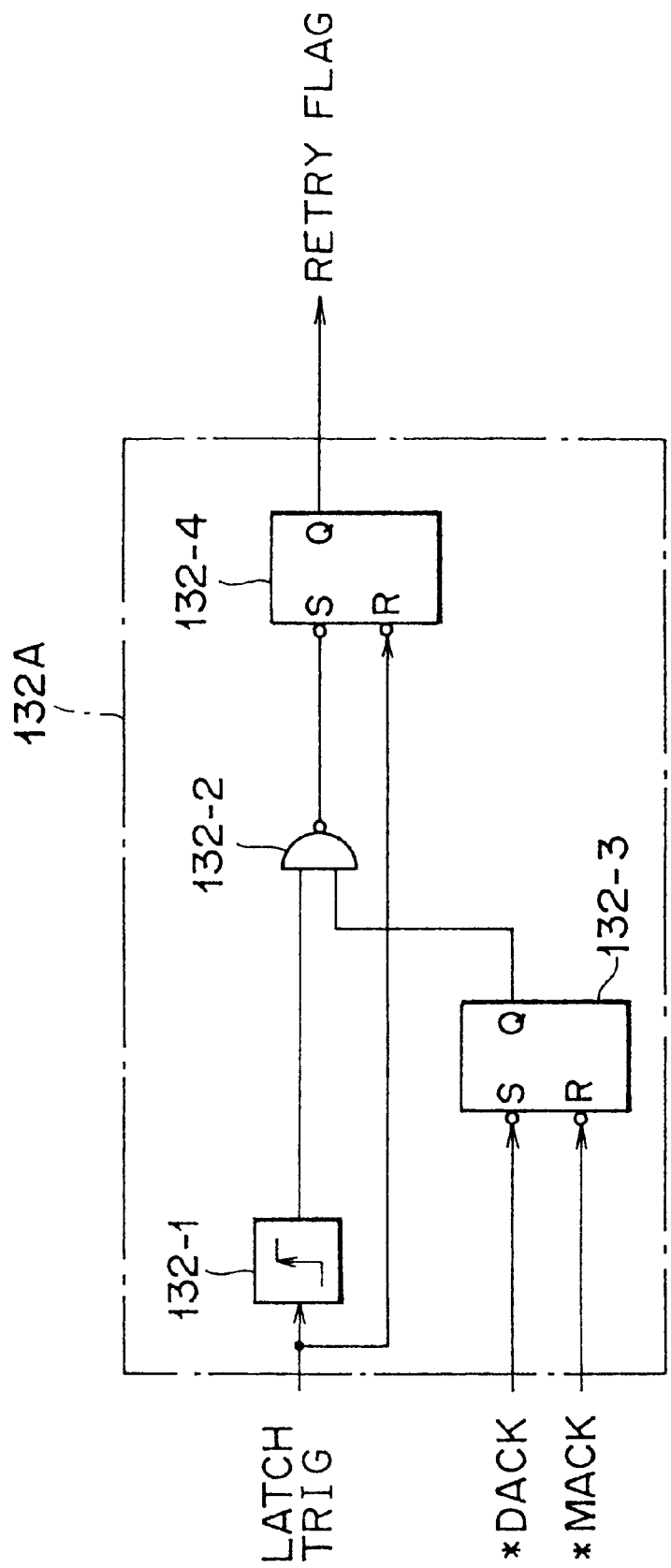
FIG. 25 is a block diagram showing the structure of a retry flag generating circuit according to the sixth embodiment of the present invention.

In detail, the retry recognition section 132 is formed by the retry flag generation circuit 132A shown in FIGS. 24 and 25. As shown in FIG. 25, the retry flag generation circuit 132A includes a latch trigger rising detection section 132-1, a NAND circuit 132-2, and two RS flip-flops 132-3 and 132-4.

Figure 26:
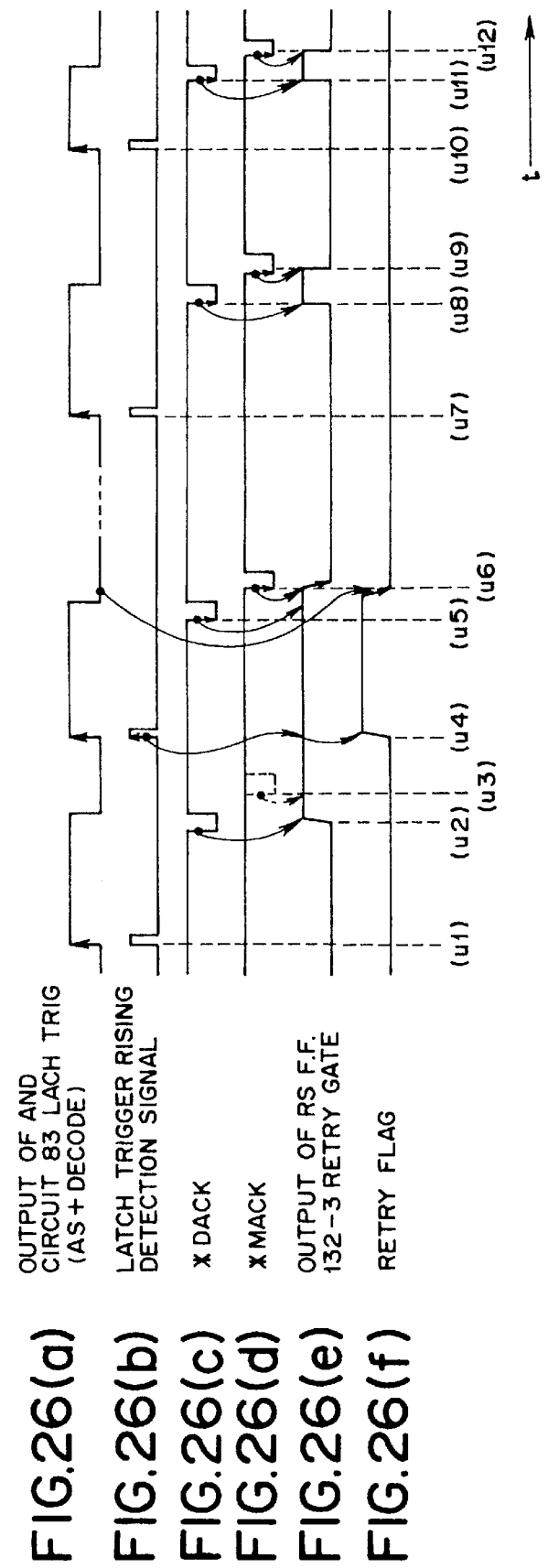
FIG. 26(a)–FIG. 26(f) are timing diagrams for explaining the operation of the control system capable of coping with bus extension according to the sixth embodiment of the present invention.

The latch trigger rising detection section 132-1 detects the rising of latch trigger signals output from the AND circuit 83 and outputs pulses upon detection of the leading edges of the latch trigger signals (for example, see points in time (u1), (u4), (u7) and (u10) shown in (a) and (b) of FIG. 26.

Input to the RS flip-flop 132-3 as a set input is a signal obtained by inverting a DACK signal (*DACK) which is sent to the CM bus 23 via the RS-485 driver 87. Input to the RS flip-flop 132-3 as a rest input is a signal obtained by inverting a MACK signal (*MACK) which is received via the RS-485 receiver 78.

Therefore, the RS flip-flop 132-3 outputs "1" when the DACK signal falls while the MACK signal is "1", as shown at points in time (u2), (u8) and (u11) in (c)–(e) of FIG. 26. The RS flip-flop 132-3 outputs "0" when the MACK signal falls while the DACK signal is "1", as shown at points in time (u6), (u9) and (u12) in (c)–(e) of FIG. 26.

The NAND circuit 132-2 performs the NAND operation between an output signal from the latch trigger rising detection section 132-1 and an output signal from the RS flip-flop 132-3.

The RS flip-flops 132-4 receives an output signal from the NAND circuit 132-2 as a set input and a latch trigger signal from the AND circuit 83 as a reset input. The RS flip-flop 132-4 outputs a signal serving as a retry flag.

Based on the DACK signal and the MACK signal and at the timing at which the above-described AND circuit 83 outputs a latch trigger signal, the retry flag generation circuit 132A judges whether the read-out request signal output to the monitor/controlled object-side interface sections 30b–35b is a retry signal (a signal which is output by retransmission processing). When the data is retry data, the retry flag generation circuit 132A outputs "1" (see points in time (u4)–(u6) in (f) of FIG. 26). When the data is not retry data, the retry flag generation circuit 132A outputs "0" (see points in time (u1)–(u4) and (u6)–(u12) in (f) of FIG. 26).

As shown in FIG. 24, the selector 133 is formed by a NOT circuit 133-1. When the retry flag from the retry flag generation circuit 132A is "1", the NOT circuit 133-1 outputs a low level signal "0" so as to select the data from the latch section 122 (stored in the multiplex buffer 88). When the retry flag from the retry flag generation circuit 132A is "0", the NOT circuit 133-1 outputs a high level signal "1" so as to select the data from the latch section 131 (stored in the retry data latch section 131-2).

In other words, when the data signals sent to the monitor/controlled object-side interface sections 30b–35b are retry data, the retry flag becomes "1", so that the multiplexed data latched by the retry data latch section 131-2 is output while the multiplexed data from the multiplex buffer 88 is prevented from being output.

When the signals sent to the monitor/controlled object-side interface sections 30b–35b are not retry data, the retry flag becomes "0", so that the multiplexed data from the multiplex buffer 88 is output while the multiplexed data latched by the retry data latch section 131-2 is prevented from being output.

The operation of the control system according to the sixth embodiment of the present invention having the above-described structure will now be described in detail with reference to the signal sequence shown in FIG. 27.

First, a description will be given of the case where a request (not retry) for reading out monitor data from the monitor/controlled objects 36–41 is generated from the CPU 21 of the SEMU 20. In this case, read-out control information and address information are transmitted to a desired CH interface section 30–35 via the CM bus 23 (see signal (v1) in FIG. 27).

Figure 27:
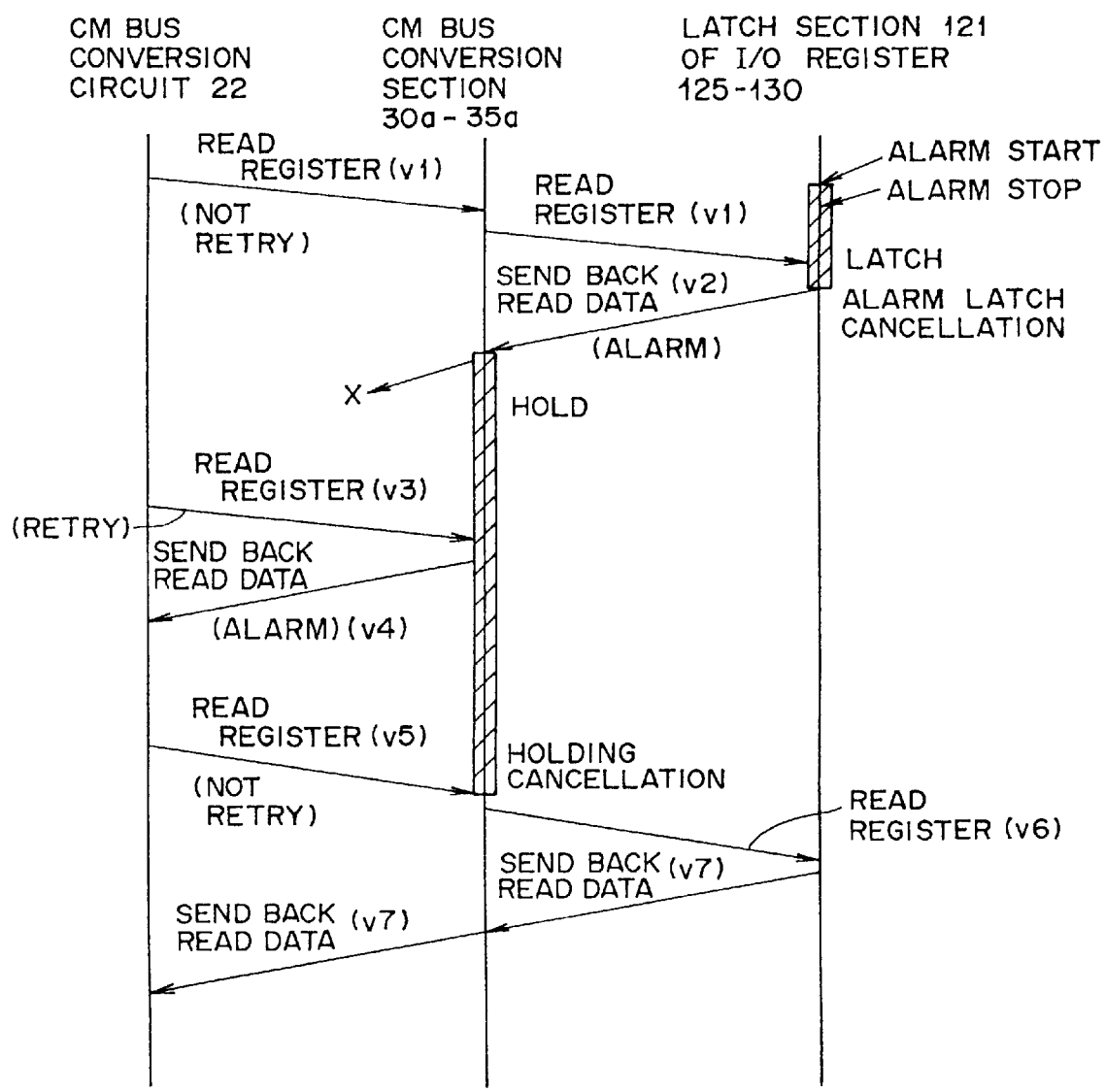
FIG. 27 is a signal sequence diagram for explaining the operation of the control system capable of coping with bus extension according to the sixth embodiment of the present invention.

The data (monitor data) latched in the latch section 122 of the monitor/controlled object-side interface section 30b–35b is canceled after the CPU 21 reads out the data (see signal (v2) in FIG. 27). At this time, the read-out data is latched by the retry data latch section 131-2.

When the above-described data is read out, the CM BUS conversion section 30a–35a outputs a DACK signal via the RS-485 driver 87, as well as the thus-read out data.

When the CPU 21 outputs the read-out control information and address information so as to perform the next read-out operation for the monitor/controlled object-side interface section 30b–35b, the retry flag generation circuit 132A serving as the retry recognition section 132 judges, on the basis of the MACK signal from the CM BUS conversion circuit 22, whether the read-out request signal is a retry signal.

In the case where an error occurs as shown by the signal (v2) when the data stored in the latch section 122 is read out, the CM BUS conversion circuit 22 cannot recognize a DICK signal. In this case, retransmission processing (retry processing) is performed. That is, the CPU 21 again performs the read-out operation so as to read out the above-described data (see signal (v3) in FIG. 27).

When the retry flag, which is output from the retry flag generation circuit 132A as a result of judgment, is "1" (see points in time (u4)–(u6) in FIG. 26), it section that the data requested to be read is retry data. The data latched by the retry data latch section 131-2 is selected and output to the SEMU 20 as the retry data (see signal (v4) in FIG. 27).

When the above-described data is transmitted, a DACK signal is also transmitted. When the retransmission data is normally received by the SEMU 20, a MACK signal is transmitted from the AND circuit 66 of the CM BUS conversion circuit 22 via the RS-485 driver 58 thereof.

When the CM BUS conversion section 30a–35a, which has transmitted the DACK signal, receives the MACK signal which serves to notify the reception of the DACK signal, the data latched by the latch section 131 is replaced with the next read-out data when the next read-out control information is received (see signal (v5) in FIG. 27).

In detail, when the next read-out control information is received after the MACK signal is received, the retry flag from the retry flag generation circuit 132A is "0" (see points in time (u1)–(u4) and (u6)–(u12) in FIG. 26), and the data requested to be read is not retry data. Accordingly, the data latched by the latch section 122 is output to the SEMU 20 via the multiplex buffer 88 (signals (v6) and (v7) in FIG. 27).

In other words, when no DACK signal is recognized by the CM BUS conversion circuit 22 and therefore retransmission processing (retry processing) is performed, the next cycle is started before the retry flag generation circuit 132A of the CM BUS conversion section 30a–35a receives the MACK signal. In this case, the retry flag generation circuit 132A judges that the read-out request in the next cycle is for retry.

For this read-out request, the data held by the latch section 131 is sent back without access to the latch section 122, so that the data requested by the retry read-cut request can be sent back.

As described above, in the control system capable of coping with bus extension according to the six embodiment of the present invention, the CM BUS conversion circuit 22 includes the AND circuit 66 and the RS-485 driver 57, which serve as a permission signal reception notification section, and each of the CH interface sections 30–35 of the shelves 24–29 includes the latch section 122 serving as a data latch section, the latch section 131 serving as a data holding section, the retry flag generation circuit 132A serving as a retransmission output recognition section, and the DOT circuit 133-1 serving as an output data selecting section. Therefore, as in the fifth embodiment, data can be latched by the hardware until the software recognizes the data. Accordingly, in this system as well, there can be obtained the merit of the read-break method. That is, it is possible to reliably transmit information from the hardware to the software regardless of the polling period.

Moreover, retransmission on the CM bus 23 can be performed within the CM bus 23. Accordingly, in the data latch section 122 which holds monitor data in the read-break method, it is unnecessary to take account of the CM bus existing between the CPU 21 and the latch section 122, so that the latch section 122 does not require any special processing in relation to retransmission. This makes the functions shared by the respective sections clearer.

Moreover, it becomes unnecessary to input a latch canceling signal to the latch section 122 of each of the monitor/controlled object-side interface sections 30b–35b.

(h) Seventh Embodiment

Figure 28:
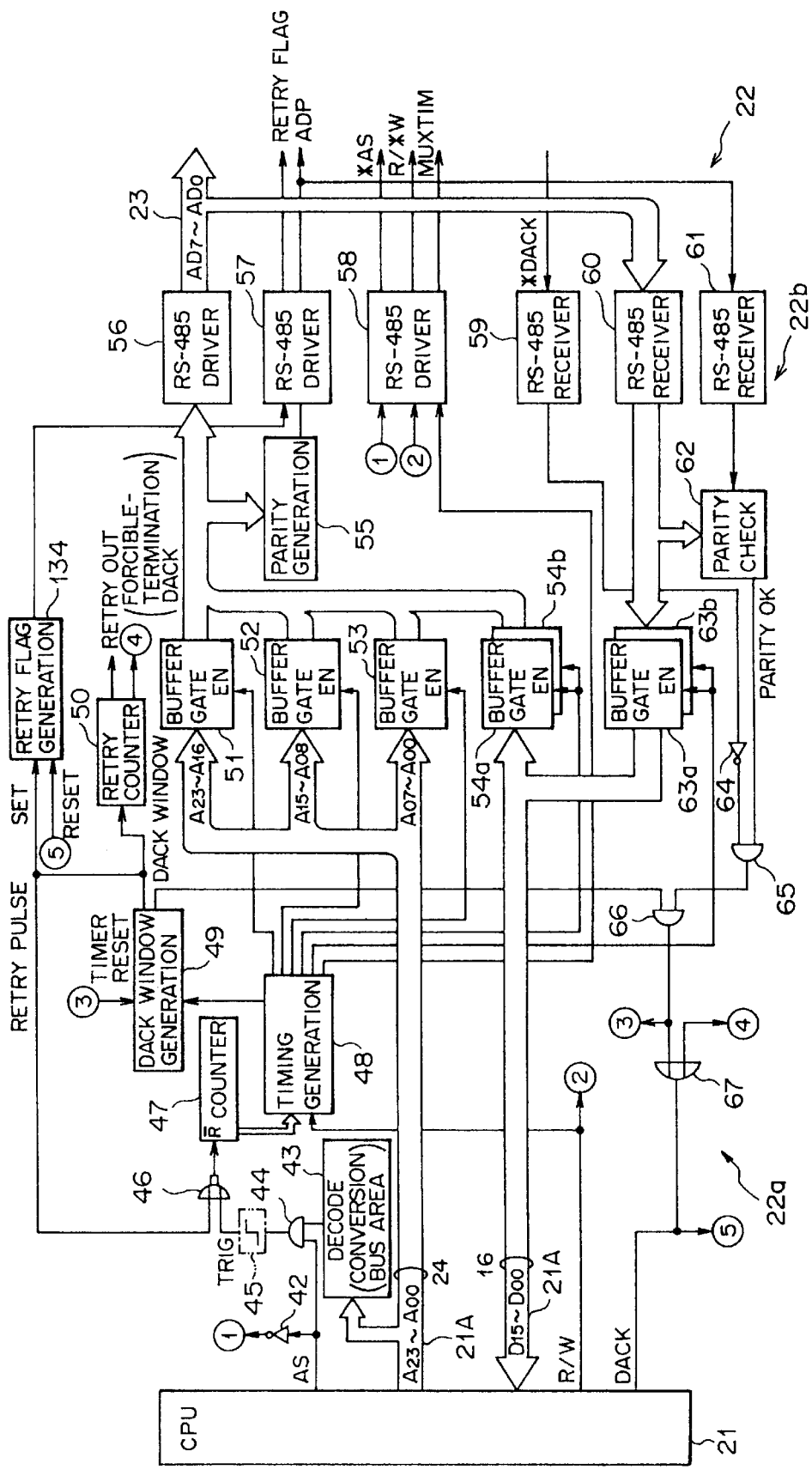
FIG. 28 is a block diagram showing an SEMU according to a seventh embodiment of the present invention.
Figure 29:
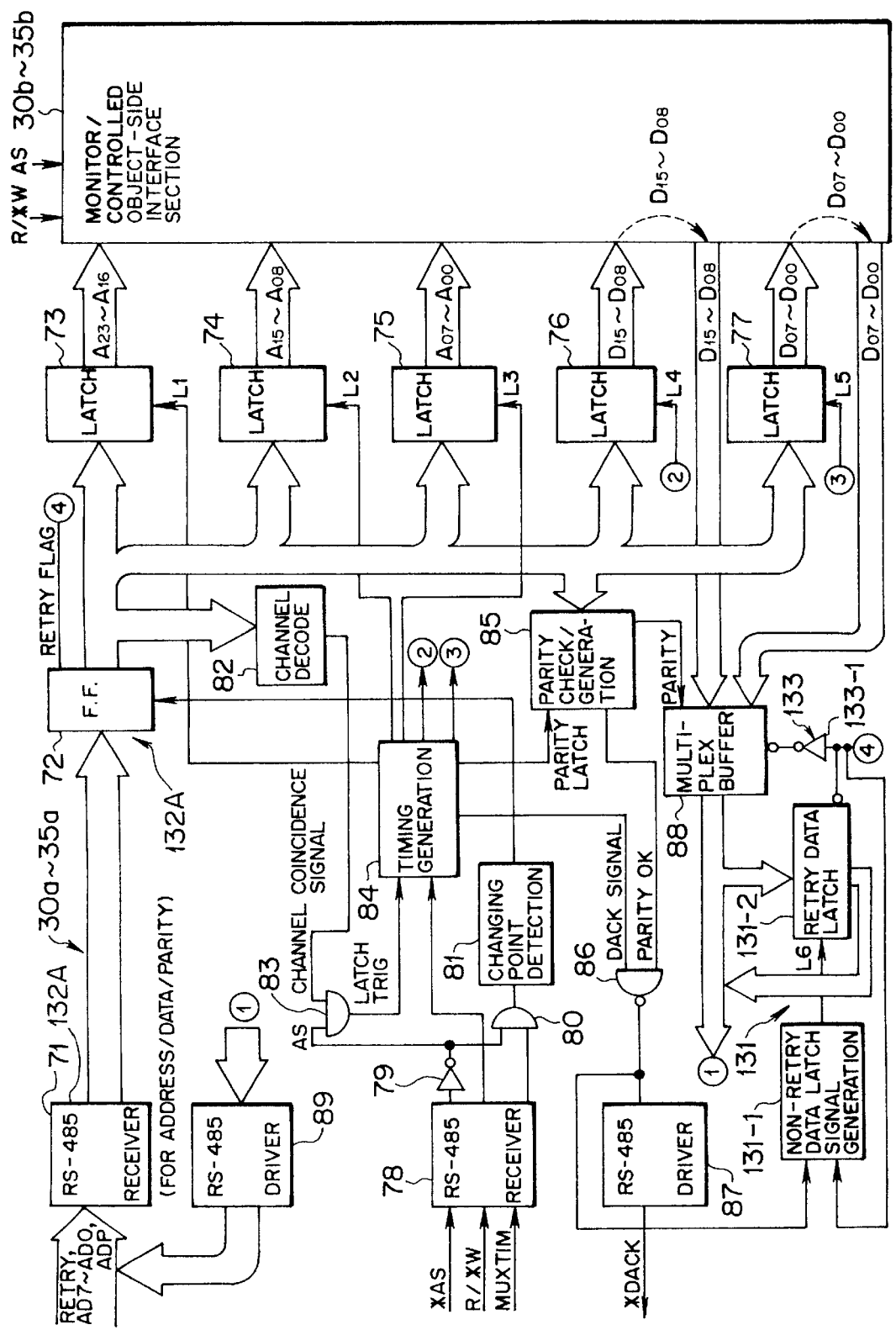
FIG. 29 is a block diagram showing a CH interface section according to the seventh embodiment of the present invention.

FIG. 28 is a block diagram showing the SEMU of a control system capable of coping with bus extension according to a seventh embodiment of the present invention. FIG. 29 is a block diagram showing the CH interface sections 30–35 of the control system capable of coping with bus extension according to the seventh embodiment of the present invention.

As in the control systems according to the fifth and sixth embodiments, in the control system of the present embodiment, the software of the SEMU 20 employs the read-break method when data read-out operation is performed for the monitor/controlled objects 36–41 (see FIG. 2), thereby making it possible to reliably transmit information from the hardware to the software regardless of the polling period.

The SEMU 20 of the control system according to the present embodiment includes a retry flag generation section 134 in addition to the sections and elements used in the SEMU 20 of the first embodiment. In other words, the SEMU 20 of the present embodiment differs from that of the sixth embodiment in that the CM BUS conversion circuit 22 does not function as a permission signal reception notification section but has the retry flag generation section 134, which serves as a flag addition section.

As in the first embodiment (see FIG. 2), the CH interface sections 30–35 according to the present embodiment are provided in the shelves 24–29 connected to the SEMU 20 via the CM bus 23. When the manner of data transmission performed in response to a data read-out request from the SEMU 20 is considered, the CH interface sections 30–35 of the present embodiment have the same structure as the CH interface sections 30–35 of the sixth embodiment (see FIG. 23). However, the method for judging whether the data read-out request is for retry is different from the sixth embodiment. In FIG. 29, the same portions as those shown in FIGS. 23 and 24 are denoted by the same reference numbers.

In other words, each of the CM BUS conversion sections 30a–35a has a retry recognition section 132A different from the retry recognition section 132 of the sixth embodiment.

The retry flag generation section 134 of the CM BUS conversion circuit 22 receives a timer reset signal from the DACK window generation section 49 as a set input as well as a DACK signal from the OR circuit 67 as a reset input so as to output a retry flag, which indicates that a read-out request presently output is for retry (retransmission processing).

Figure 30:
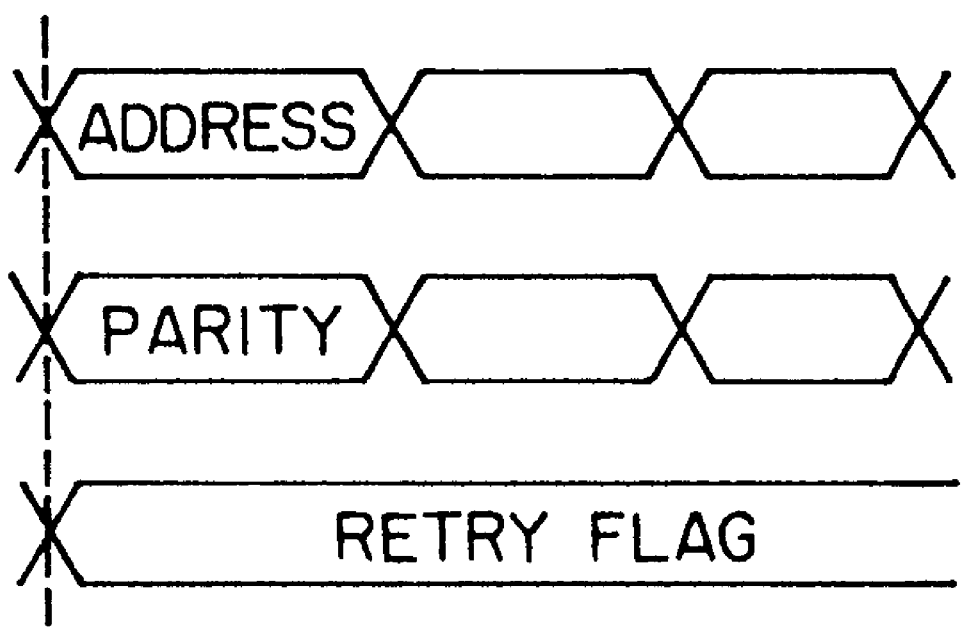
FIG. 30 is a diagram showing address information, parity information and a retry flag which are transmitted in a multiplexed state from the SEMU according to the seventh embodiment of the present invention.

The retry flag generated by the retry flag generation section 134 is output through the RS-485 driver 57, so that the retry flag is multiplexed together with address information and parity information and is transmitted via the CM bus 23. Specifically, the multiplexed address information, parity information, and retry flag are transmitted as shown in FIG. 30.

Therefore, the retry flag generation section 134 functions as a flag adding section. That is, when address information, parity information, and read-out control information are again output via the CM bus 23, the retry flag generation section 134 adds a retry flag, which indicates the retransmission of the information, to signals which are transmitted by the RS-485 driver 57.

The retry recognition section 132A of the CM BUS conversion sections 30a–35a functions as a retransmission output recognition section. In detail, when the SEMU 20 outputs address information, parity information, and readout control information so as to perform data read-out control for the shelves 24–29, the retry recognition section 132A judges, on the basis of the retry flag added to the address information, parity information and read-out control information, whether the above-described data read-cut request is output by retransmission processing. Specifically, the retry recognition section 132A is composed of the RS-485 receiver 71 and the flip-flop circuit 72 shown in FIG. 29.

The RS-485 receiver 71 receives via the CM bus 23 the retry flag as well as the address and parity information transmitted from the RS-485 driver 57 of the CM BUS conversion circuit 22. The received information is output to the flip-flop circuit 72.

The received information output from the RS-485 receiver 71 to the flip-flop circuit 72 is output in accordance with signals (timing information) from the changing point detection section 81. That is, the address information (or data information) is output to the latch sections 73–77; the parity information is output to the parity check/generation section 85; and the retry flag is output to the non-retry data latch signal generation section 131-1, the retry data latch section 131-2, and the NOT circuit 133-1 (see ④ in FIG. 29).

As in the sixth embodiment, the latch section 122 (see FIG. 23), which forms each of the I/O registers 125–130 of the monitor/controlled object-side interface sections 30b–35b, holds monitor data output from the monitor/controlled objects 36–41. The latch section 122 functions as a data latch section for latching read-out data until the SEMU 20 reads out the data.

The non-retry data latch signal generation section 131-1 and the retry data latch section 131-2, which form the latch section 131, function as a data holding section for temporarily holding data output from the latch section 122.

The NOT circuit 133-1, which forms the selector 133, functions as an output data selection section. That is, when it is judged that the received read-out request was first one, the NOT circuit 133-1 outputs to the SEMU 20 the read-out data output from the latch section 122. When it is judged that the read-out request was output by retransmission process, the NOT circuit 133-1 outputs to the SEMU 20 the data which is held in the latch section 131.

The operation of the control system according to the present embodiment having the above-described structure will be described with reference to FIG. 31.

In the present embodiment as well, when monitor data is read out, signals as shown in FIG. 27 are exchanged between the SEMU 20 and the CH interface sections 30–35.

Figure 31:
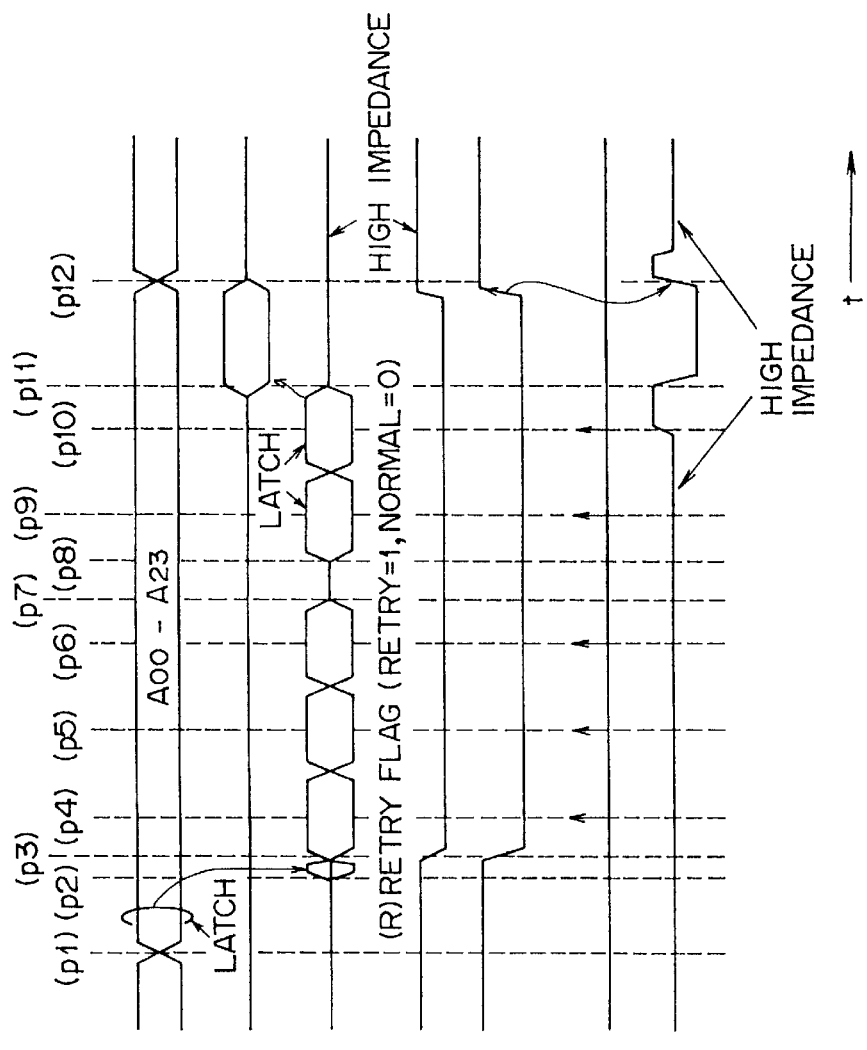
FIG. 31(a)–FIG. 31(g) are timing diagrams for explaining the operation of the control system capable of coping with bus extension according to the seventh embodiment of the present invention.

That is, when the CPU 21 of the SEMU 20 generates a request for reading out monitor data from the monitor/controlled objects 36–41 (see points in time (p1)–(p12) in (a) of FIG. 31), the RS-485 drivers 56 and 57 transmit through the CM bus 23 address information, parity information, and a retry flag, which indicates whether the read-out request is for retransmission processing (retry) (see points in time (p2)–(p7) in (c) of FIG. 31), and signal (v1) in FIG. 27).

Also, the CM BUS conversion circuit 22 transmits the above-described address information, parity information, and a retry flag, while the RS-485 driver 58 transmits control information.

Specifically, a READ/WRITE control signal (R/*W) severing as an operation mode signal is transmitted during the period between (p3)–(p12) in (d) of FIG. 31, an address/data strobe signal (*AS) serving as a data valid signal is transmitted during the period between (p3)–(p12) in (e) of FIG. 31, and address/data multiplex timing signal (MUXTIM) serving as timing signals are transmitted at points in time (p4), (p5), (p6), (p9), and (p10) in (f) of FIG. 31.

The data (monitor data) latched in the latch section 122 of the monitor/controlled object-side interface section 30b–35b is canceled after the CPU 21 reads out the data (see the period between (p8)–(p11) in (c) of FIG. 31 and signal (v2) in FIG. 27). At this time, the read-out data is latched by the retry data latch section 131-2.

When the above-described data is read out, the CM BUS conversion section 30a–35a outputs a DACK signal via the RS-485 driver 87, as well as the thus-read out data.

When the flip-flip circuit 72 serving as the retry recognition section 132A has received a retry flag (see the period between (p2) and (p3) in (c) of FIG. 31), the data requested to be read out is retry data.

In the case where an error occurs as shown by the signal (v2) when the data stored in the latch section 122 is read out, the CM BUS conversion circuit 22 cannot detect a DACK signal. In this case, retransmission processing (retry processing) is performed. That is, the CPU 21 again performs the read-out operation so as to read out the above-described data (see signal (v3) in FIG. 27).

When the retry flag output from the flip-flop circuit 72 is "1", it means that the data requested to be read is retry data. In this case, the data latched by the retry data latch section 131-2 is selected and output to the SEMU 20 (see signal (v4) in FIG. 27).

When the data from the data latch section 131 is: normally received by the CPU 21 of the SEMU 20, a retry flag added to the next data read-out request becomes "0" (see signal (v5) in FIG. 27). When the CM BUS conversion section 30a–35a receives the retry flag, the CM BUS conversion section 30a–35a replaces the data latched by the latch section 131 with the next read-out data.

In other words, when the next read-out control information is received from the SEMU 20, the retry flag from the flip-flop circuit 72 is "0", and the data requested to be read is not retry data. Accordingly, the data latched by the latch section 122 is output to the SEMU 20 via the multiplex buffer 88 (signals (v6) and (v7) in FIG. 27).

In other words, when no DACK signal is recognized by the CM BUS conversion circuit 22 and therefore retransmission processing (retry processing) is performed, the retry flag generation section 134 adds a retry flag to address information and parity information to be transmitted.

The flip-flop circuit 72 of the CM BUS conversion section 30a–35a, determines, on the basis of the retry flag added to the address information and the parity information, which form reception information, whether the signals are output by retransmission process.

Therefore, for a read-out request to which a retry flag is added, the data held by the latch section 131 is sent back without access to the latch section 122, so that the data requested by the retry read-out request can be sent back.

Therefore, retransmission on the CM bus 23 can be performed within the CM bus 23. Accordingly, in the data latch section 122 which holds monitor data in the read-break method, it is unnecessary to take account of the CM bus existing between the CPU 21 and the latch section 122, so that the latch section 122 does not require any special processing in relation to retransmission. This makes the functions shared by the respective sections clearer. Moreover, it becomes unnecessary to input a latch canceling signal to the latch section 122 of each of the monitor/controlled object-side interface sections 30b–35b.

As described above, in the control system capable of coping with bus extension according to the seventh embodiment of the present invention, the CM BUS conversion circuit 22 includes the retry flag generation section 134; each of the monitor/controlled object-side interface sections 30b–35b includes the latch section 122; and each of the CM BUS conversion sections 30a–35a includes the non-retry data latch signal generation section 131-1, the retry data latch section 131-2, the RS-485 receiver 71, the flip-flop circuit 72, and the NOT circuit 133-1. Therefore, as in the sixth embodiment, data can be latched by the hardware until the software recognizes the data. Accordingly, in this system as well, there can be obtained the merit of the read-break method. That is, it is possible to reliably transmit information from the hardware to the software regardless of the polling period.

Moreover, since it is possible to add to address information a retry flag generated by the retry flag generation section 134 and to transmit it via the CM bus 23, it becomes unnecessary to use a different line for transmission of a signal which confirms reception of a DACK signal. Also, it becomes unnecessary to wait the sending-back of the reception notification of the DACK signal, so that the processing time can be shortened.

(i) Eighth Embodiment

Figure 32:
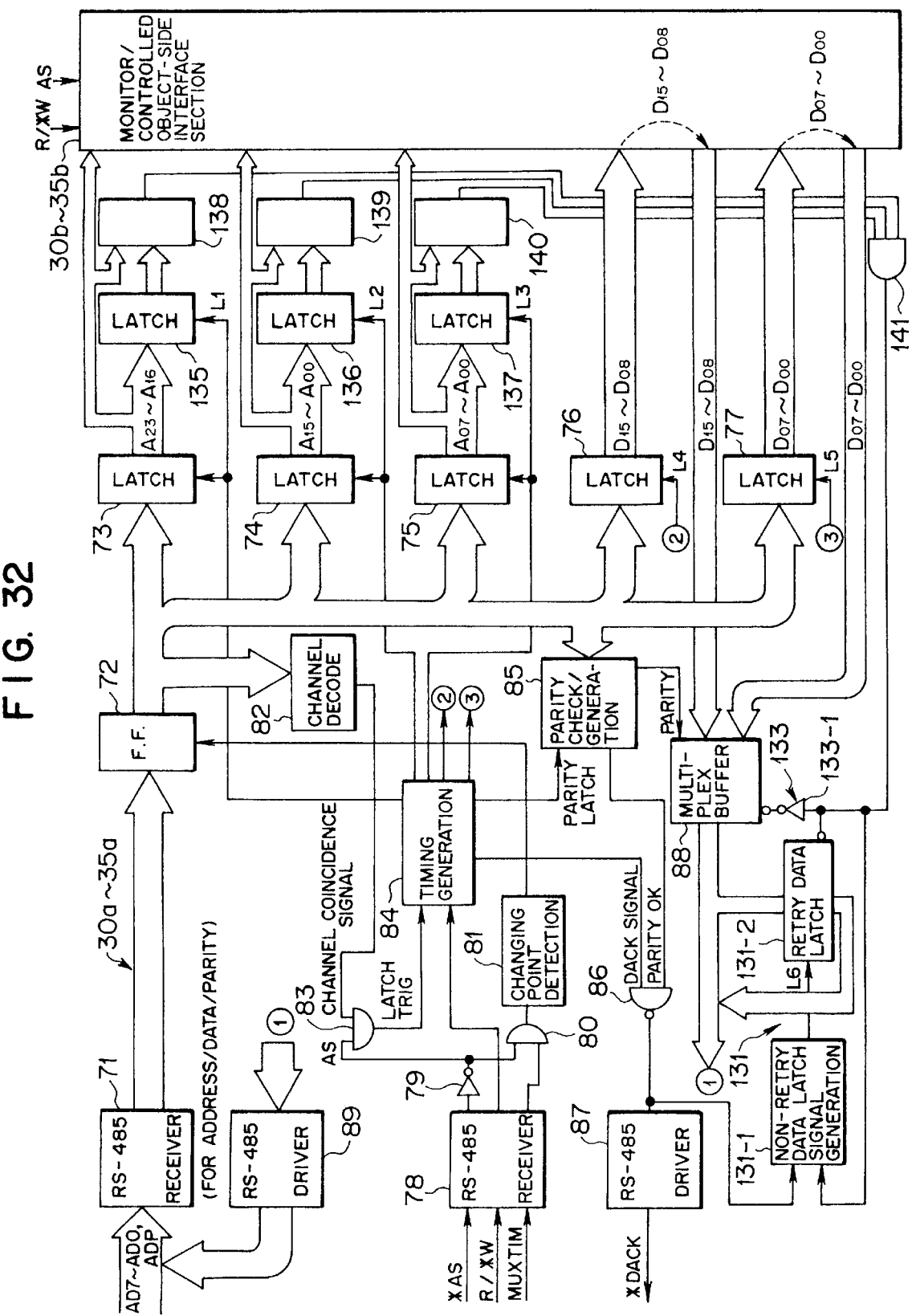
FIG. 32 is a block diagram showing a CH interface section according to an eighth embodiment of the present invention.

FIG. 32 is a block diagram showing the CH interface section 30–35 of a control system capable of coping with bus extension according to an eighth embodiment of the present invention. As in the control systems according to the fifth through seventh embodiments, in the control system of the present embodiment, the software of the SEMU 20 employs the read-break method when data read-out operation is performed for the monitor/controlled objects 36–41 (see FIG. 2), thereby making it possible to reliably transmit information from the hardware to the software regardless of the polling period.

The SEMU 20 of the control system according to the present embodiment is the same as the SEMU 20 of the control system according to the first embodiment. However, the CH interface sections 30–35, which are connected to the SEMU 20 through the CM bus 23 and which form the shelves 24–29, are different from those used in the first through seventh embodiments.

When the manner of data transmission performed in response to a data read-out request from the SEMU 20 is considered, the CH interface sections 30–35 of the present embodiment have the same structure as the CH interface sections 30–35 of the sixth and seventh embodiments (see FIG. 23). However, the method for judging whether the data read-out request is for retry is different from the sixth and seventh embodiments. In FIG. 32, the same portions as those shown in FIGS. 23, 24 and 29 are denoted by the same reference numbers.

In other words, each of the CM BUS conversion sections 30a–35a has a retry recognition section 132B different from the retry recognition sections 132 and 132A of the sixth and seventh embodiments.

The retry recognition section 132B of the CM BUS conversion sections 30a–35a according to the present embodiment functions as a retransmission output recognition section. That is, in the case where read-out control is successively performed for different addresses when the SEMU 20 outputs read-out control information and address information so as to request data read-out, the retry recognition section 132B judges that the data read-out request was output first time. When the read-out control is successively performed for the same addresses, the retry recognition section 132B judges that the data read-out request was output by retransmission processing. The retry recognition section 132B is formed by latch sections 135–137, an address coincidence detection sections 138–140, and an AND circuit 141, which are shown in FIG. 32.

The latch sections 135–137 latch three 8-bit pieces of the address information ($A_{23}$–$A_{16}$, $A_{15}$–$A_{08}$, $A_{07}$–$A_{00}$) held by the latch sections 73–75.

The address coincidence detection section 138 inputs the received address information, which forms a data read-out request, from the latch section 73 and also input's from the latch section 135 the address information which was received prior to the reception of the data read-out request and which forms a data read-out request. The address coincidence detection section 138 compares them and outputs a high level signal "1" when they coincide with each other.

Similarly, the address coincidence detection section 139 compares the address information which was received by the latch section 74 and which forms a data read-out request with the address information which was received by the latch section 136 prior to the reception of the data read-out request and which forms a data read-out request. The address coincidence detection section 139 outputs a high level signal "1" when they coincide with each other.

Moreover, the address coincidence detection section 140 compares the address information which was received by the latch section 75 and which forms a data read-out request with the address information which was received by the latch section 137 prior to the reception of the data read-out request and which forms a data read-out request. The address coincidence detection section 140 outputs a high level signal "1" when they coincide with each other.

The AND circuit 141 performs the AND operation on the three address comparison results output from the address coincidence detection sections 138–140.

In detail, when all the address coincidence detection sections 138–140 output "1", which indicates address coincidence, the AND circuit 141 outputs a high level signal "1" as retry recognition information. In other cases, the AND circuit 141 outputs a low level signal "0" as non-retry recognition information. The retry recognition information and the non-retry recognition information are output to the non-retry data latch signal generation section 131-1, the retry data latch section 131-2, and the NOT circuit 133-1.

That is, when the AND circuit 141 outputs a high level signal "1", read-out control is successively performed for the same address. In this case, it can be recognized that the data read-out request was output by retransmission processing. When the AND circuit 141 outputs a low level signal "0", read-out control is successively performed for different addresses. In this case, it can be recognized that the data read-out request was output first time.

In other words, occurrence of retry can be detected on the basis of the fact that the same address was accessed twice. This detection can be made only in the case where it is guaranteed that when the software operating in the CPU 21 accesses the latch section 122 managed by the monitor/controlled object-side interface sections 30b–35b of the CH interface sections 30–35, the software does not successively access the same address twice.

As in the sixth and seventh embodiments, the latch section 122 (see FIG. 23), which forms each of the I/O registers 125–130 of the monitor/controlled object-side interface sections 30b–35b, holds monitor data output from the monitor/controlled objects 36–41. The latch section 122 functions as a data latch section for latching read-out data until the SEMU 20 reads out the data.

The non-retry data latch signal generation section 131-1 and the retry data latch section 131-2, which form the latch section 131, function as a data holding section for temporarily holding data output from the latch section 122.

The NOT circuit 133-1, which forms the selector 133, functions as an output data selection section. That is, when it is judged in the flip-flop circuit 72 that the read-out request was first one, the NOT circuit 133-1 outputs to the SEMU 20 the read-out data output from the latch section 122. When it is judged that the read-out request was output by retransmission process, the NOT circuit 133-1 outputs to the SEMU 20 the data which is held in the latch section 131.

By virtue of the above-described structure, in the control system of the present embodiment as well, when monitor data is read out, signals as shown in FIG. 27 are exchanged between the SEMU 20 and the CH interface sections 30–35.

That is, when the CPU 21 of the SEMU 20 generates a request for reading out monitor data from the monitor/controlled objects 36–41, the RS-485 drivers 56–57 transmit address information and read-out control information through the CM bus 23 (see signal (v1) in FIG. 27).

The data (monitor data) latched in the latch section 122 of the monitor/controlled object-side interface sections 30b–35b are canceled after the CPU 21 reads out the data (see signal (v2) in FIG. 27). At this time, the read-out data is latched by the retry data latch section 131-2.

Meanwhile, the latch sections 73–75 hold the present address information of the present data read-out request and the latch sections 135–137 hold the old address information of the previous data read-out request. When it is judged by the address coincidence detection sections 138–140 and the AND circuit 141 that the present address information and the old address information are the same, the AND circuit 141 outputs "1" indicating that the access is for retry. When the present address information and the old information differ from each other, the AND circuit 141 outputs "0" indicating that the access is not for retry.

In the case where an error occurs as shown by the signal (v2) when the data stored in the latch section 122 is; read out, the CM BUS conversion circuit 22 cannot detect a DACK signal. In this case, retransmission processing (retry processing) is performed. That is, the CPU 21 again performs the read-out operation so as to read out the above-described data (see signal (v3) in FIG. 27).

In this case, the output signal from the AND circuit 141 is "1" indicating that the data requested to be read is retry data. In this case, the data latched by the retry data latch section 131-2 is selected and output to the SEMU 20 (see signal (v4) in FIG. 27).

When the data from the data latch section 131 is normally received by the CPU 21 of the SEMU 20, the output signal from the AND circuit 141 becomes "0" when the next data read-out request is received (see signal (v5) in FIG. 27). When the CM BUS conversion sections 30a–35a receive the output signal of "0", the CM BUS conversion section 30a–35a replaces the data latched by the latch section 131 with the next read-out data.

In other words, when the next read-out control information is received from the SEMU 20, the output signal from the AND circuit 141 is "0", and the data requested to be read is not retry data. Accordingly, the data latched by the latch section 122 is output to the SEMU 20 via the multiplex buffer 88 (signals (v6) and (v7) in FIG. 27).

In other words, when no DACK signal is recognized by the CM BUS conversion circuit 22 and therefore retransmission processing (retry processing) is performed, the CM BUS conversion sections 30a–35a receive the data read-out request for retry. In this case, the latch sections 73–75 and 135–137, the address coincidence detection sections 138–140, and the AND circuit 141 judge whether the data read-out request is output by retransmission processing.

With this operation, for the read-out request which was recognized as being for retry, the data held by the latch section 131 is sent back without access to the latch section 122, so that data for the retry read-out request can be sent back to the SEMU 20.

As described above, in the control system capable of coping with bus extension according to the eighth embodiment of the present invention, each of the monitor/controlled object-side interface sections 30b–35b includes the latch section 122; and each of the CM BUS conversion sections 30a–35a includes the non-retry data latch signal generation section 131-1, the retry data latch section 131-2, the NOT circuit 133-1, the latch sections 73–75 and 135–137, the address coincidence detection sections 138–140, and the AND circuit 141. Therefore, as in the sixth and seventh embodiments, data can be latched by the hardware until the software recognizes the data. Accordingly, in this system as well, there can be obtained the merit of the read-break method. That is, it is possible to reliably transmit information from the hardware to the software regardless of the polling period.

Moreover, retransmission on the CM bus 23 can be performed within the CM bus 23. Accordingly, in the data latch section 122 which holds monitor data in the read-break method, it is unnecessary to take account of the CM bus existing between the CPU 21 and the latch section 122, so that the latch section 122 does not require any special processing in relation to retransmission. This makes the functions shared by the respective sections clearer. Moreover, it becomes unnecessary to input a latch canceling signal to the latch section 122 of each of the monitor/controlled object-side interfaces 30b–35b.

Moreover, since it is possible to make judgment by using only the CH interface sections 30–35 as to whether the received data read-out request is for retry, it becomes unnecessary for the CM BUS conversion circuit 22 to have a functional section for transmitting a retry flag or a MACK signal serving as a permission signal reception notification. This reduces the number of the signal lines of the CM bus 23, so that the structure of the system can be simplified and the processing time for recognition of retry can be shortened.

(j) Ninth Embodiment

Figure 33:
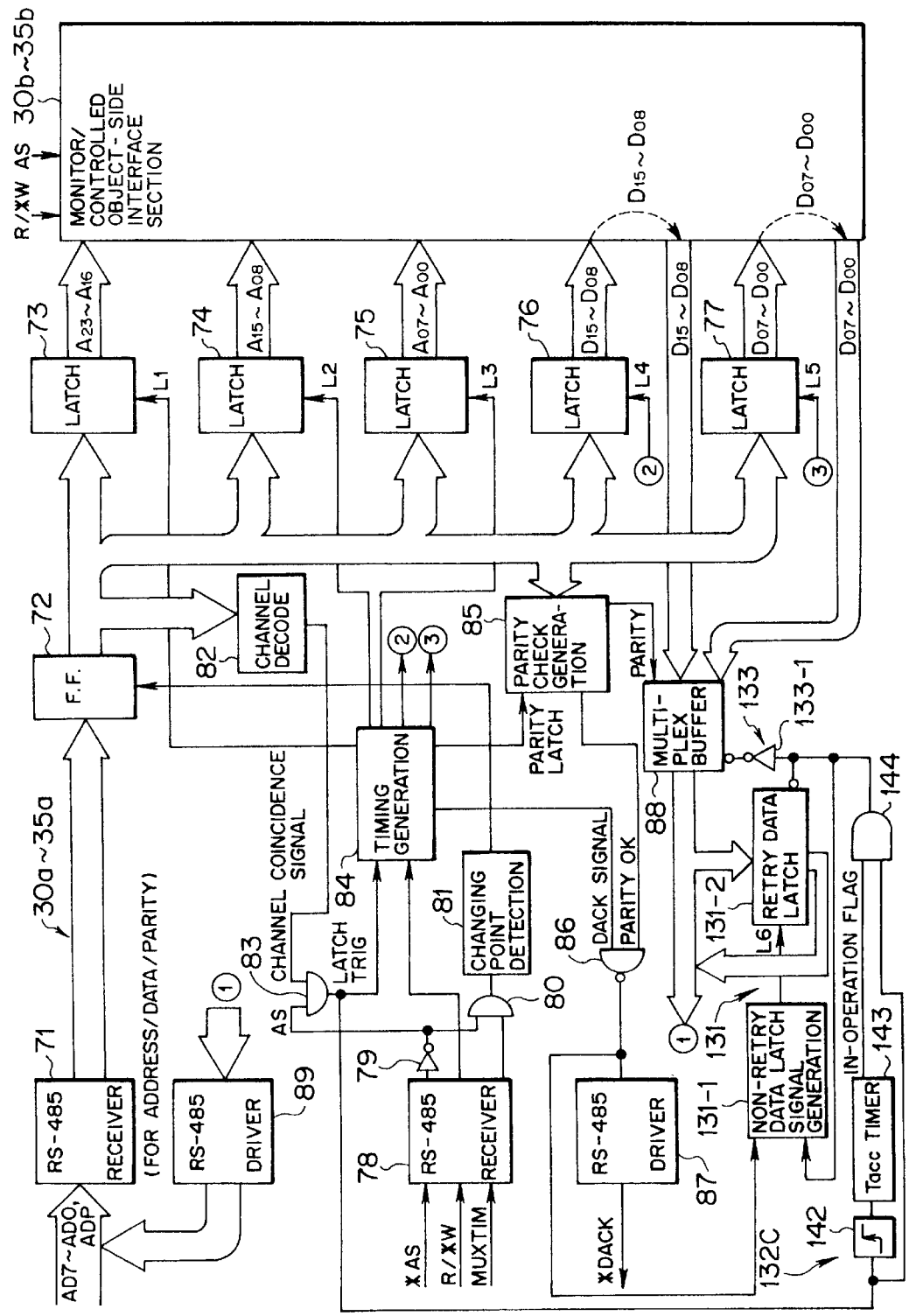
FIG. 33 is a block diagram showing a CH interface section according to a ninth embodiment of the present invention.

FIG. 33 is a block diagram showing the CH interface section 30–35 of a control system capable of coping with bus extension according to a ninth embodiment of the present invention. As in the control systems according to the fifth through eighth embodiments, in the control system of the present embodiment, the software of the SEMU 20 employs the read-break method when data read-out operation is performed for the monitor/controlled objects 36–41 (see FIG. 2), thereby making it possible to reliably transmit information from the hardware to the software regardless of the polling period.

The SEMU 20 of the control system according to the present embodiment is the same as the SEMU 20 of the control system according to the first embodiment. However, the CH interface sections 30–35, which are connected to the SEMU 20 through the CM bus 23 and which form the shelves 24–29, are different from those used in the first through eighth embodiments.

When the manner of data transmission performed in response to a data read-out request from the SEMU 20 is considered, the CH interface sections 30–35 shown in FIG. 33 have the same structure as the CH interface sections 30–35 of the sixth through eighth embodiments (see FIG. 23). However, the method for judging whether the data read-out request is for retry is different from the sixth through eighth embodiments. In FIG. 33, the same portions as those shown in FIGS. 23, 24, 29 and 32 are denoted by the same reference numbers.

In other words, each of the CM BUS conversion sections 30a–35a according to the present embodiment has a retry recognition section 132C different from the retry recognition sections 132, 132A and 132B of the sixth through eighth embodiments.

The retry recognition section 132C of the CM BUS conversion sections 30a–35a according to the present embodiment functions as a retransmission output recognition section. That is, when the SEMU 20 outputs a data read-out request so as to perform data read-out control for the shelves 24–29, the retry recognition section 132C detects a period of time elapsed after the previously performed data read-out control, and compares it with a predetermined value. When the period of time elapsed after the previous data read-out control is greater than the predetermined value, the retry recognition section 132C judges that the data read-out request was output first time. When the time interval is equal to or less than the predetermined value, the retry recognition section 132C judges that the data read-out request was output by retransmission processing. The retry recognition section 132B is formed by a latch trigger rising detection section 142, a timer 143, and an AND circuit 144, which are shown in FIG. 33.

The latch trigger rising detection section 142 detects a rising edge of the latch trigger signal output from the AND circuit 83 and outputs a pulse when the latch trigger signal rises. That is, the latch trigger rising detection section 142 receives a trigger signal from the AND circuit 83 upon generation of a latch trigger and sends it to the timer 143 as a reception timing at which a data read-out request is to be received from the SEMU 20.

The timer 143 starts clocking of a predetermined period of time Tacc when it receives a trigger signal from the latch trigger rising detection section 142. The timer 143 outputs an in-operation flag "1" while it clocks the predetermined period of time Tacc. When the clocked period of time reaches the predetermined period of time Tacc, the timer 143 outputs a time-out flag "0" and resets the clocked value.

For example, the predetermined period of time Tacc can be set to be greater than the time required for retry out.

The AND circuit 144 receives a flag from the timer 143 and also receives a trigger signal which is output from the latch trigger rising detection section 142 after the clocking of the timer 143 is started. When the next trigger signal is input in a state in which the timer 143 outputs an in-operation flag "1" after starting its clocking operation, the AND circuit 144 outputs a high level signal "1", which indicates that a data read-out request corresponding to the next trigger signal is for retry. When the next trigger signal is not input even after the predetermined period of time Tacc has elapsed, the timer outputs a low level signal "0", which indicates that the data read-out request corresponding to the next trigger signal is not for retry.

That is, when the output of the AND circuit 144 is a high level signal "1", it means that the period of time elapsed after the previous data read-out control is less than the predetermined value Tacc. In this case, it is possible to recognizes that the data read-out request was output by retransmission processing. When the output of the AND circuit 144 is a low level signal "0", it means that the period of time elapsed after the previous data read-out control is equal to or greater than the predetermined value Tacc. In this case, it is possible to recognizes that the data read-out request was output first time.

In other words, in the case where it is guaranteed that the software operating in the CPU 21 takes a period of time corresponding to a plurality of cycles between access to one of the latch sections 122 managed by the monitor controlled object-side interface sections 30b–35b of the CH interface sections 30–35 and subsequent access to the same latch section 122 or a different latch section 122, it is possible to judge that access performed before the time-out of the timer 143 is for retry. The judgment can be made by providing each of the CM BUS conversion sections 30a–35a with the timer 143 for counting the period of time Tacc which corresponds to a plurality of cycles required to start subsequent access.

When the CPU 21 accesses an I/O such as the monitor/controlled object 36–41, it always accesses an unillustrated ROM or a work RAM before the access to the I/O. Therefore, there is no case where the I/O is successively accessed. Accordingly, it is guaranteed that it takes a period of time corresponding to a plurality of cycles to start subsequent access.

As in the sixth through eighth embodiments, the latch section 122 (see FIG. 23), which forms each of the I/O registers 125–130 of the monitor/controlled object-side interface sections 30b–35b, holds monitor data output from the monitor/controlled objects 36–41. The latch section 122 functions as a data latch section for latching read-out data until the SEMU 20 reads out the data.

The non-retry data latch signal generation section 131-1 and the retry data latch section 131-2, which form the latch section 131, function as a data holding section for temporarily holding data output from the latch section 122.

The NOT circuit 133-1, which forms the selector 133, functions as an output data selection section. That is, when it is judged in the flip-flop circuit 72 that the read-out request was first one, the NOT circuit 133-1 outputs to the SEMU 20 the read-out data output from the latch section 122. When it is judged that the read-out request was output by retransmission process, the NOT circuit 133-1 outputs to the SEMU 20 the data which is held in the latch section 131.

By virtue of the above-described structure, in the control system of the present embodiment as well, when monitor data is read out, signals as shown in FIG. 27 are exchanged between the SEMU 20 and the CH interface sections 30–35.

That is, when the CPU 21 of the SEMU 20 generates a request for reading out monitor data from the monitor/controlled objects 36–41, the RS-485 drivers 56 to 58 transmits address information and read-out control information through the CM bus 23, as in the first embodiment (see signal (v1) in FIG. 27).

The data (monitor data) latched in the latch section 122 of the monitor/controlled object-side interface sections 30b–35b are canceled after the CPU 21 reads out the data (see signal (v2) in FIG. 27). At this time, the read-out data is latched by the retry data latch section 131-2.

Meanwhile, the timer 143 clocks the time interval between the successively received data read-out requests. The timer 143 outputs an in-operation flag "1" when the period of time elapsed after the reception of the previous data read-out request is within the predetermined period of time Tacc. The timer 143 outputs a time-out flag "0" when the period of time elapsed after the reception of the previous data read-out request reaches the predetermined period of time Tacc.

As a result, when a data read-out request is received from the SEMU 20 and the period of time elapsed after the reception of the previous data read-out request is within the predetermined period of time Tacc, the AND circuit L44 outputs "1", which indicates that the data read-out request is for retry. When the predetermined period of time Tacc has elapsed, the AND circuit 144 outputs "0", which indicates that the data read-out request is not for retry.

In the case where an error occurs as shown by the signal (v2) when the data stored in the latch section 122 is read out, the CM BUS conversion circuit 22 cannot detect a DACK signal. In this case, retransmission processing (retry processing) is performed. That is, the CPU 21 again performs the read-out operation so as to read out the above-described data (see signal (v3) in FIG. 27).

In this case, the output signal from the AND circuit 144 is "1" indicating that the data requested to be read is retry data. In this case, the data latched by the retry data latch section 131-2 is selected and output to the SEMU 20 (see signal (v4) in FIG. 27).

When the data from the data latch section 131 is normally received by the CPU 21 of the SEMU 20, the output signal from the AND circuit 144 becomes "0" when the next data read-out request is received (see signal (v5) in FIG. 27). When the CM BUS conversion sections 30a–35a receive the output signal of "0", the CM BUS conversion sections 30a–35a replace the data latched by the latch section 131 with the next read-out data.

In other words, when the next read-out control information is received from the SEMU 20, the output signal from the AND circuit 144 is "0", and the data requested to be read is not retry data. Accordingly, the data latched by the latch section 122 is output to the SEMU 20 via the multiplex buffer 88 (signals (v6) and (v7) in FIG. 27).

In other words, when no DACK signal is recognized by the CM BUS conversion circuit 22 and therefore retransmission processing (retry processing) is performed, the CM BUS conversion sections 30a–35a receive the data read-out request for retry. In this case, the latch trigger rising detection section 142, the timer 143, and the AND circuit 144 judge whether the data read-out request is output by retransmission processing.

With this operation, for the read-out request which was recognized as being for retry, the data held by the latch section 131 is sent back without access to the latch section 122, so that data for the retry read-out request can be sent back to the SEMU 20.

As described above, in the control system capable of coping with bus extension according to the ninth embodiment of the present invention, each of the monitor/controlled object-side interface sections 30b–35b includes the latch section 122; and each of the CM BUS conversion sections 30a–35a includes the non-retry data latch signal generation section 131-1, the retry data latch section 131-2, the NOT circuit 133-1, the latch trigger rising detection section 142, the timer 143, and the AND circuit 144. Therefore, as in the sixth through eighth embodiments, data can be latched by the hardware until the software recognizes the data. Accordingly, in this system as well, there can be obtained the merit of the read-break method. That is, it is possible to reliably transmit information from the hardware to the software regardless of the polling period.

Moreover, retransmission on the CM bus 23 can be performed within the CM bus 23. Accordingly, in the data latch section 122 which holds monitor data in the read-break method, it is unnecessary to take account of the CM bus existing between the CPU 21 and the latch section 122, so that the latch section 122 does not require any special processing in relation to retransmission. This makes the functions shared by the respective sections clearer. Moreover, it becomes unnecessary to input a latch canceling signal to the latch section 122 of each of the monitor/controlled object-side interface sections 30b–35b.

Moreover, since it is possible to make judgment by using only the CH interface sections 30–35 as to whether the received data read-out request is for retry as in the eighth embodiment, it becomes unnecessary for the CM BUS conversion circuit 22 to have a functional section for transmitting a retry flag or a MACK signal serving as a permission signal reception notification. This reduces the number of the signal lines of the CM bus 23, so that the structure of the system can be simplified and the processing time for recognition of retry can be shortened.

(k) Tenth Embodiment

Figure 34:
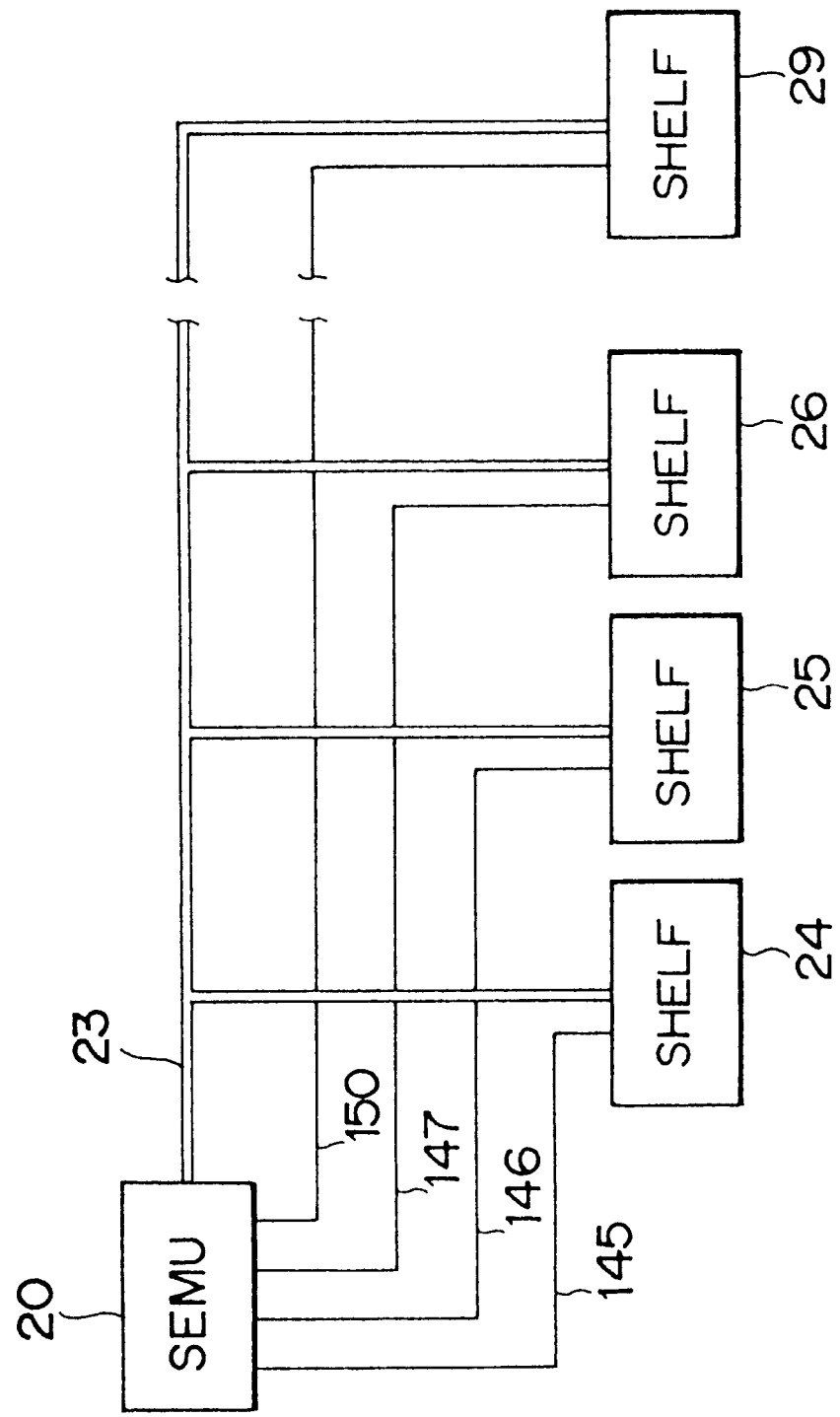
FIG. 34 is a block diagram showing a control system capable of coping with bus extension according to a tenth embodiment of the present invention.

FIG. 34 is a block diagram showing a control system capable of coping with bus extension according to a tenth embodiment of the present invention. As in the first through ninth embodiments, in the control system according to the present embodiment, the SEMU 20 serving as a CM BUS master and the shelves 24–29 serving as CM BUS slaves are connected with each other via the CM bus 23. In addition, the SEMU 20 and the shelves 24–29 are connected with each other via six physical connection lines 145–150.

The physical connection lines 145–150 are used to inform the SEMU 20 of information indicating whether each of the shelves 24–29 is mounted or not. In other words, the physical connection lines 145–150 functions as a break detection line which connects the SEMU 20 with the each of the shelves 24–29 and which detects a break of the CM bus 23.

Figure 35:
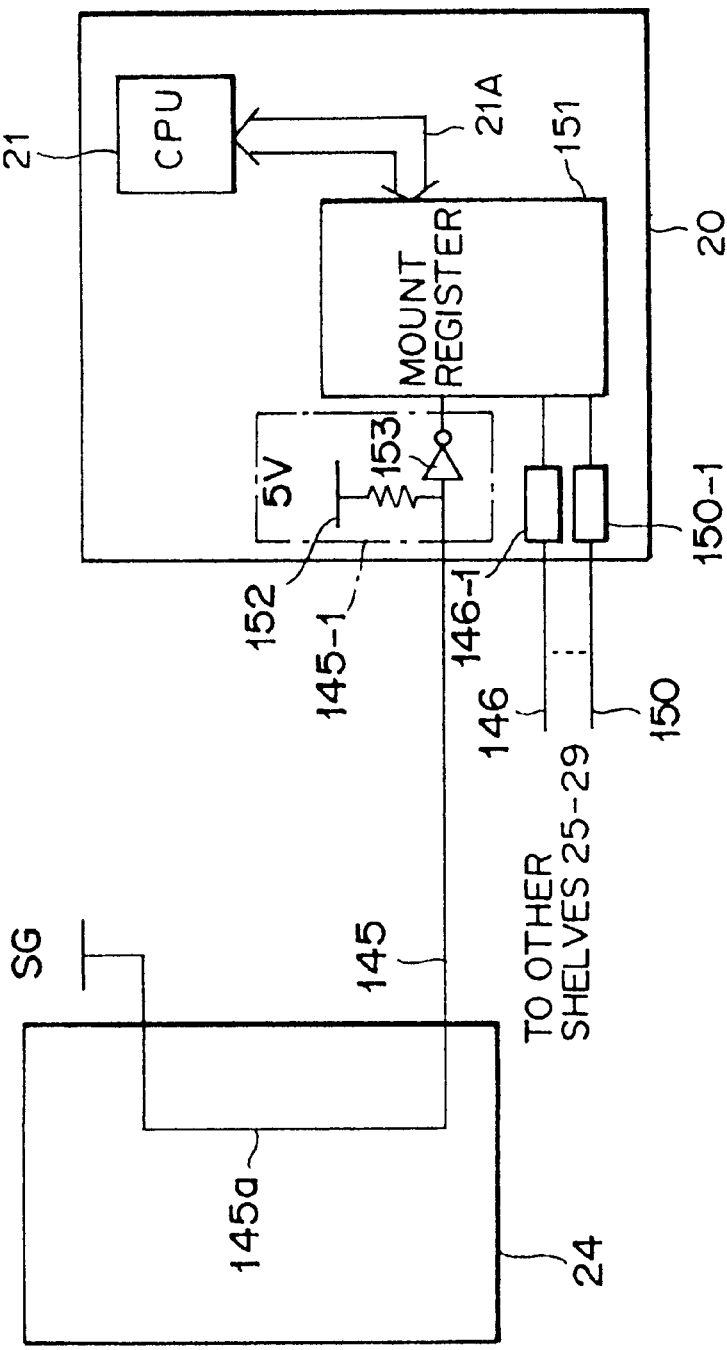
FIG. 35 is a block diagram showing a main portion of control system capable of coping with bus extension according to the tenth embodiment of the present invention.
Figure 36:
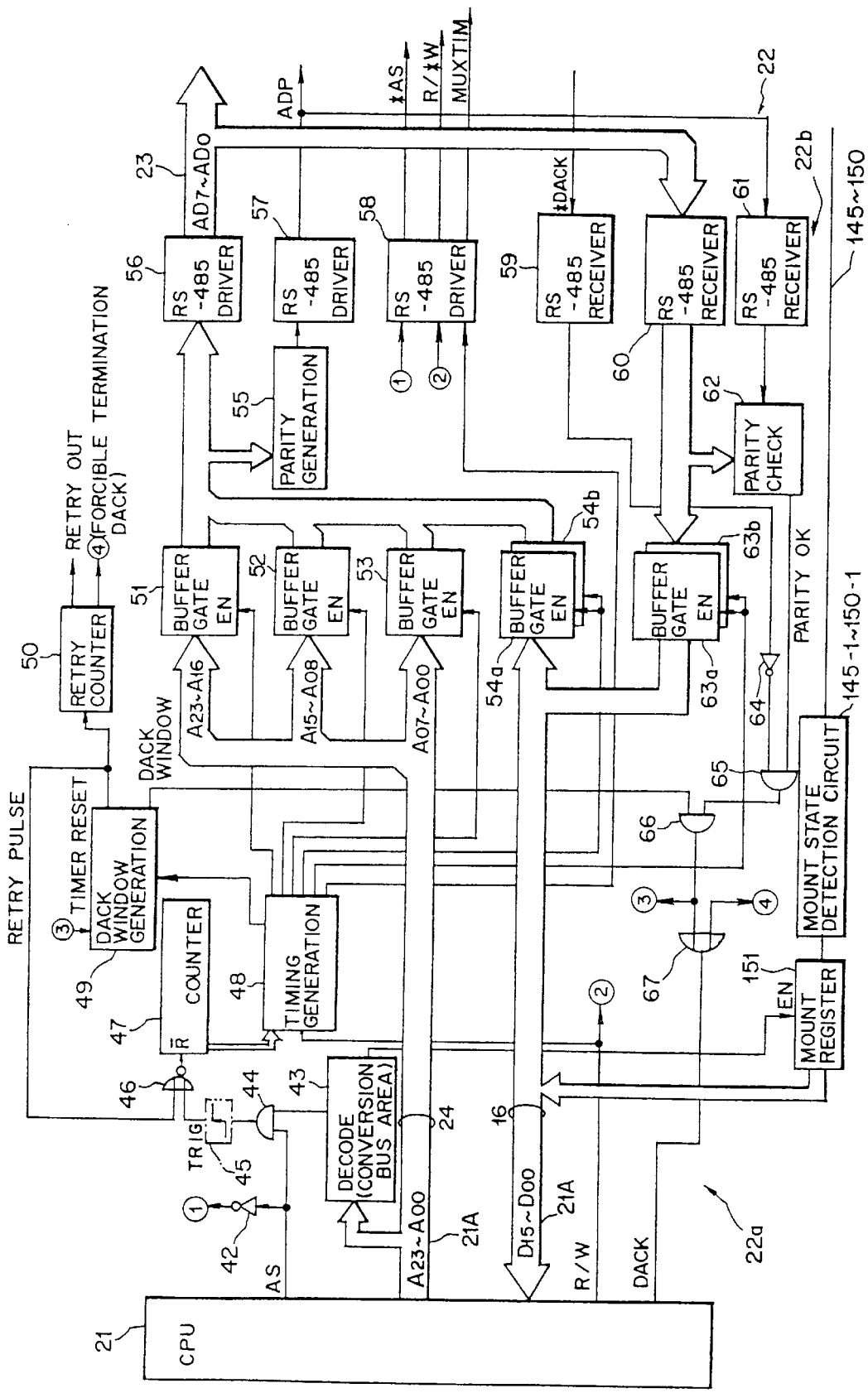
FIG. 36 is a block diagram showing an SEMU according to the tenth embodiment of the present invention.

The physical connection lines 145–150 are connected to the SEMU 20 and each of the shelves 24–29, as shown in FIG. 35 (in FIG. 35, the CM bus 23 is not shown).

Although FIG. 35 shows only the connection between the SEMU 20 and the shelf 24 via the physical connection line 145, other shelves 25–29 are also connected to the SEMU 20 via the respective physical connection lines 146–150).

As shown in FIG. 35, the physical connection line 145 connected to the SEMU 20 is grounded at the shelf 24 via an internal wiring line 145a.

The SEMU 20 includes mount state detection circuits 145-1–150-1 and a mount register 151.

The mount state detection circuits 145-1–150-1 detect whether the shelves 24–29 are mounted. For example, each of the mount state detection circuits 145-1–150-1 includes a power source 152, which applies voltage of 5 V, for example, and a NOT circuit 153. When one of the shelves 24–29 is in a mounted state, the NOT circuit 153 of a corresponding one of the mount state detection circuits 145-1–150-1 outputs a high level signal "1" as a mount detection signal. When it is not mounted, the NOT circuit 153 of the corresponding one of the mount state detection circuits 145-1–150-1 outputs a low level signal "0" as a non-mount detection signal.

The mount register 151 holds mounted/non-mounted state detection signals output from the respective mount state detection circuits 145-1–150-1. The mounted/non-mounted state detection signals held by the mount register 151 are output to the CPU 21 via the CPU bus 21A.

When the 24-bit address information from the CPU 21 is decoded by the decoder 43 and the result of the decoding indicates that an instruction for reading out the data of the mount register 151 is output, an enable signal is output from the decoder 43. When the enable signal is input to the mount register 151, the mount register 151 outputs via the CPU bus 21A to the CPU 21 the mounted/non-mounted state detection signals held therein.

Therefore, when the CPU 21 of the SEMU 20 recognizes the generation of the above-described retry out, the CPU 21 can specify the cause of the detected retry out by reading out the values stored in the mount register 151. That is, the CPU 21 can determine whether a bus failure or a non-mounted state of a shelf serving as a CM BUS slave caused the detected retry out.

Accordingly, the mount state detection circuits 145-1–150-1, the mount register 151 and the CPU 21 function as a diagnosis section. That is, when a DACK signal serving as a permission signal is not received from the CM BUS conversion section 30a–35a even after a data read-out request are output to the same address a predetermined number of times, the cause of impossibility in receiving the DACK signal is diagnosed on the basis of the detection information from the physical connection lines 145-1–150-1.

By virtue of the above-described structure, in the control system of the present embodiment, data can be written into or read out from a desired channel by exchanging between the SEMU 20 and the shelves 24–29 signals which are basically the same as those used in the first embodiment.

The mounted/non-mounted states of the shelves 24–29 are detected by the mount state detection circuits 145-1–150-1 on the basis of the signals from the physical connection lines 145–150, and the detection information is held by the mount register 151.

The CPU 21 can recognize the mounted/non-mounted state of each of the shelves 24–29 by reading out the values from the mount register 151. Especially, when the CPU 21 recognizes generation of retry out while data is read out from a desired channel, the CPU 21 reads out the values from the mount register 151 so as to specify the cause of the detected retry out, i.e., whether a bus failure or a non-mounted state of a shelf serving as a CM BUS slave caused the detected retry out.

As described above, the control system capable of coping with bus extension according to the tenth embodiment of the present invention includes the physical connection lines 145–150, the mount state detection circuits 145-1–150-1, and a mount register 151. Therefore, when the CPU 21 recognizes generation of retry out while data is read out from a desired channel, the CPU 21 can reliably judge and specify the cause (a bus failure or a non-mounted state of a shelf) of the detected retry out by reading out the values from the mount register 151. This makes it possible to cope with all kinds of bus failures, thereby further improving the monitor/control function.

(l) Eleventh Embodiment

Figure 37:
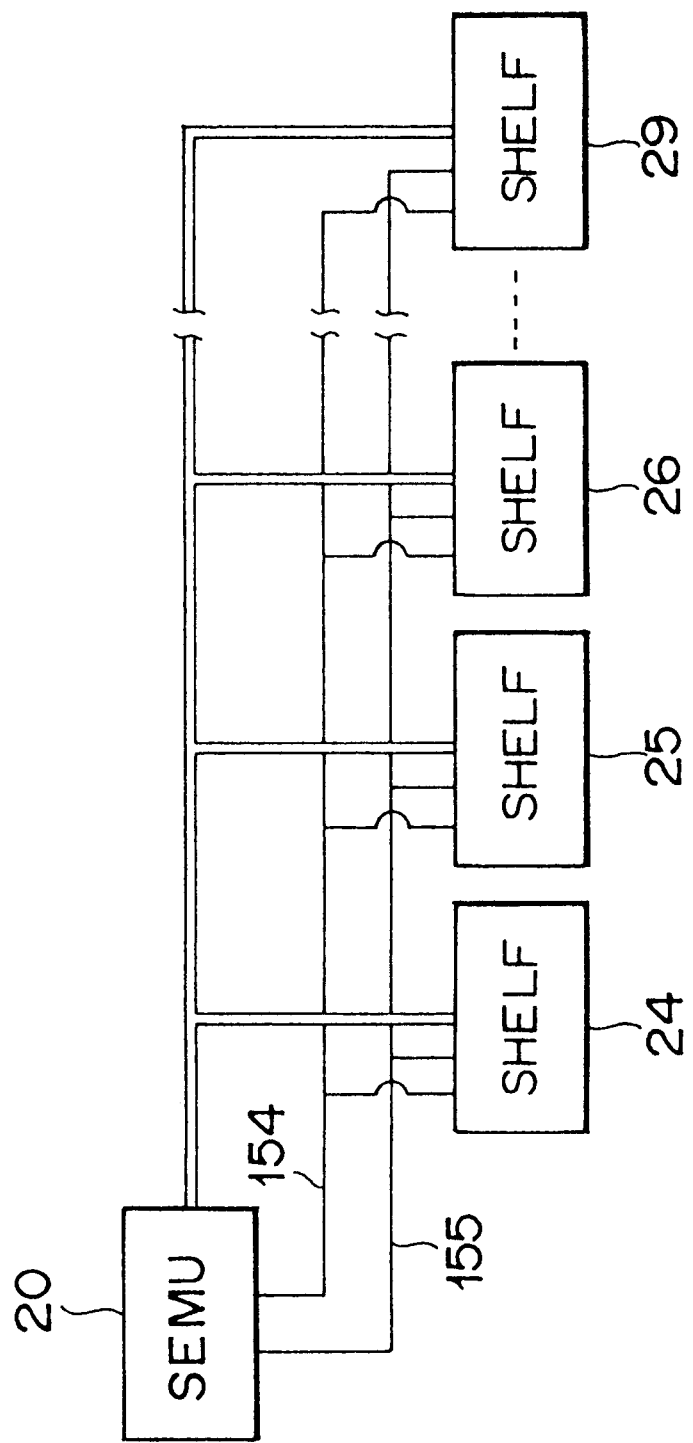
FIG. 37 is a block diagram showing a control system capable of coping with bus extension according to an eleventh embodiment of the present invention.

FIG. 37 is a block diagram showing a control system capable of coping with bus extension according to an eleventh embodiment of the present invention. As in the tenth embodiment, in the control system of the present embodiment as well, when retry out occurs in the CPU 21 of the SEMU 20, the CPU 21 specifies the cause (a bus failure or a non-mounted state of a shelf) of the retry out.

In the control system according to the present embodiment, the SEMU 20 serving as a CM BUS master and the shelves 24–29 serving as CM BUS slaves are connected with each other via a connection state notification bus 154, a parity error bus 155, and the CM bus 23.

The connection state notification bus 154 notifies the SEMU 20 of the state of connection of the shelves 24–29 to the CM bus 23 (i.e., the mount state of the shelves 24–29). The parity error bus 155 notifies the SEMU 20 of a parity error included in the address information from the SEMI 20.

Figure 38:
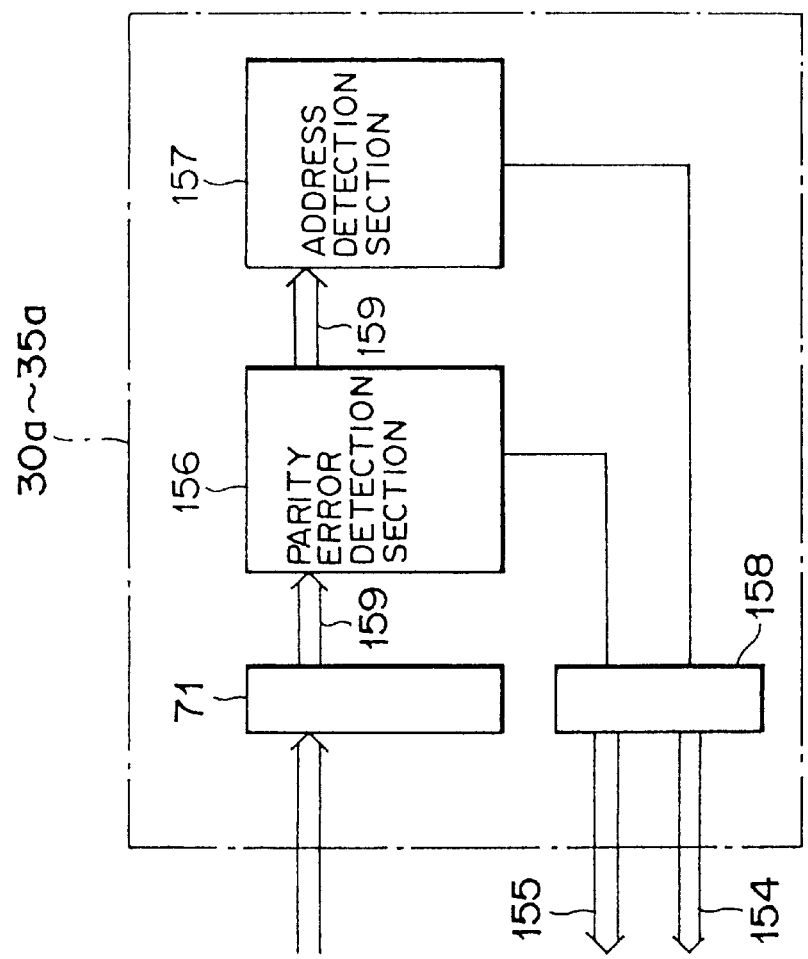
FIG. 38 is a functional block diagram of the CM BUS conversion section of the control system capable of coping with bus extension according to the eleventh embodiment of the present invention.

FIG. 38 shows a functional block diagram of the CM BUS conversion sections 30a–35a of the control system according to the present embodiment. The functional sections other than those shown in FIG. 38 are basically the same as those in the first embodiment (see FIG. 6).

Like the RS-485 receiver in the first embodiment (see FIG. 6), the RS-485 receiver 71 receives address/data information (AD7–AD0) and a parity signal (ADP) from the CM BUS conversion circuit 22 of the SEMU 20 via the CM bus 23.

Numeral 156 denotes a parity error detection section. This parity error detection section 156 functions as a parity error detection section for detecting a parity error included in the address information from the SEMU 20 which is received by the RS-485 receiver 71. The result of the detection is output to a three-state buffer 158, which will be described later.

Numeral 157 denotes an address detection section. The address information received by the RS-485 receiver 71 is input to the address detection section 157 via a CM bus internal bus 159, and the address detection section 157 decodes the address information so as to judge whether the received address information coincides with the channel information held internally. The result of judgment is output to the three-state buffer 158, which will be described later.

In other words, the address detection section 157 detects from the CM bus 23 the address corresponding to the control objects 36–41 accommodated in the shelf to which the address detection section 157 belongs (hereinafter referred to as "own control objects 36–41") and notifies the three-state buffer 158 of the address.

Based on the information indicating the detection of the address corresponding to the own control objects 36–41, the three-state buffer 158 brings the connection state notification bus 154 and the parity error bus 155 into an active or an inactive state.

Specifically, when the three-state buffer 158 receives from the address detection section 157 information indicating detection of the address corresponding to the own control objects 36–41, the three-state buffer 158 brings the connection state notification bus 154 into the active state. When the three-state buffer 158 does not receive from the address detection section 157 information indicating detection of the address corresponding to the own control objects 36–41, the three-state buffer 158 brings the connection state notification bus 154 into the inactive state.

When the three-state buffer 158 receives from the parity error detection section 156 information indicating detection of a parity error, the three-state buffer 158 brings the parity error bus 155 into the active state. When the three-state buffer 158 does not receive from the parity error detection section 156 information indicating detection of a parity error, the three-state buffer 158 brings the parity error bus 155 into the inactive state.

Therefore, the three-state buffer 158 functions as a bus control section that brings the connection state notification bus 154 into the active state when the address detection section 157 detects the address corresponding to the own control objects 36–41 and that brings the parity error bus 155 into the active state when the parity error detection section 156 detects a parity error.

For example, when the parity error detection section 156 detects a parity error in the received access address (see (a) of FIG. 42) and the address detection section 157 determines that the access address is not for a channel of the shelf to which the address detection section 157 belongs (hereinafter referred to as "own channel"), these are reported to the three-state buffer 158.

In response to this, the three-state buffer 158 brings the connection state notification bus 154 into the inactive state and brings the parity error bus 155 into the active state (see (b) and (c) of FIG. 42).

When the parity error detection section 156 detects no parity error in the received access address (see (a) of FIG. 42) and can recognize the address as normal data and the address detection section 157 determines that the access address is for an own channel, these are reported to the three-state buffer 158.

In response to this, the three-state buffer 158 brings the connection state notification bus 154 into the active state and brings the parity error bus 155 into the inactive state (see (d) and (e) of FIG. 42).

The parity error detection section 156 can be formed by the parity check/generation section 85 of the first embodiment; the address detection section 157 can be formed by the decoder 82 of the first embodiment; and the three-state buffer 158 can be formed by the RS-485 driver 87 of the first embodiment.

In FIG. 38, there is no illustration of the flip-flop circuit (see numeral 72 in FIG. 6) which is inserted into the CM bus internal bus 159 between the RS-485 receiver 71 and the parity error check/generation section 85 serving as the parity error detection section 156.

Figure 39:
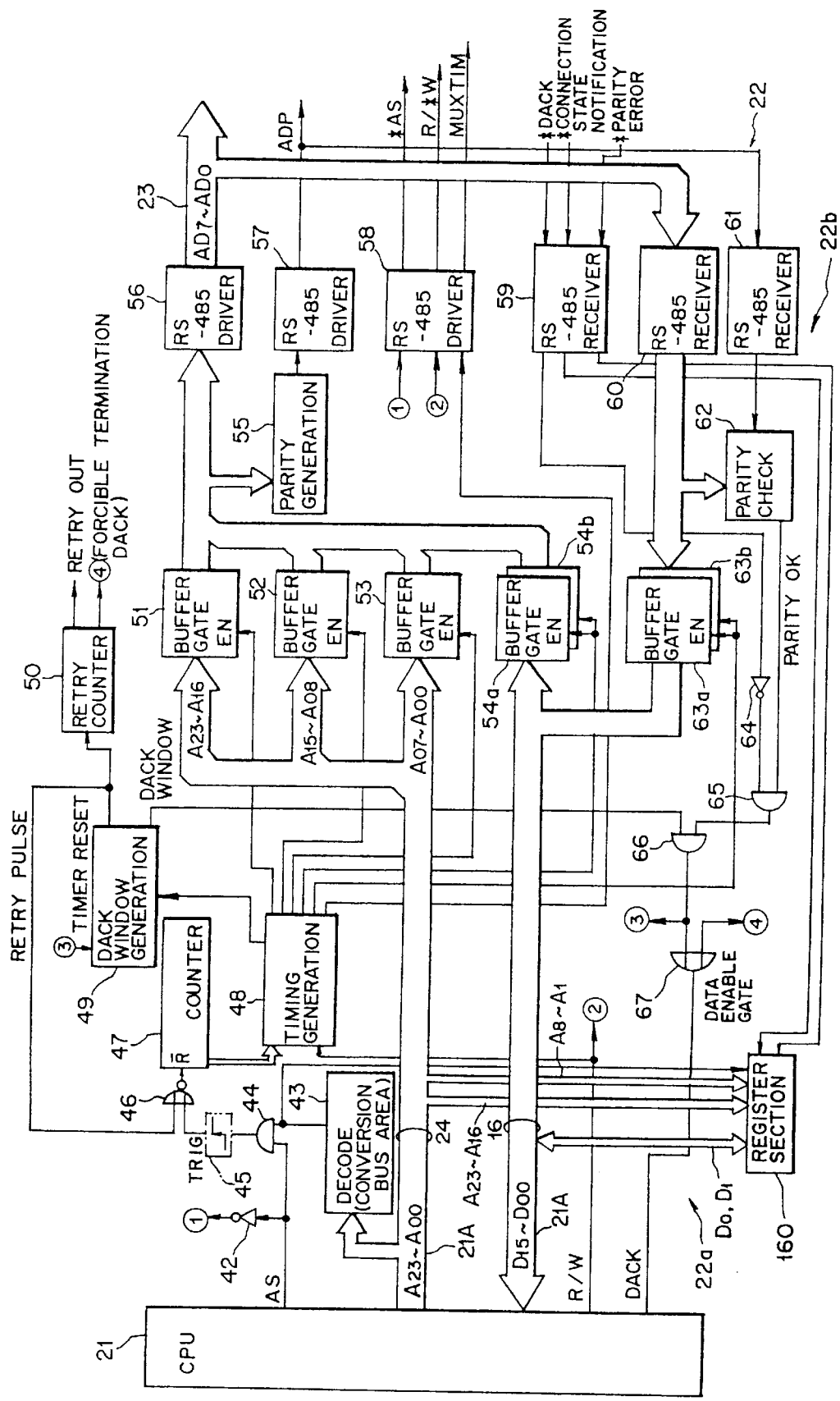
FIG. 39 is a block diagram showing an SEMU according to the eleventh embodiment of the present invention.

The SEMU 20 connected to the connection state notification bus 154 and the parity error bus 155 has a structure as shown in FIG. 39, for example.

The SEMU 20 according to the present embodiment is the basically the same as that of the first embodiment (see FIG. 5), except that the connection state notification bus 154 and the parity error bus 155 are connected to the RS-485 receiver 59 and a register section 160 is provided.

The RS-485 receiver 59 receives a data acknowledgment signal (*DACK signal ) from the shelves 24–29 and also receives connection state notification information (*connection state notification), which serves as information indicating mounted/non-mounted state of the shelves 24–29, and parity error information (*parity error), as the states (active/inactive) of the buses 154 and 155.

For each channel in the shelves 24–29, the register section 160 holds connection state notification information and parity information from the RS-485 receiver 59. The CPU 21 can read the data held in the register section 160 by using its firmware.

Figure 40:
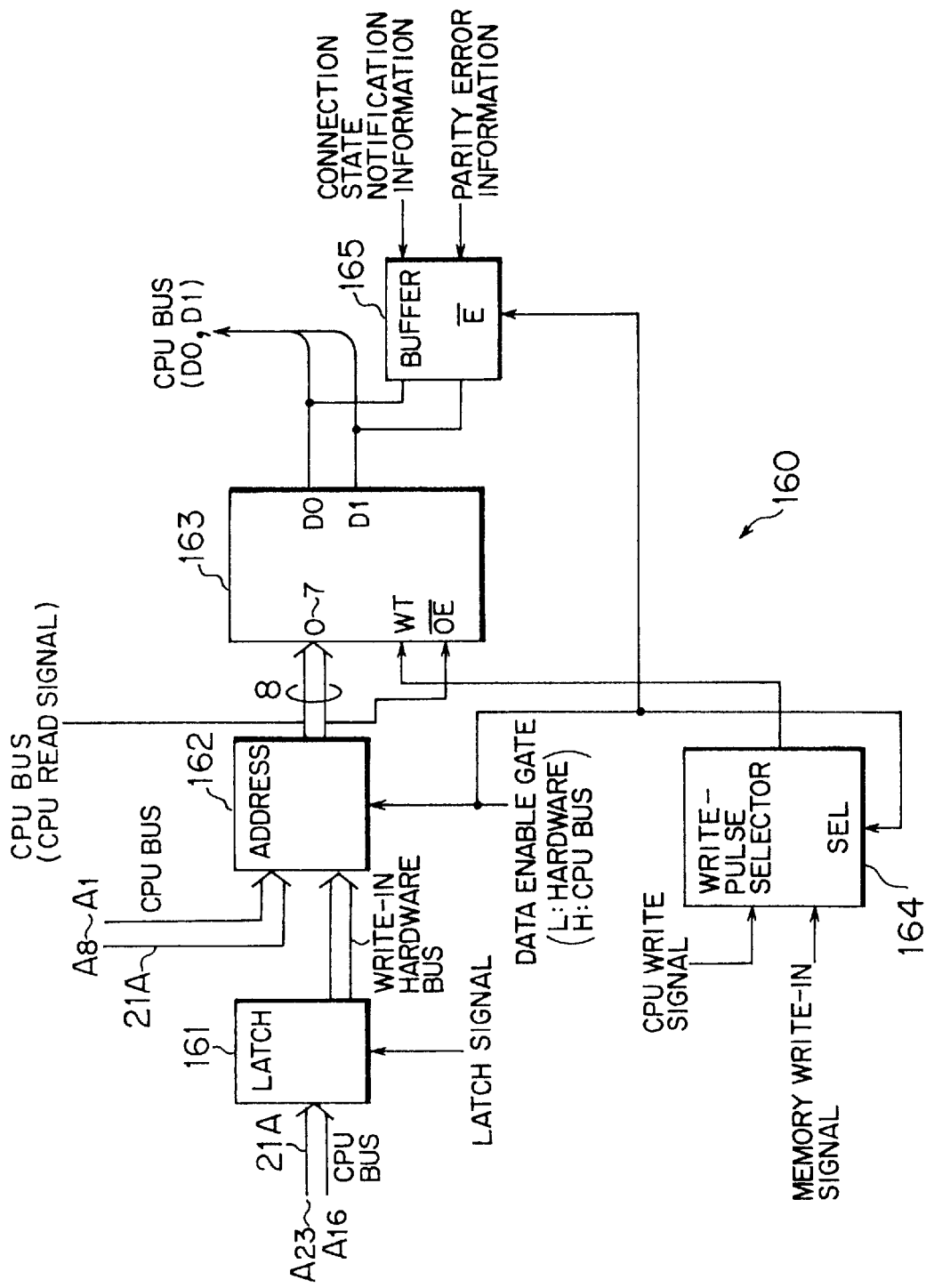
FIG. 40 is a block diagram showing the structure of a register section according to the eleventh embodiment of the present invention.

As shown in FIG. 40, the register section 160 includes a latch section 161, an address selector 162, a connection state/parity information holding memory 163, a write-pulse selector 164, and a buffer 165.

Based on an address latch signal from the CPU 21, the latch section 161 is connected to the CPU bus 21A. The latch section 161 latches address information ($A_{23}$–$A_{16}$) while the CPU 21 accesses the CM bus 23.

The address selector 162 is connected to the latch section 161 via a write-in hardware bus 166 and is also connected to the CPU bus 21A. Based on the a data enable gate signal from the AND circuit 44, the address selector 162 selectively outputs the address information from the latch section 161 or the address information from the CPU bus 21A.

Specifically, when the data enable gate signal from the AND circuit 44 is a low level signal, the address selector 162 selectively outputs the address information from the latch section 161, which address information is latched while the CPU 21 accesses the CM bus 23. When the data enable gate signal from the AND circuit 44 is a high level signal, the address selector 162 selectively outputs the address information that is obtained while the CPU 21 does not access to the CM bus 23.

The connection state/parity information holding memory 163 holds the address information input from the address selector 162 as address information and also holds the connection state notification information and parity error information as data ($D_0$, $D_1$).

Based on the data enable gate signal from the AND circuit 44, the write-pulse selector 164 selectively outputs a memory write-in signal or a write signal from the CPU 21.

The buffer 165 temporarily holds the connection state notification information and parity information output from the RS-485 receiver 59. When the data enable gate signal output from the AND circuit 44 becomes L (low level signal), the buffer 165 is brought into an enabled state, so that the information held by the buffer 165 is output to the connection state/parity information holding memory 163.

Therefore, when the data enable gate signal output from the AND circuit 44 is L (low level signal), the address selector 162 selects the address information output from the latch section 161, the write-pulse selector 164 selects the memory write-in signal, and the buffer 165 enters an enabled state.

That is, when the data enable gate signal output from the AND circuit 44 is L (low level signal), the CPU 21 is accessing the CM bus 23. At this time, the connection state notification information and parity information output from the buffer 165 are written into the connection state/parity information holding memory 163 by the hardware.

When the data enable gate signal from the AND circuit 44 becomes H (high level signal) after the connection state notification information and parity information for each channel are written into the connection state/parity information holding memory 163 by the hardware in the above-described manner, and the connection state/parity information holding memory 163 undergoes read access by the CPU 21, the address selector 162 selects the address information from the CPU bus 21A.

In this case, since the connection state/parity information holding memory 163 receives a CPU read signal from the CPU bus 21A, the connection state notification information and parity error information corresponding to the address information input from the CPU bus 21A via the address selector 162 are output to the CPU bus 21A as data ($D_0$, $D_1$).

When the data enable gate signal from the AND circuit 44 becomes H (high level signal) after the data in the connection state/parity information holding memory 163 is read by the CPU 21, and the connection state/parity information holding memory 163 undergoes write access by the CPU 21, the address selector 162 selects the address information from the CPU bus 21A, as in the case of the above-described read access.

In this case, the connection state/parity information holding memory 163 receives a CPU write signal from the CPU bus 21A, and the buffer 165 is in a disable state. Therefore, the address information input from the CPU bus 21A via the address selector 162 is cleared.

In other words, when the data enable gate signal from the AND circuit 44 is H (high level signal), the CPU 21 is accessing the CPU bus 21A. When a CPU write signal is input to the connection state/parity information holding memory 163 at this time, the data corresponding to the address information is cleared. When the CPU 21 recognizes that retry out occurs during data read-out operation, the CPU 21 reads out values from the register section 160 by accessing the CPU bus 21A, thereby obtaining parity error information, as well as information (connection state notification information) representing the mount state of the shelf 24–29 that accommodates the channel to which access is made, during which the retry out occurs.

Figure 41:
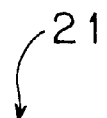
FIG. 41 is a block diagram showing a logic according to which a CPU diagnoses the nature of a CM bus fault in the eleventh embodiment of the present invention.
Figure 44:
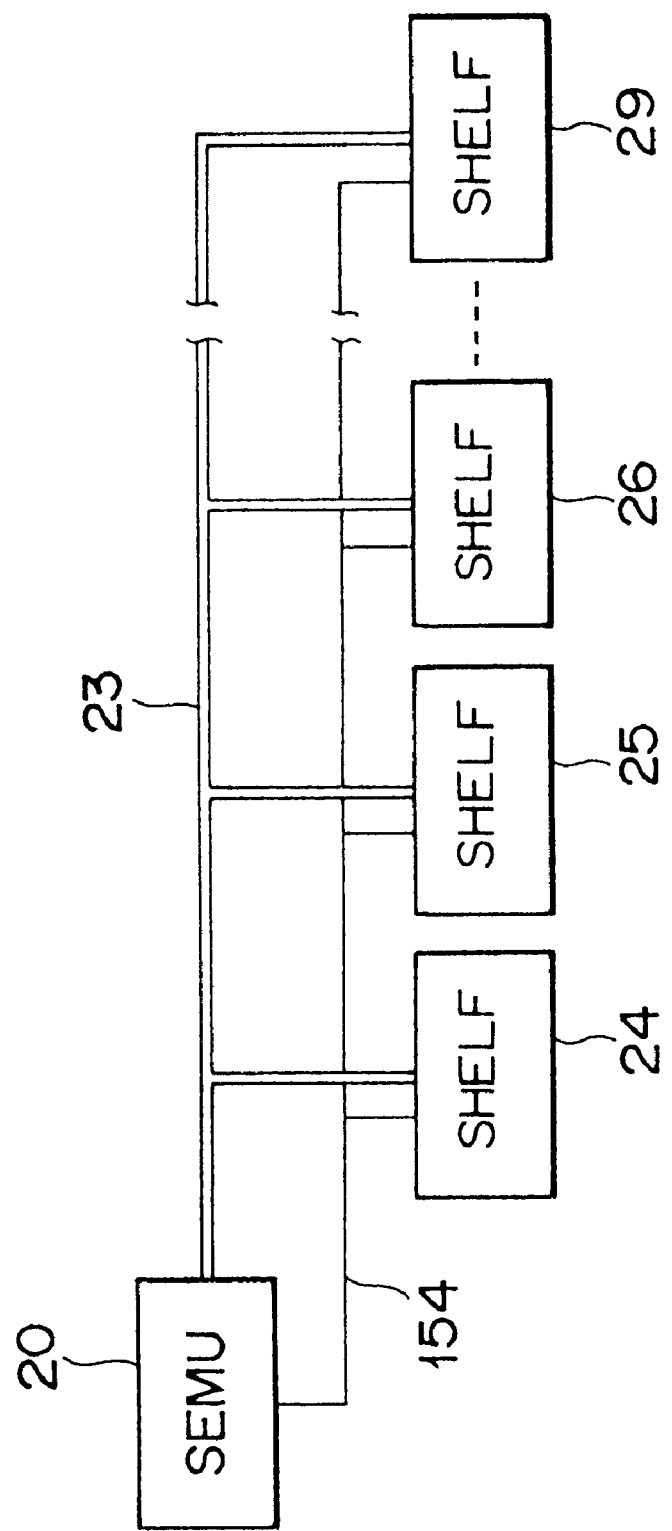
FIG. 44 is a diagram showing a modification of the eleventh embodiment of the present invention.

The CPU 21 has a logic as shown in FIG. 41 for diagnosing the nature of a failure of the CM bus 23 on the basis of the connection state notification information and parity error information output from the register section 160.

Therefore, when the CPU 21 recognizes occurrence of retry out, the CPU 21 can specify the cause (a bus failure or a non-mounted state of a shelf 24–29 serving as a CM bus slave) of the detected retry out.

Specifically, when both the connection state notification bus 154 and the parity error bus 155 are in the inactive state, the CPU 21 judges that the nature of the failure is a non-mounted state of a shelf. When the connection state notification bus 154 is in the inactive state and the parity error bus 155 is in the active state, the CPU 21 judges that the nature of the failure is a failure of the CM bus 23.

When both the connection state notification bus 154 and the parity error bus 155 are in the active state, the CPU 21 judges that the nature of the failure is a failure of the CM bus 23. When the connection state notification bus 154 is in the active state and the parity error bus 155 is in the inactive state, the CPU 21 judges that the nature of the failure is a failure of the CM bus 23.

Accordingly, the CPU 21 functions as a diagnosis section. That is, when a DACK signal serving as a permission signal is not received from the CM BUS conversion section 30a–35a even after a data read-out request is output to the same address a predetermined number of times, the cause of impossibility in receiving the DACK signal is diagnosed on the basis of the information from the connection state notification bus 154 and the parity error bus 155.

The operation of the control system according to the present embodiment having the above-described structure will now be described with reference to the timing chart shown in FIG. 43.

In the control system according to the present embodiment, embodiment.

When the CPU 21 performs access such as write-in or read-out against the CM bus 23, access address information is output to one of the shelves 24–29 which accommodates a channel, which is a monitor/controlled object to be accessed.

That is, when the data enable gate signal from the AND circuit 44 becomes L (low level signal) (see point in time (q1) in FIG. 43), the access of the CPU 21 to the CM bus 23 is started, and address information ($A_{23}$–$A_{00}$) and data information ($D_{15}$–$D_{00}$) are output to the CM bus 23 (see the period between (q1)–(q5) in FIG. 43).

In each of the shelves 24–29, the RS-485 receiver 71, which forms the CM BUS conversion sections 30a–35a, receive from the CM bus 23 the above-described access address information on the basis of the timing signal (MUXTIM).

The parity error detection section 156 of the CM BUS conversion section 30a–35a detects a parity error included in the address information received by the RS-485 receiver 71. The result of the detection is output to a three-state buffer 158.

The address detection section 157 decodes the address information so as to judge whether the received address information coincides with the address information of the channel held in the own shelf 24–29. The result of judgment is output to the three-state buffer 158.

The three-state buffer 158 controls the state (active/inactive) of the connection state notification bus 154 on the basis of the result of the judgment output from the address detection section 157, and also controls the state (active/inactive) of the parity error bus 155 on the basis of the detection information output from the parity error detection section 156.

In this case, the received address is not for an own channel. Therefore, on the basis of the result of the judgment from the address detection section 157, the three-state buffer 158 brings the connection state notification bus 154 into the inactive state, thereby outputting a connection state notification signal (a non-mounted state signal) (see the period between (q4)–(q9) in FIG. 43).

In this case, the parity error is detected in the received address information. Therefore, on the basis of the result of the detection from the parity error detection section 156, the three-state buffer 158 brings the parity error bus 155 into the active state so as to output a parity error signal (see the period between (q6)–(q9) in FIG. 43).

When a parity error is detected in any one of address blocks and data blocks, the three-state buffer 158 outputs a parity error signal in place of a DACK signal, which serves as a CPU cycle permission signal, at the timing of generating the DACK signal.

The latch section 161 latches address information ($A_{23}$–$A_{16}$) on the basis of an address latch signal from the CPU 21 while the CPU 21 accesses the CM bus 23 (see point in time (q2) in FIG. 43). Since the address selector 162 receives a low level data enable gate signal, the address information from the latch section 161 is set as an address of the connection state/parity information holding memory 163 (see the period between (q3)–(q9) in FIG. 43).

Since the write-pulse selector 164 also receives the low level data enable gate signal, a memory write signal for hardware write-in operation is selected, and the buffer 165 enters the enabled state.

As a result, using the address information from the latch section 161 as an address, the connection state notification information and parity error information from the buffer 165 is written into the connection state/parity information holding memory 163 by the hardware at the timing at which the write-pulse selector 164 selects the memory write-in signal (see the period between (q4)–(q7) and the period between (q8)–(q9) in FIG. 43).

The CPU 21 reads out from the register section 160 the values which have been written therein in the above-described manner, thereby obtaining information regarding the states of the connection state notification bus 154 and the parity error bus 155 connected to the shelves 24–29. Based on the thus-obtained information, the CPU 21 can recognize the mounted/non-mounted states of the shelves 24–29.

Especially, when the CPU 21 recognizes occurrence of retry out while it reads out data from a desired channel, the CPU 21 can specify the cause (a bus failure or a non-mounted state of a shelf serving as a CM bus slave) of the detected retry out by reading out the values from the register section 160.

As described above, the control system capable of coping with bus extension according to the eleventh embodiment of the present invention includes the connection state notification bus 154 and the parity error bus 155. Moreover, each of the CM BUS conversion sections 30a–35a includes the address detection section 157 and the three-state buffer 158. Therefore, when the CPU 21 recognizes generation of retry out while data is read out from a desired channel, the CPU 21 can reliably judge and specify the cause (a bus failure or a non-mounted state of a shelf serving as a CM bus slave) of the detected retry out by reading out the values from the register section 160. This makes it possible to cope with all kinds of bus failures, thereby further improving the monitor/control function.

Even when an error occurs in the address itself, which is output from the CM BUS conversion circuit 22 via the CM bus 23, in the case where the mounted/non-mounted state of each CM bus slave is detected through address detection, there is no possibility of outputting a signal that simply indicates that the CM bus slave is not mounted. This greatly improves the accuracy in specifying the cause of a failure.

In the above-described embodiment, the SEMU 20 and the shelves 24–29 are connected with each other via the CM bus 23, the connection state notification bus 154, and the parity error bus 155. However, according to the present invention, the SEMU 20 and the shelves 24–29 may be connected with each other by using only the CM bus 23 and the connection state notification bus 154 without using the parity error bus 155. In this case as well, while the amount of the hardware is decreased compared to the tenth embodiment, the same effect can be obtained; i.e., when retry out occurs in the CPU 21 of the SEMU 20, the CPU 21 can judge and specify the cause (a bus failure or a non-mounted state of a shelf serving as a CM bus slave) of the retry out.

In this case, at least each of the shelves 24–29 includes an address detection section for detecting the addresses of the monitor/controlled objects 36–41 accommodated in its own shelf, and a bus control section for brining the connection state notification bus 154 into an active state when the address detection section detects an address corresponding to one of the monitor/controlled objects 36–41 in its own shelf; and the SEMU 20 includes a diagnosis section which is operated in the case where no DACK signal is received from the CM BUS conversion sections 30a–35a even through the SEMU 20 outputs a data read-out request a predetermined number of times, and which diagnoses the cause of the impossibility in receiving the DACK signal on the basis of the information from the connection state notification bus 154.

(m) Twelfth Embodiment

Figure 45:
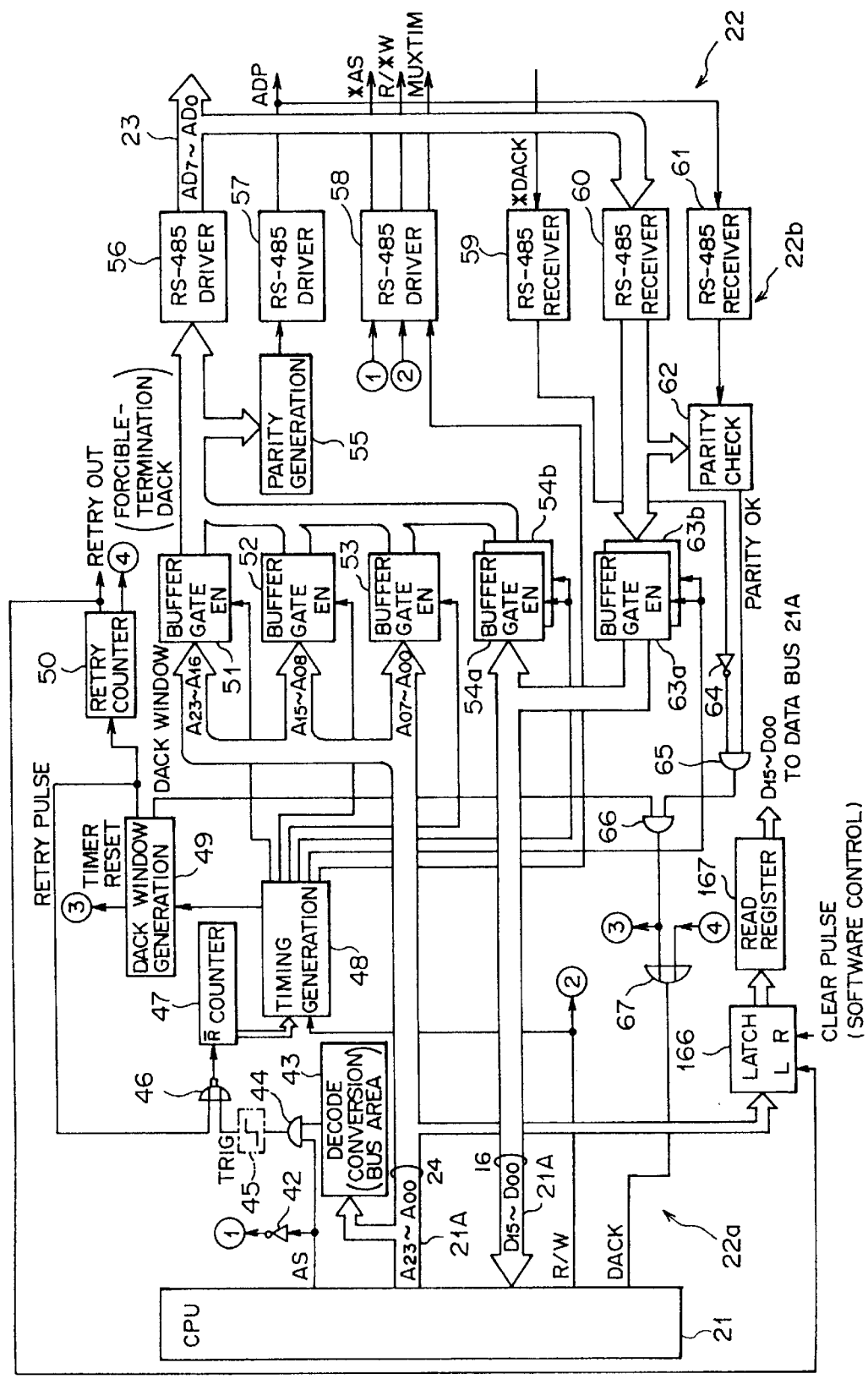
FIG. 45 is a block diagram showing an SEMU according to a twelfth embodiment of the present invention.

FIG. 45 is a block diagram showing a control system capable of coping with bus extension according to a twelfth embodiment of the present invention. The control system of the present embodiment differs from the first embodiment in that the SEMU 20 has a latch section 166 and a read register 167 and in that when a failure occurs in relation to the CM bus 23, designation and notification of a cut or broken position can be performed simultaneously with generation of an alarm which indicates a CM bus failure.

The latch section 166 latches the channel number of the address information which indicates one of the monitor/controlled objects 36–41 serving as CM bus slaves to which the SEMU 20 serving as a CM bus master requests to provide monitor/control data. When the latch section 166 receives from the retry counter 50 a retry-out signal serving as retry out information, the channel information latched by the latch section 166 is output to the read register 167 provided in the subsequent stage.

The contents of the latch section 166 is cleared by a software control of the CPU 21.

The read register 167 is connected to the CPU bus 21A serving as data bus. Via the CPU bus 21A, the read register 167 notifies the CPU 21 of the information held by the latch section 166.

Therefore, the latch section 166 and the read register 167 function as an address information register for latching address information provided for the monitor/controlled objects 36–41.

When the CPU 21 recognizes occurrence of retry out through reception of a forcible-termination DACK signal, the CPU 21 can specify a location where a bus failure occurred, which failure caused the retry out. Specifically, the CPU 21 judges the channel information which is previously latched by the latch section 166 as information indicating the location where the CM bus 23 is cut or broken, or has a failure.

In other words, the CPU 21 functions as a bus break/failure location specifying section which operates in the case where no DACK signal is received from the CM BUS conversion sections 30a–35a even through a data read-out request is output a predetermined number of times and which specifies the location where the CM bus 23 is broken or cut, or has a failure.

Figure 46:
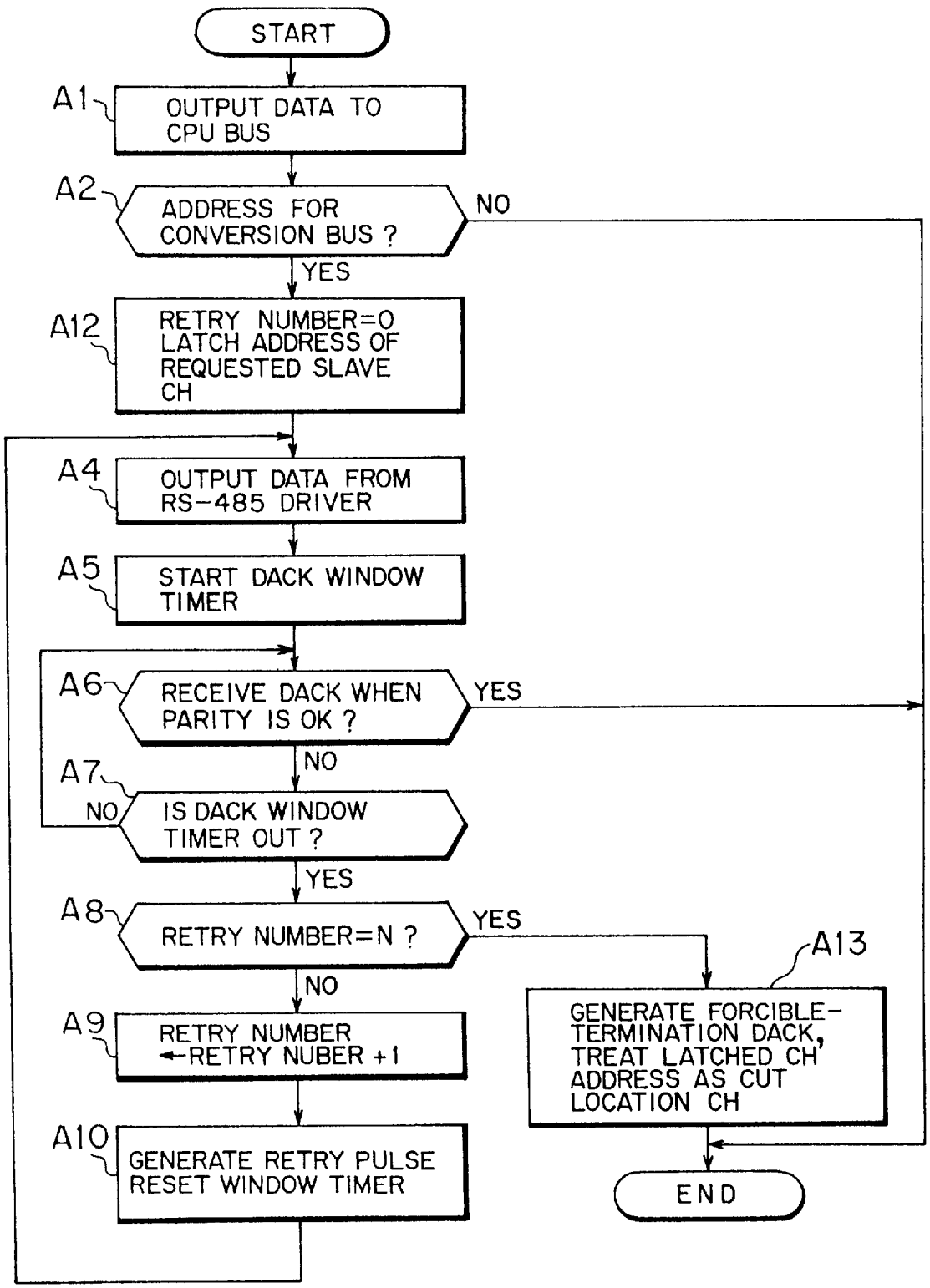
FIG. 46 is a flowchart showing the operation of the control system capable of coping with bus extension according to the twelfth embodiment of the present invention.

In the control system of the present embodiment having the above-described structure, when the CM BUS conversion circuit 22 receives no DACK signal even if it is in a state capable of receiving the DACK signal, the CM BUS conversion circuit 22 retransmits address/data which is the same as that transmitted via the CM bus 23 to one of the shelves 24–29 which accommodates a desired channel, as shown by the flowchart of FIG. 46, for example.

In detail, as described above, data is output from the CPU 21 of the SEMU 20 to the CM BUS conversion circuit 22 via the CPU bus 21A (step A1).

When the address information of the data output to the CPU bus 21A is the address that must be output to the CM bus 23 (the "Yes" route of step A2), the retry number (i.e. the number of times of data retransmission to the CM bus 23), which is counted by the retry counter 50, is set to "0". Also, the address information output to the CPU bus 21A is latched by the latch section 166 as the channel information indicating a slave to which a data read-out is requested (step A12).

Further, the RS-485 drivers 56–58 output data to the CM bus 23 in the above-described manner (step A4).

Subsequently, the DACK window generation section 49 outputs a DACK window signal to the AND circuit 66 (see (g) of FIG. 7) so as to start window processing for receiving a DACK signal from one of the shelves 24–29 which accommodates a channel to which the data is to be transmitted. Simultaneously with this, the timer is started to clock the predetermined period of time during which the window processing is to be performed (step A5).

Until it is judged by the timer that the predetermined period of time has elapsed, reception of a DACK signal is waited (loop formed by the "NO" route of step A6 and the "NO" route of step A7). When the DACK signal is received before the predetermined period of time has elapsed, the SEMU 20 does not retransmit the data (the "YES" route of step A6). When the DACK signal is not received even after the predetermined period of time has elapsed, the SEMU 20 retransmits the data (the "YES" route of step A7).

That is, when the retry number is not greater than a predetermined number N (where N is a natural number), "1" is added to the retry number counted by the retry counter 50. Subsequently, a retry pulse is output from the DACK window generation section 49, and the period of time for the window processing clocked by the timer is reset (step A10).

Thus, the same data as the previously transmitted data is again transmitted through the CM bus 23 to one of the shelve 24–29 which accommodates the desired channel. Subsequently, as in the above-described case, receipt of a DACK signal is waited (from step A10 to step A4).

When it is judged at step A8 that the above-described retransmission from the CM BUS conversion circuit 22 has been repeated N times, the retry counter 50 outputs a retry-out signal to the OR circuit 67 so as to perform recovery processing. Thus, the OR circuit 67 generates a forcible-termination DACK signal and outputs it to the CPU 21 (step A11). The CPU 21 recognizes this as a bus failure and obtains the address information latched by the latch section 166 via the read register 167. The CPU 21 then specifies (designates) a channel corresponding to the address information as a location where the bus is broken or cut, or has a failure.

As described above, in the control system capable of coping with bus extension according to the twelfth embodiment of the present invention, since the SEMU 20 includes the latch section 166 and the read register 167, a break location of the CM bus can be found when a failure occurs. Therefore, it becomes unnecessary for a person in charge of maintaining the apparatus to go to the site and to perform a test for checking whether a signal/electricity can be conducted, thereby identifying the location where the bus is broken or cut. This eliminates the necessity of breaking lines during the time when service is provided. Moreover, failures can be removed safely, reliably and quickly.

Although the CM bus 23 does not have a duplicated structure, the present embodiment is not limited thereto and the CM bus 23 may have a duplicated structure. For example, the present embodiment may be applied to a control system capable of coping with bus extension which is duplicated in the manner as shown in the second embodiment.

(n) Thirteenth Embodiment

Figure 47:
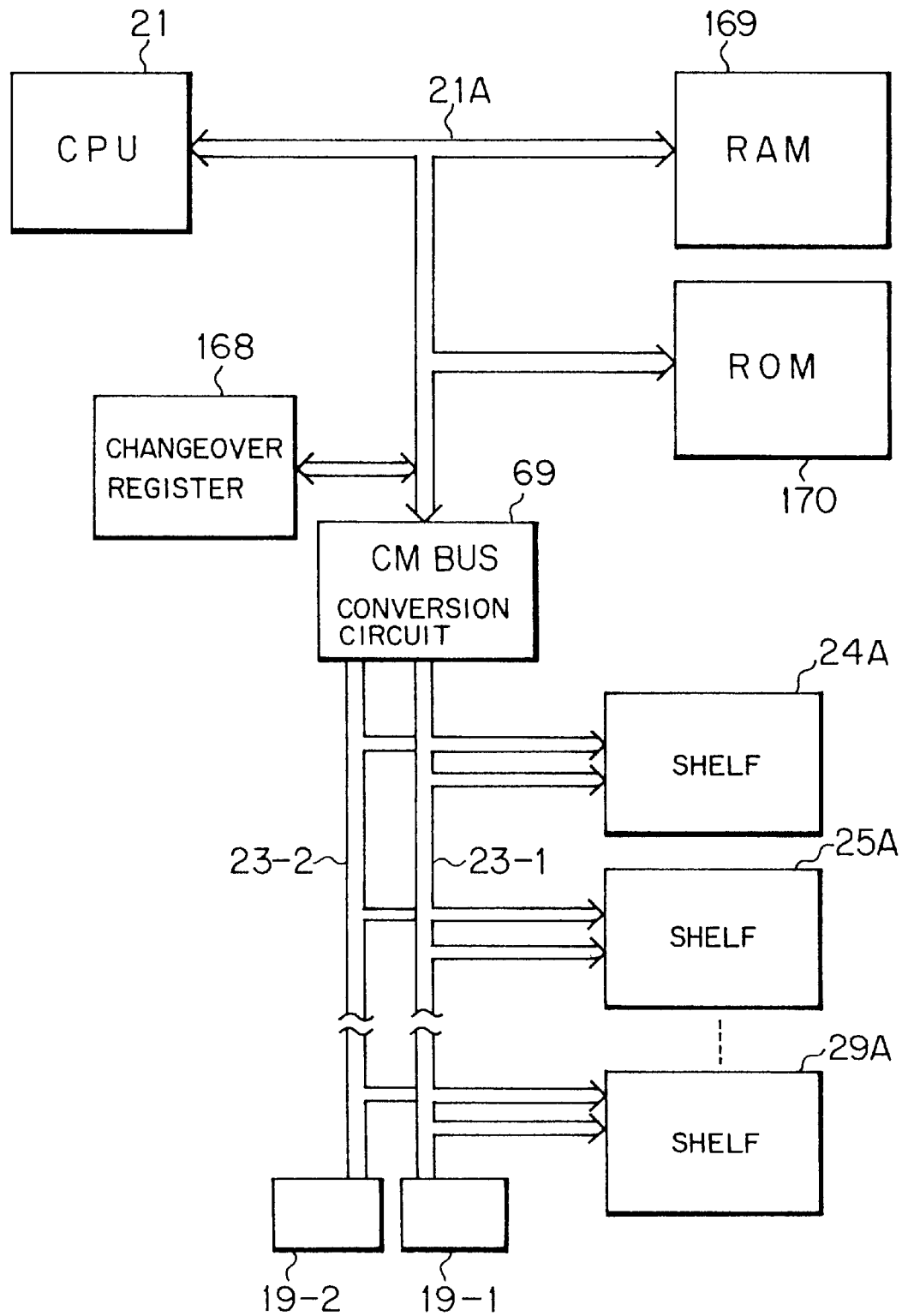
FIG. 47 is a block diagram showing a control system capable of coping with bus extension according to a thirteenth embodiment of the present invention.

FIG. 47 is a block diagram showing a control system capable of coping with bus extension according to a thirteenth embodiment of the present invention. As in the second embodiment, in the control system shown in FIG. 47, the CM buses 23-1 and 23-2, which connect the shelves (controlled sections) 24A–29A with the SEMU 20, are redundantly provided for current use and for spare.

Figure 48:
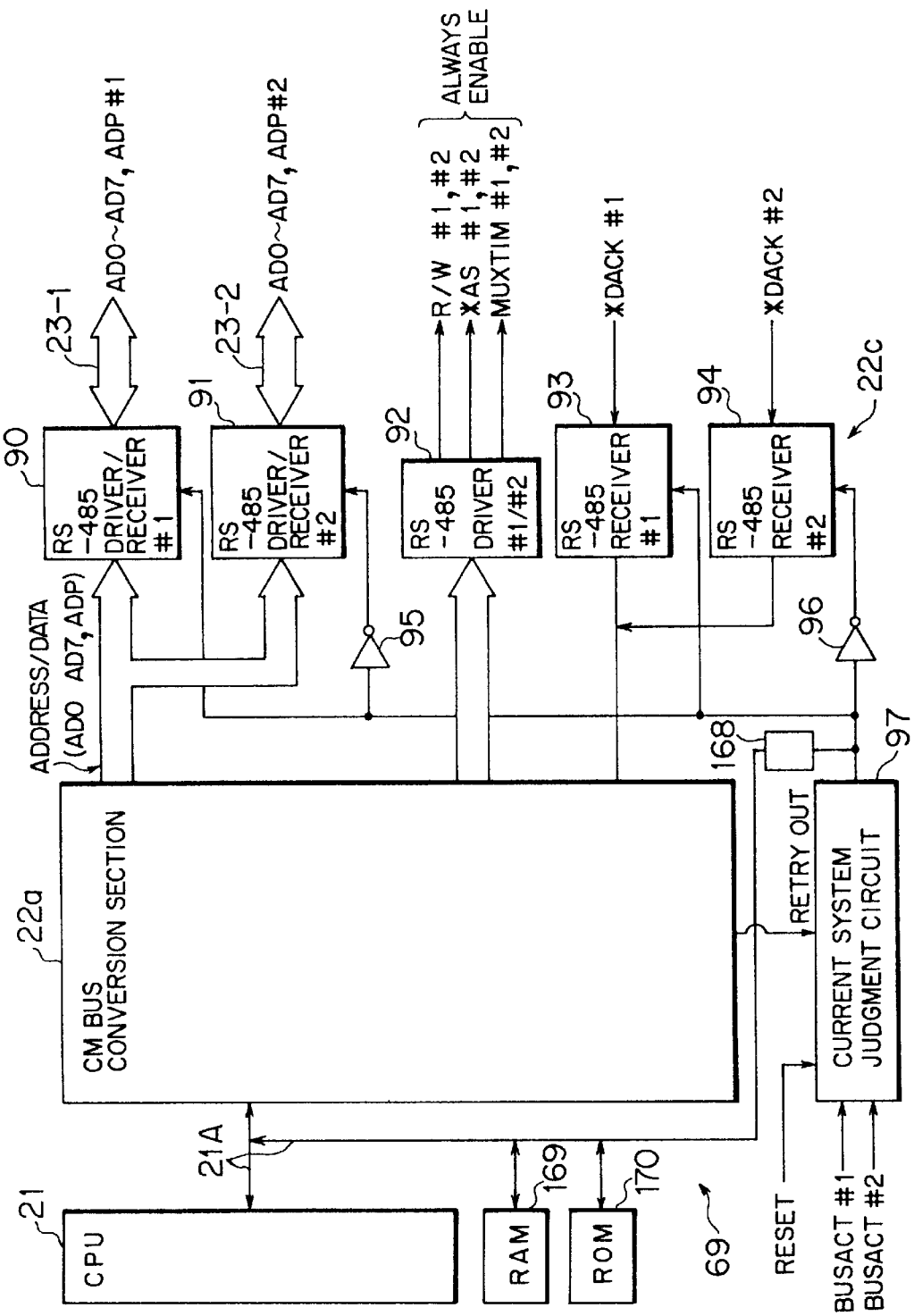
FIG. 48 is a block diagram showing an SEMU according to the thirteenth embodiment of the present invention.

The control system according to the present embodiment is basically the same as that of the second embodiment except that a changeover register 168 for holding changeover information regarding current use and spare is provided, and that when the current bus is switched to the spare bus, setting information for the shelves 24A–29A is reset by using information stored in a RAM 169 and a ROM 170. In FIGS. 47 and 48, same portions as those shown in FIGS. 10 and 11 are denoted by the same reference numbers.

FIG. 48 is a block diagram showing the SEMU 20 of the control system according to the thirteenth embodiment of the present invention. In FIG. 48, numeral 97A denotes a current system judgment circuit 97A. This current system judgment circuit 97A receives status signals BUSACT#1 and BUSACT#2 from break detection sections 68-1 and 68-2, a retry-out signal from the retry counter 50, and a status reset signal from the CPU 21. The current system judgment circuit 97A determines a current system on the basis of the detection of the status signals BUSACT#1 and BUSACT#2 or a retry-out signal.

For example, when a break of the bus which has been used as a current bus or a retry out is detected on the basis of the status signals BUSACT#1 and BUSACT#2 or the retry-out signal, the current system is switched to the spare system by using the detection of the break or retry out as trigger information.

The changeover register 168 receives the current system control information from the current system judgment circuit 97. When a changeover between the current system and the spare system occurs in the shelves 24A–29A, the information indicating the changeover is held in the changeover register 168. The data in the changeover register 168 is input to the CPU 21 via the CPU bus 21A, so that the CPU 21 can recognize the changeover between the current system and the spare system.

The RAM 169 and the ROM 170 store equipment operation information of the shelves 24A–29A, which are controlled sections. The equipment setting information stored in the RAM 169 and the ROM 170 is output to the CM buses 23-1 and 23-2 via the CPU 21 and is set in the shelves 24A–29A as equipment setting information.

For example, when the CPU 21 receives no DACK signal serving as a permission signal from the CM BUS conversion sections 30a-1–35a-1 or 30a-2–35a-2 even after a data read-out request is output a predetermined number of times and the CM bus 23-1 and 23-2 are switched so as to exchange their roles between current and spare buses, the equipment operation information of the shelves 24A–29A is reset using the data stored in the RAM 169 and the ROM 170.

The operation of the control system according to the thirteenth embodiment having the above-described structure will be described with reference to the flowchart shown in FIG. 49.

Figure 49:
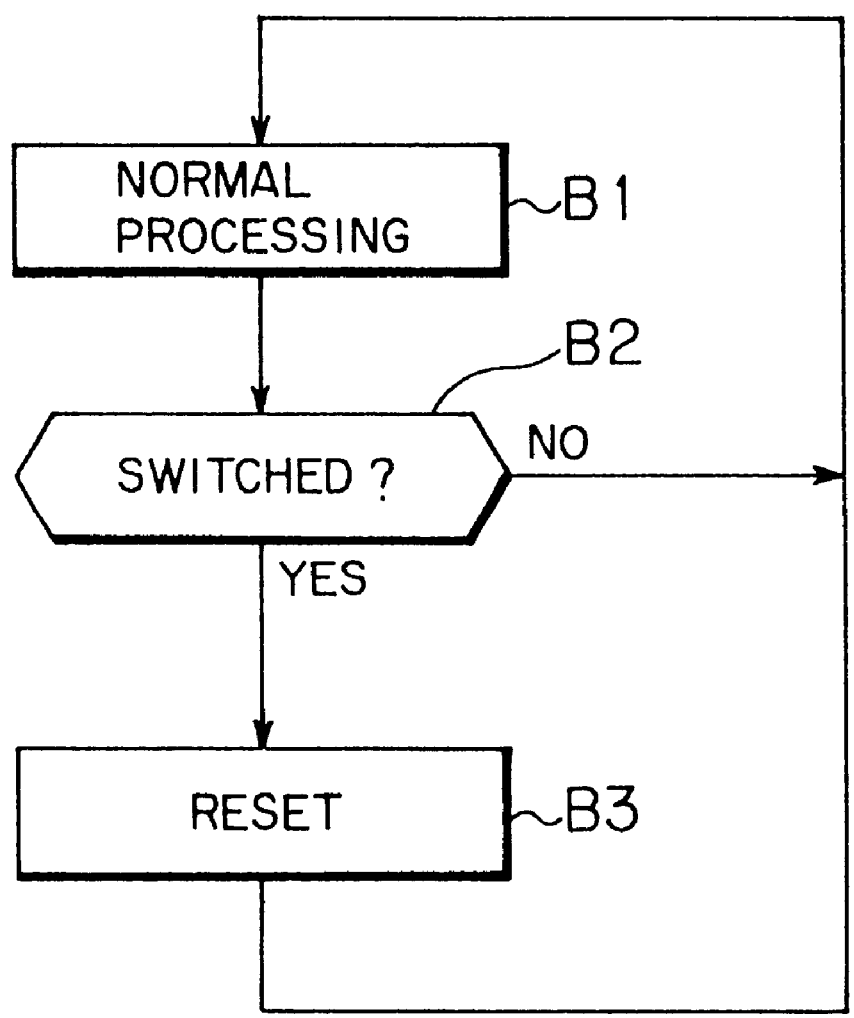
FIG. 49 is a flowchart showing the operation of the control system capable of coping with bus extension according to the thirteenth embodiment of the present invention.

As in the second embodiment, in the control system according to the present embodiment, information is normally exchanged between the SEMU 20 and the shelves 24A–29A by using the #1 system having the CM bus 23-1 or the #2 system having the CM bus 23-2 as a current system (step B1 in FIG. 49).

That is, the current system judgment circuit 97 of the SEMU 20A determines a system to be used as a current system on the basis of the break detection information from the break detection sections 68-1 and 68-2, thereby allowing information to be exchanged between the SEMU 20A and the shelves 24A–29A.

When the break detection section 68-1 or 68-2 of the SEMU 20A detects a break of the CM bus 23-1 or 23-2 which has been used as a current system or receives a retry-out pulse from the retry counter 50, the break detection section 68-1 or 68-2 switches the current system to the spare system, and notifies the CPU 21 of the changeover.

The changeover register 168 receives the current system control information from the current system judgment circuit 97. When a changeover between the current system and the spare system occurs in the shelves 24A–29A, the information indicating the changeover is held in the changeover register 168, and the information indicating the changeover in the changeover register 168 is supplied to the CPU 21 via the CPU bus 21A.

At the time when the CM bus 23-1 and 23-2 are switched so as to exchange their roles between current and spare buses, the CPU 21 resets the equipment operation information of the shelves 24A–29A by using data stored in the RAM 169 and the ROM 170 (from the YES route of step B2 to step B3 in FIG. 49).

Each of the CM BUS conversion sections 30a-1–35a-1 and 30a-2–35a-2 of the shelves 24A–29A sends a DACK signal serving as a permission signal back to the CM BUS conversion circuit 69 whenever the above-described setting information is received.

For example, when the CM bus 23-1 which has been used as a current bus is switched to the CM bus 23-2, the shelves 24A–29A, which serve as controlled section and which are connected to the CM bus 23-2, are brought from the state in which the CM BUS conversion sections 30a-1–35a-1 operate into the state in which the CM BUS conversion sections 30a-2–35a-2 operates.

Although the CPU 21 can recognize the changeover between the current and spare systems, this changeover is performed asynchronously with the access by the software of the CPU. Therefore, there is produced a period during which recognition by the CPU 21 becomes wrong, unless equipment setting information is reset into the CM BUS conversion sections 30a-2–35a-2 simultaneously with the changeover.

In other words, in the case where changeover occurs during an access by the CPU 21, there is a possibility that the information of the corresponding CPU cycle disappears. Especially, when the above-described changeover occurs while information regarding operation of the apparatus is being set, there is a possibility that the apparatus cannot provide a desired function.

In the present embodiment, when it is recognized that a changeover between the current and spare systems has occurred, the CPU 21 resets the equipment setting information in the shelves 24A–29A. Therefore, it is possible to prevent occurrence of a discrepancy in the recognition by the CPU 21 during the changeover between the current and spare systems.

As described above, in the control system capable of coping with bus extension according to the thirteenth embodiment of the present invention, the CM buses 23-1 and 23-2 are redundantly provided for current use and for spare. In addition, when the CPU 21 receives no DACK signal serving as a permission signal from the CM BUS conversion sections 30a-1–35a-1 or 30a-2–35a-2 even after a data read-out request is output a predetermined number of times, the CPU 21 resets the equipment operation information of the shelves 24A–29A when the CM bus 23-1 and 23-2 are switched so as to exchange their roles. This prevents occurrence of a discrepancy in the recognition by the CPU 21 during the changeover between the current and spare systems. Therefore, even when a changeover occurs while the CPU 21 accesses the bus, the apparatus is prevented from causing a functional failure.

(o) Others

Although six shelves 24 and 24A are connected to the SEMU 20 via the CM bus 23, 23-1 and 23-2 in the above-described embodiments, the number of the shelves is not limited to six and may be changed. Especially, the number of channels may be increased by increasing the number of shelves to seven or more.

Moreover, the above-described various embodiments may be freely combined.

What is claimed is:

1. A control system for controlling a communication apparatus and coping with bus extension, the control system comprising a control section formed by a microprocessor or a CPU, and a plurality of controlled sections connected to said control section via a bus, said controlled sections being connected to said bus in parallel, each of said controlled sections accommodating at least one controlled object, said control section comprising a first interface for extension bus generation which includes a latch section and a bus transmission section, said latch section latching a piece of address/data information at a time, piece of information including a predetermined number of bits when a signal is output to said bus, and said bus transmission section performing time division multiplexing for the information of the predetermined number of bits in a predetermined order so as to send it, and also sending control signals used for performing time division multiplexing together With the information of the predetermined number of bits;

said controlled section comprising a second interface section for extension bus generations said second interface including a reception section, a judgment section, and a permission signal send-back section, said reception section receiving address/data information and control signals from said bus transmission section of said control section, said judgment section judging whether the received information is normal information directed to said controlled section to which said judgment section belongs, said permission signal send-back section sending a permission signal back to said control section when it is determined by said judgment section that the received information is normal and is directed to the controlled object of said controlled section to which said judgment section belongs; and said bus being formed by a bus which complies with a standard regarding mutual connection between apparatuses in a data communication system so as to send and receive pieces of information, each including a predetermined number of bits, and control signals, and controlled objects accommodated in said controlled sections being directly accessed from said bus.

2. The control system according to claim 1, wherein two of signal transmission cables which form said bus are looped at their ends so as to form a break detection line, and said control section outputs alarm information when it is judged on the basis of a signal from said break detection line that said signal transmission cables are broken or cut.

3. The control system according to claim 1, wherein said first interface section for extension bus generation comprises a variable transmission clock generator which can change the speed of clocks used for transmitting a signal, and a clock speed setting section for setting the speed of clocks generated by said variable transmission clock generator.

4. A control system for controlling a communication apparatus and coping with bus extension the control system comprising a control section formed by a microprocessor or a CPU, and a plurality of controlled sections connected to said control section via a bus, said controlled sections being connected to said bus in parallel, each of said controlled sections accommodating at least one controlled object, said control section comprising a first interface for extension bus generation which includes a latch section and a bus transmission section, said latch section latching a piece of address/data information at a time, said piece of information including a predetermined number of bits when a signal is output to said bus, and said bus transmission section performing time division multiplexing for the information of the predetermined number of bits in a predetermined order so as to send it, and also sending control signals used for performing time division multiplexing together with the information of the predetermined number of bits;

said controlled section comprising a second interface section for extension bus generation, said second interface including a reception section, a judgment section, and a permission signal send-back section, said reception section receiving address/data information and control signals from said bus transmission section of said control section, said judgment section judging whether the received information is normal information directed to said controlled section to which said judgment section belongs, said permission signal send-back section sending a permission signal back to said control section when it is determined by said judgment section that the received information is normal and is directed to the controlled object of said controlled section to which said judgment section belongs; and said bus being formed by a bus which complies with a standard regarding mutual connection between apparatuses in a data communication system so as to send and receive pieces of information, each including a predetermined number of bits, and control signals, and controlled objects accommodated in said controlled sections being directly accessed from said bus;

wherein said first interface section for extension bus generation includes a first error-detection-bit addition section for adding an error detection bit to information which is transmitted a predetermined number of bits at a time, and said second interface section for extension bus generation includes a second error-detection-bit addition section for adding an error detection bit to information which is transmitted a predetermined number of bits at a time.

5. The control system according to claim 4, wherein said second interface section for extension bus generation has a structure such that when said second interface section for extension bus generation receives address/data information and control signals and determines, on the basis of an error detection bit: added to the information received by said reception section, that an error is included in either the address information or the write-in data information from said control section, said second interface section for extension bus generation does not access the controlled object, and said permission signal send-back section does not send any permission signal to said control section.

6. The control system according to claim 4, wherein said control section has a structure such that when said control section outputs a signal to said bus and subsequently detects an error in read-out data information sent from said second interface section for extension bus generation, said control section ignores a permission signal sent from said permission signal send-back section of said second interface section for extension bus generation and outputs the signal again.

7. The control system according to claim 4, wherein said control section has a structure such that, after outputting a signal via said bus, said control section waits to receive a permission signal from said permission signal send-back section, and then if no permission signal is received within a predetermined period of time, said control section outputs the signal again.

8. The control system according to claim 7, wherein said first interface section for extension bus generation comprises a variable transmission clock generator which can change the speed of clocks used for transmitting a signal, and a clock speed setting section for setting the speed of clocks generated by said variable transmission clock generator such that the speed of clocks varies in accordance with the number of times the signal has been output.

9. The control system according to claim 7, wherein said controlled section comprises a retransmission output recognition section, when said control section outputs a signal so as to perform data read-out control for said controlled section and if the read-out control is successively performed for different addresses, said retransmission output recognition section recognizing the signal as being output first time, and if the read-out control is successively performed for the same address, said retransmission output recognition section recognizing the signal as being output by retransmission processing.

10. The control system according to claim 9, wherein said controlled section comprises:
a read-out data latch section for latching read-out data until said control section performs data read-out control;
a data holding section for temporarily holding data read out from said read-out data latch section; and
an output data selecting section, said output data selecting section outputting t he read-out data from said read-out data latch section to said control section when said retransmission output recognition section recognizes the signal as being output first time, and said output data selecting section outputting the data held by said data holding section to said control section when said retransmission output recognition section recognizes the signal as being output through retransmission processing.

11. The control system according to claim 7, wherein said controlled section comprises a retransmission output recognition section, when said control section outputs a signal so as to perform data read-out control for said controlled section and if a period of time which has elapsed after completion of previous data read-out control is greater than a predetermined value, said retransmission output recognition section recognizing the signal as being output first time, and if the period of time which has elapsed after completion of previous data read-out control is not greater than the predetermined value, said retransmission output recognition section recognizing the signal as being output by retransmission processing.

12. The control system according to claim 11, wherein said controlled section comprises:
a read-out data latch section for latching read-out data until said control section performs data read-out control;
a data holding section for temporarily holding data read out from said read-out data latch section; and
an output data selecting section, said output data selecting section outputting the read-out data from said read-out data latch section to said control section when said retransmission output recognition section recognizes the signal as being output first time, and said output data selecting section outputting the data held by said data holding section to said control section when said retransmission output recognition section recognizes the signal as being output through retransmission processing.

13. A control system for controlling a communication apparatus and coping with bus extension comprising a control section formed by a microprocessor or a CPU, and a plurality of controlled sections connected to said control section via a bus, each of said controlled sections accommodating at least one controlled object, wherein
said control section comprises a first interface for extension bus generation which includes a latch section and a bus transmission section, said latch section latching a piece of address/data information at a time which piece of information includes a predetermined number of bits when a signal is output to said bus, and said bus transmission section performing time division multiplexing for the information of the predetermined number of bits in a predetermined order so as to send it, and also sanding control signals used for performing time division multiplexing together with the information of the predetermined number of bits;
said controlled section comprises a second interface section for extension bus generation which includes a reception section, a judgment section, and a permission signal send-back section, said reception section receiving address/data information and control signals from said bus transmission section of said control section, said judgment section judging whether the received information is normal information directed to said controlled section to which said Judgment section belongs, said permission signal send-back section sending a permission signal back to said control section when it is determined by said judgment section that the received information is normal and is directed to the controlled object of said controlled section to which said judgment section belongs;
said bus is formed by a bus which complies with a standard regarding mutual connection between apparatuses in a data communication system so as to send and receive pieces of information, each including a predetermined number of bits, and control signals;
said first interface section for extension bus generation further includes a first error-detection-bit addition section for adding an error detection bit to information which is transmitted a predetermined number of bits at a time, and said second interface section for extension bus generation includes a second error-detection-bit addition section for adding an error detection bit to information which is transmitted a predetermined number of bits at a time;
said control section has a structure such that, after outputting a signal via said bus, said control section waits to receive a permission signal from said permission signal send-back section, and then if no permission signal is received within a predetermined period of time, said control section outputs the signal again; and
wherein said control section further comprises an entire-length input section for inputting the entire length of said bus and a waiting-time changing section for changing the predetermined period of time according to an input value from said entire-length input section.

14. A control system for controlling a communication apparatus and coping with bus extension comprising a control section formed by a microprocessor or a CPU, and a plurality of controlled sections connected to said control section via a bus, each of said controlled sections accommodating at least one controlled object, wherein said control section comprises a first interface for extension bus generation which includes a latch section and a bus transmission section, said latch section latching a piece of address/data information at a time which piece of information includes a predetermined number of bits when a signal is output to said bus, and said bus transmission section performing time division multiplexing for the information of the predetermined number of bits in a predetermined order so as to send it, and also sending control signals used for performing time division multiplexing together with the information of the predetermined number of bits;

said controlled section comprises a second interface section for extension bus generation which includes a reception section, a judgment section, and a permission signal send-back section, said reception section receiving address/data information and control signals from said bus transmission section of said control section, said judgment section judging whether the received information is normal information directed to said controlled section to which said judgment section belongs, said permission signal send-back section sending a permission signal back to said control section when it is determined by said judgment section that the received information is normal and is directed to the controlled object of said controlled section to which said judgment section belongs;

said bus is formed by a bus which complies with a standard regarding mutual connection between apparatuses in a data communication system so as to send and receive pieces of information, each including a predetermined number of bits, and control signals;

said first interface section for extension bus generation further includes a first error-detection-bit addition section for adding an error detection bit to information which is transmitted a predetermined number of bits at a time, and said second interface section for extension bus generation includes a second error-detection-bit addition section for adding an error detection bit to information which is transmitted a predetermined number of bits at a time;

said control section has a structure such that, after outputting a signal via said bus, said control section waits to receive a permission signal from said permission signal send-back section, and then if no permission signal is received within a predetermined period of time, said control section outputs the signal again; and wherein said control section has a structure such that when no permission signal is received from said permission signal send-back section even after signal output is repeated a predetermined number of time, said control section reports this to the outside as a bus failure.

15. A control system for controlling a communication apparatus and coping with bus extension comprising a control section formed by a microprocessor or a CPU, and a plurality of controlled sections connected to said control section via a bus, each of said controlled sections accommodating at least one controlled object, wherein:

said control section comprises a first interface for extension bus generation which includes a latch section and a bus transmission section, said latch section latching a piece of address/data information at a time which piece of information includes a predetermined number of bits when a signal is output to said bus, and said bus transmission section performing time division multiplexing for the information of the predetermined number of bits in a predetermined order so as to send it, and also sending control signals used for performing time division multiplexing together with the information of the predetermined number of bits;

said controlled section comprises a second interface section for extension bus generation which includes a reception section, a judgment section, and a permission signal send-back section, said reception section receiving address/data information and control signals from said bus transmission section of said control section, said judgment section judging whether the received information is normal information directed to said controlled section to which said judgment section belongs, said permission signal send-back section sending a permission signal back to said control section when it is determined by said judgment section that the received information is normal and is directed to the controlled object of said controlled section to which said judgment section belongs;

said bus is formed by a bus which complies with a standard regarding mutual connection between apparatuses in a data communication system so as to send and receive pieces of information, each including a predetermined number of bits, and control signals;

said first interface section for extension bus generation further includes a first error-detection-bit addition section for adding an error detection bit to information which is transmitted a predetermined number of bits at a time, and said second interface section for extension bus generation includes a second error-detection-bit addition section for adding an error detection bit to information which is transmitted a predetermined number of bits at a time;

said control section has a structure such that, after outputting a signal via said bus, said control section waits to receive a permission signal from said permission signal send-back section, and then if no permission signal is received within a predetermined period of time, said control section outputs the signal again;

said first interface section for extension bus generation comprises a variable transmission clock generator which can change the speed of clocks used for transmitting a signal, and a clock speed setting section for setting the speed of clocks generated by said variable transmission clock generator such that the speed of clocks varies in accordance with the number of times the signal has been output; and wherein said clock speed setting section is formed by a setting/changing register for holding clock speed information which is set in accordance with the number of times the signal has been output.

16. A control system for controlling a communication apparatus and coping with bus extension comprising a control section formed by a microprocessor or a CPU, and a plurality of controlled sections connected to said control section via a bus, each of said controlled sections accommodating at least one controlled object, wherein:

said control section comprises a first interface for extension bus generation which includes a latch section and a bus transmission section, said latch section latching a piece of address/data information at a time which piece of information includes a predetermined number of bits when a signal is output to said bus, and said bus transmission section performing time division multiplexing for the information of the predetermined number of bits in a predetermined order so as to send it, and also sending control signals used for performing time division multiplexing together with the information of the predetermined number of bits;

said controlled section comprises a second interface section for extension bus generation which includes a reception section, a judgment section, and a permission signal send-back section, said reception section receiving address/data information and control signals from said bus transmission section of said control section, said judgment section judging whether the received information is normal information directed to said controlled section to which said judgment section belongs, said permission signal send-back section sending a permission signal back to said control section when it is determined by said Judgment section that the received information is normal and is directed to the controlled object of said controlled section to which said judgment section belongs;

said bus is formed by a bus which complies with a standard regarding mutual connection between apparatuses in a data communication system so as to send and receive pieces of information, each including a predetermined number of bits, and control signals;

said first interface section for extension bus generation further includes a first error-detection-bit addition section for adding an error detection bit to information which is transmitted a predetermined number of bits at a time, and said second interface section for extension bus generation includes a second error-detection-bit addition section for adding an error detection bit to information which is transmitted a predetermined number of bits at a time;

said control section has a structure such that, after outputting a signal via said bus, said control section waits to receive a permission signal from said permission signal send-back section, and then if no permission signal is received within a predetermined period of time, said control section outputs the signal again;

said first interface section for extension bus generation further comprises a permission signal reception notification section which upon reception of a permission signal from said permission signal send-back section, notifies said controlled section of reception of the permission signal; and said controlled section further comprises a register for latching read-out data from the control object, and has a structure such that said controlled section cancels the latch of the data by said register when said control section receives a permission signal reception notice from said permission signal reception notification section after the latched read-out data is read out by said control section.

17. A control system for controlling a communication apparatus and coping with bus extension comprising a control section formed by a microprocessor or a CPU, and a plurality of controlled sections connected to said control section via a bus, each of said controlled sections accommodating at least one controlled object, wherein:

said control section comprises a first interface for extension bus generation which includes a latch section and a bus transmission section, said latch section latching a piece of address/data information at a time which piece of information includes a predetermined number of bits when a signal is output to said bus, and said bus transmission section performing time division multiplexing for the information of the predetermined number of bits in a predetermined order so as to send it, and also sending control signals used for performing time division multiplexing together with the information of the predetermined number of bits;

said controlled section comprises a second interface section for extension bus generation which includes a reception section, a judgment section, and a permission signal send-back section, said reception section receiving address/data information and control signals from said bus transmission section of said control section, said judgment section judging whether the received information is normal information directed to said controlled section to which said judgment section belongs, said permission signal send-back section sending a permission signal back to said control section when it is determined by said judgment section that the received information is normal and is directed to the controlled object of said controlled section to which said judgment section belongs;

said bus is formed by a bus which complies with a standard regarding mutual connection between apparatuses in a data communication system so as to send and receive pieces of information, each including a predetermined number of bits, and control signals;

said first interface section for extension bus generation further includes a first error-detection-bit addition section for adding an error detection bit to information which is transmitted a predetermined number of bits at a time, and said second interface section for extension bus generation includes a second error-detection-bit addition section for adding an error detection bit to information which is transmitted a predetermined number of bits at a time;

said control section has a structure such that, after outputting a signal via said bus, said control section waits to receive a permission signal from said permission signal send-back section, and then if no permission signal is received within a predetermined period of time, said control section outputs the signal again;

said first interface section for extension bus generation further comprises a permission signal reception notification section which upon reception of a permission signal from said permission signal send-back section, notifies said second interface section for extension bus generation of reception of the permission signal; and said controlled section further comprises a retransmission output recognition section, when said control section outputs a signal so as to perform data read-out control for said controlled section, said retransmission output recognition section judging, on the basis of the notification information from said permission signal reception notification section, whether the signal is output by retransmission processing.

18. The control system according to claim 17, wherein said controlled section comprises:

a read-out data latch section for latching read-out data until said control section performs data read-out control;

a data holding section for temporarily holding data read out from said read-out data latch section; and an output data selecting section, said output data selecting section outputting the read-out data from said read-out data latch section to said control section when said retransmission output recognition section recognizes the signal as being output first time, and said output data selecting section outputting the data held by said data holding section to said control section when said retransmission output recognition section recognizes the signal as being output through retransmission processing.

19. A control system for controlling a communication apparatus and coping with bus extension comprising a control section formed by a microprocessor or a CPU, and a plurality of controlled sections connected to said control section via a bus, each of said controlled sections accommodating at least one controlled object, wherein:

said control section comprises a first interface for extension bus generation which includes a latch section and a bus transmission section, said latch section latching a piece of address/data information at a time which piece of information includes a predetermined number of bits when a signal is output to said bus, and said bus transmission section performing time division multiplexing for the information of the predetermined number of bits in a predetermined order so as to send it, and also sending control signals used for performing time division multiplexing together with the information of the predetermined number of bits;

said controlled section comprises a second interface section for extension bus generation which includes a reception section, a judgment section, and a permission signal send-back section, said reception section receiving address/data information and control signals from said bus transmission section of said control section, said judgment section judging whether the received information is normal information directed to said controlled section to which said judgment section belongs, said permission signal send-back section sending a permission signal back to said control section when it is determined by said judgment section that the received information is normal and is directed to the controlled object of said controlled section to which said judgment section belongs;

said bus is formed by a bus which complies with a standard regarding mutual connection between apparatuses in a data communication system so as to send and receive pieces of information, each including a predetermined number of bits, and control signals;

said first interface section for extension bus generation further includes a first error-detection-bit addition section for adding an error detection bit to information which is transmitted a predetermined number of bits at a time, and said second interface section for extension bus generation includes a second error-detection-bit addition section for adding an error detection bit to information which is transmitted a predetermined number of bits at a time;

said control section has a structure such that, after outputting a signal via said bus, said control section waits to receive a permission signal from said permission signal send-back section, and then if no permission signal is received within a predetermined period of time, said control section outputs the signal again;

said first interface section for extension bus generation further comprises a flag addition section which adds a flag to a signal when the signal is retransmitted via said bus, said flag indicating the retransmission; and said controlled section comprises a retransmission output recognition section, when said control section outputs a signal so as to perform data read-out control for said controlled section, said retransmission output recognition section judging, on the basis of the flag which is added to the signal by said flag addition section, whether the signal is output by retransmission processing.

20. The control system according to claim 19, wherein said controlled section comprises:

a read-out data latch section for latching read-out data until said control section performs data read-out control;

a data holding section for temporarily holding data read out from said read-out data latch section; and an output data selecting section, said output data selecting section outputting the read-out data from said read-out data latch section to said control section when said retransmission output recognition section recognizes the signal as being output first time, and said output data selecting section outputting the data held by said data holding section to said control section when said retransmission output recognition section recognizes the signal as being output through retransmission processing.

21. A control system for controlling a communication apparatus and coping with bus extension comprising a control section formed by a microprocessor or a CPU, and a plurality of controlled sections connected to said control section via a bus, each of said controlled sections accommodating at least one controlled object, wherein:

said control section comprises a first interface for extension bus generation which includes a latch section and a bus transmission section, said latch section latching a piece of address/data information at a time which piece of information includes a Predetermined number of bits when a signal is output to said bus, and said bus transmission section performing time division multiplexing for the information of the predetermined number of bits in a predetermined order so as to send it, and also sending control signals used for performing time division multiplexing together with the information of the predetermined number of bits;

said controlled section comprises a second interface section for extension bus generation which includes a reception section, a judgment section, and a permission signal send-back section, said reception section receiving address/data information and control signals from said bus transmission section of said control section, said judgment section judging whether the received information is normal information directed to said controlled section to which said judgment section belongs, said permission signal send-back section sending a permission signal back to said control section when it is determined by said judgment section that the received information is normal and is directed to the controlled object of said controlled section to which said judgment section belongs;

said bus is formed by a bus which complies with a standard regarding mutual connection between apparatuses in a data communication system so as to send and receive pieces of information, each including a predetermined number of bits, and control signals;

said first interface section for extension bus generation further includes a first error-detection-bit addition section for adding an error detection bit to information which is transmitted a predetermined number of bits at a time, and said second interface section for extension bus generation includes a second error-detection-bit addition section for adding an error detection bit to information which is transmitted a predetermined number of bits at a time;

said control section has a structure such that, after outputting a signal via said bus, said control section waits to receive a permission signal from said permission signal send-back section, and then if no permission signal is received within a predetermined period of time, said control section outputs the signal again;

a break detection line is provided which is connected between said control section and said controlled section so as to detect a break of said bus; and said control section further comprises a diagnosis section, when said control section does not receive a permission signal from said permission signal send-back section even after a signal is output a predetermined number of times, said diagnosis section diagnosing, on the basis of information from said break detection line, a cause of the impossibility in receiving the permission signal.

22. A control system for controlling a communication apparatus and coping with bus extension comprising a control section formed by a microprocessor or a CPU, and a plurality of controlled sections connected to said control section via a bus, each of said controlled sections accommodating at least one controlled object, wherein:

said control section comprises a first interface for extension bus generation which includes a latch section and a bus transmission section, said latch section latching a piece of address/data information at a time which piece of information includes a predetermined number of bits when a signal is output to said bus, and said bus transmission section performing time division multiplexing for the information of the predetermined number of bits in a predetermined order so as to send it, and also sending control signals used for performing time division multiplexing together with the information of the predetermined number of bits;

said controlled section comprises a second interface section for extension bus generation which includes a reception section, a judgment section, and a permission signal send-back section, said reception section receiving address/data information and control signals from said bus transmission section of said control section, said judgment section judging whether the received information is normal information directed to said controlled section to which said judgment section belongs, said permission signal send-back section sending a permission signal back to said control section when it is determined by said judgment section that the received information is normal and is directed to the controlled object of said controlled section to which said judgment section belongs;

said bus is formed by a bus which complies with a standard regarding mutual connection between apparatuses in a data communication system so as to send and receive pieces of information, each including a predetermined number of bits, and control signals;

said first interface section for extension bus generation further includes a first error-detection-bit addition section for adding an error detection hit to information which is transmitted a predetermined number of bits at a time, and said second interface section for extension bus generation includes a second error-detection-bit addition section for adding an error detection bit to information which is transmitted a predetermined number of bits at a time;

said control section has a structure such that, after outputting a signal via said bus, said control section waits to receive a permission signal from said permission signal send-back section, and then if no permission signal is received within a predetermined period of time, said control section outputs the signal again;

a connection state notification bus is provided for notifying said control section whether said controlled section is connected to said bus; and said controlled section further comprises an address detection section which detects the address of a controlled object accommodated in said controlled section to which said address detection section belongs, and a bus control section which brings said connection state notification bus into an active state when said address detection section detects the address of the controlled object accommodated in said controlled section to which said address detection section belongs; and said control section comprises a diagnosis section, when said control section does not receive a permission signal from said permission signal send-back section even after a signal is output a predetermined number of times, said diagnosis section diagnosing, on the basis of information from said connection state notification bus, a cause of the impossibility in receiving the permission signal.

23. A control system for controlling a communication apparatus and coping with bus extension comprising a control section formed by a microprocessor or a CPU, and a plurality of controlled sections connected to said control section via a bus, each of said controlled sections accommodating at least one controlled object, wherein:

said control section comprises a first interface for extension bus generation which includes a latch section and a bus transmission section, said latch section latching a piece of address/data information at a time which piece of information includes a predetermined number of bits when a signal is output to said bus, and said bus transmission section performing time division multiplexing for the information of the predetermined number of bits in a predetermined order so as to send it, and also sending control signals used for performing time division multiplexing together with the information of the predetermined number of bits;

said controlled section comprises a second interface section for extension bus generation which includes a reception section, a judgment section, and a permission signal send-back section, said reception section receiving address/data information and control signals from said bus transmission section of said control section, said judgment section judging whether the received information is normal information directed to said controlled section to which said judgment section belongs, said permission signal send-back section sending a permission signal back to said control section when it is determined by said judgment section that the received information is normal and is directed to the controlled object of said controlled section to which said judgment section belongs;

said bus is formed by a bus which complies with a standard regarding mutual connection between apparatuses in a data communication system so as to send and receive pieces of information, each including a predetermined number of bits, and control signals;

said first interface section for extension bus generation further includes a first error-detection-bit addition section for adding an error detection bit to information which is transmitted a predetermined number of bits at a time, and said second interface section for extension bus generation includes a second error-detection-bit addition section for adding an error detection bit to information which is transmitted a predetermined number of bits at a time;

said control section has a structure such that, after outputting a signal via said bus, said control section waits to receive a permission signal from said permission signal send-back section, and then if no permission signal is received within a predetermined period of time, said control section outputs the signal again;

said control system further includes a connection state notification bus for notifying said control section whether said controlled section is connected to said bus, and a parity error bus for notifying said control section of a parity error in address information transmitted from said control section; and said controlled section further comprises an address detection section for detecting the address of a controlled object accommodated in said controlled section to which said address detection section belongs, a parity error detection section for detecting a parity error in address information transmitted from said control section, and a bus control section which brings said connection state notification bus into an active state when said address detection section detects the address of the controlled object accommodated in said controlled section to which said address detection section belongs and which brings said parity error bus into an active state when a parity error is detected by said parity error detection section; and said control section comprises a diagnosis section, when said control section does not receive a permission signal from said permission signal send-back section even after a signal is output a predetermined number of times, said diagnosis section diagnosing, on the basis of information from said connection state notification bus, a cause of the impossibility in receiving the permission signal.

24. A control system for controlling a communication apparatus and coping with bus extension comprising a control section formed by a microprocessor or a CPU, and a plurality of controlled sections connected to said control section via a bus, each of said controlled sections accommodating at least one controlled object, wherein:

said control section comprises a first interface for extension bus generation which includes a latch section and a bus transmission section, said latch section latching a piece of address/data information at a time which piece of information includes a predetermined number of bits when a signal is output to said bus, and said bus transmission section performing time division multiplexing for the information of the predetermined number of bits in a predetermined order so as to send it, and also sending control signals used for performing time division multiplexing together with the information of the predetermined number of bits;

said controlled section comprises a second interface section for extension bus generation which includes a reception section, a judgment section, and a permission signal send-back section, said reception section receiving address/data information and control signals from said bus transmission section of said control section, said judgment section judging whether the received information is normal information directed to said controlled section to which said judgment section belongs, said permission signal send-back section sending a permission signal back to said control section when it is determined by said judgment section that the received information is normal and is directed to the controlled object of said controlled section to which said judgment section belongs;

said bus is formed by a bus which complies with a standard regarding mutual connection between apparatuses in a data communication system so as to send and receive pieces of information, each including a predetermined number of bits, and control signals;

said first interface section for extension bus generation further includes a first error-detection-bit addition section for adding an error detection bit to information which is transmitted a predetermined number of bits at a time, and said second interface section for extension bus generation includes a second error-detection-bit addition section for adding an error detection bit to information which is transmitted a predetermined number of bits at a time;

said control section has a structure such that, after outputting a signal via said bus, said control section waits to receive a permission signal from said permission signal send-back section, and then if no permission signal is received within a predetermined period of time, said control section outputs the signal again; and said control section further comprises an address information register for latching address information to be sent to said controlled section, and a bus break/failure location specifying section which specifies a location on said bus where a break or failure occurs, when said control section does not receive a permission signal from said permission signal send-back section even after a signal is output a predetermined number of times.

25. A control system for controlling a communication apparatus and coping with bus extension, the control system comprising a control section formed by a microprocessor or a CPU, and a plurality of controlled sections connected to the control section via a bus, said controlled sections being connected to said bus in parallel, each of said controlled sections accommodating at least one controlled object, and equipment operation information being set for said controlled section by said control section, said control section comprising a first interface for extension bus generation, said first interface including a latch section, a bus transmission section, and a first error-detection-bit addition section, said latch section latching a piece of address/data information at a time, said piece of information including a predetermined number of bits when a signal is output to said bus, said bus transmission section performing time division multiplexing for the information of the predetermined number of bits latched in said latch section in a predetermined order so as to send it and also sending control signals used for performing time division multiplexing together with the information of the predetermined number of bits, and said first error-detection-bit addition section adding an error detection bit to information, which is transmitted a predetermined number of bits at a time, thereby sending the error detection bit;

said controlled section comprising a second interface section for extension bus generation said second interface including a reception section, a judgment section, a permission signal send-back section, and a second error-detection-bit addition section, said reception section receiving address/data information and control signals from said bus transmission section of said control section, said judgment section judging whether the received information is normal information directed to said controlled section to which said judgment section belongs, said permission signal send-back section sending a permission signal back to said control section when it is determined by said judgment section that the received information is normal and is directed to the controlled object of said controlled section to which said judgment section belongs, said second error-detection-bit addition section adding an error detection bit to a permission signal, thereby sending the error detection bit;

said control section having a structure such that it waits for reception of a permission signal from said permission signal send-back section within a predetermined period of time after a signal is output via the bus, and when no permission signal is received within the predetermined period of time, said control section again outputs the signal;

said bus being formed by two duplicated buses, for current use and for spare use, which comply with a standard regarding mutual connection between apparatuses in a data communication system so as to send and receive pieces of information, each including a predetermined number of bits and control signals and said controlled objects accommodated in said controlled sections being directly accessed from said bus; and said control section having a structure such that when said control section does not receive a permission signal from said permission signal send-back section even though a signal is output a predetermined number of times, said control section resets equipment operation information set in said controlled section at the point of time when one of said duplicated buses used as a current bus is switched to the other of said duplicated buses used as a spare bus.

* * * * *